(12) United States Patent
Chiao et al.

(10) Patent No.: US 12,543,966 B2
(45) Date of Patent: Feb. 10, 2026

(54) TUNED MICROWAVE RESONANT SYSTEM FOR SUBCUTANEOUS IMAGING

(71) Applicant: Southern Methodist University, Dallas, TX (US)

(72) Inventors: Jungchih Chiao, Grand Prairie, TX (US); Sen Bing, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 0 days.

(21) Appl. No.: 18/612,025

(22) Filed: Mar. 21, 2024

(65) Prior Publication Data

US 2024/0298916 A1 Sep. 12, 2024

Related U.S. Application Data

(63) Continuation-in-part of application No. 18/598,239, filed on Mar. 7, 2024, now abandoned.

(60) Provisional application No. 63/489,642, filed on Mar. 10, 2023.

(51) Int. Cl.
| | |
|---|---|
| *A61B 5/0536* | (2021.01) |
| *A61B 5/00* | (2006.01) |
| *A61B 5/055* | (2006.01) |
| *A61B 5/304* | (2021.01) |
| *A61B 6/00* | (2024.01) |

(52) U.S. Cl.
CPC ............ *A61B 5/0536* (2013.01); *A61B 5/055* (2013.01); *A61B 5/304* (2021.01); *A61B 5/444* (2013.01); *A61B 6/5205* (2013.01); *A61B 2562/046* (2013.01)

(58) Field of Classification Search
CPC ..... A61B 5/0536; A61B 5/304; A61B 5/0507; A61B 5/4887
See application file for complete search history.

(56) References Cited

U.S. PATENT DOCUMENTS

| | | | |
|---|---|---|---|
| 1,730,007 | A | 10/1929 | Hemenway |
| 1,929,953 | A | 10/1933 | Lindhard |
| 5,054,912 | A | 10/1991 | Kuchel |
| 5,054,926 | A | 10/1991 | Dabbs |

OTHER PUBLICATIONS

"Resonator Based Antenna Sensor for Breast Cancer Detection" by P.K. Rao et al. Progress in Electromagnetics Research. vol. 101, 149-159 (Year: 2021).*

(Continued)

*Primary Examiner* — Jason M Ip
(74) *Attorney, Agent, or Firm* — Edwin S. Flores; Daniel J. Chalker; Chalker Flores, LLP

(57) ABSTRACT

A method for non-invasively identifying a location of a subcutaneous tumor comprising: providing a patient with a possible subcutaneous tumor; providing a detector comprising one or more radio-frequency (RF) planar resonant loop sensors, each sensor comprising a planar resonant loop and an element disposed within and co-planar with a loop formed by the planar resonant loop; creating a first localization map of resonant frequencies of an area including the possible tumor using the detector; and creating a second localization map of $|s_{11}|$ reflection coefficients of the area including the possible tumor using the detector.

12 Claims, 37 Drawing Sheets

(56) References Cited

OTHER PUBLICATIONS

Andreuccetti, et al. "An Internet Resource for the Calculation of the Dielectric Properties of Body Tissues in the Frequency Range 10 Hz-100 GHz" 1997. Available online: http://niremf.ifac.cnr.it/tissprop/ (accessed on Nov. 9, 2022). IFAC-CNR, Florence (Italy), Based on data published by C.Gabriel et al. in 1996.
Arab, et al. "Early-Stage Detection of Melanoma Skin Cancer Using Contactless Millimeter-Wave Sensors" IEEE Sens. J. 2020, 20, 7310-7317.
Bing, et al. "A Flexible Tuned Radio-Frequency Planar Resonant Loop for Noninvasive Hydration Sensing" IEEE J. Microwaves 2022, 3, 181-192.
Bing, et al. "A Radio-Frequency Planar Resonant Loop for Noninvasive Monitoring of Water Content" In Proceedings of the 2022 IEEE Sensors, Dallas, TX, USA, Oct. 30-Nov. 2, 2022; IEEE: Piscataway, NJ, USA, 2022; pp. 1-4.
Bing, et al. "A Resonant Coupler for Subcutaneous Implant" Sensors 2021, 21, 8141, Published Dec. 6, 2021.
Bing, et al. "A Self-Tuned Method for Impedance-Matching of Planar-Loop Resonators in Conformable Wearables" Electronics 2022, 11, 2784.
Bing, et al. "Resonant Coupler Designs for Subcutaneous Implant". In Proceedings of the 2021 IEEE Wireless Power Transfer Conference (WPTC), San Diego, CA, USA, Jun. 1-4, 2021; pp. 1-4.
Boyd, et al. "Breast tissue composition and susceptibility to breast cancer" J. Natl. Cancer Inst. 2010, 102, 1224-1237.
Cheng, et al. "Dielectric properties for non-invasive detection of normal, benign, and malignant breast tissues using microwave theories" Thorac. Cancer 2018, 9, 459-465.
Chiao, et al. "Applications of Microwaves in Medicine" IEEE J. Microwaves 2023, 3, 134-169.
Cui, et al. "A review of microwave-induced thermoacoustic imaging: Excitation source, data acquisition system and biomedical applications" J. Innov. Opt. Health Sci. 2017, 10, 1730007-18.
Davis, et al. "Ultrawideband microwave breast cancer detection: A detection-theoretic approach using the generalized likelihood ratio test" IEEE Trans. Biomed. Eng. 2005, 52, 1237-1250.
Deng, et al. Electromagnetic Imaging Methods for Nondestructive Evaluation Applications. Sensors 2011, 11, 11774-11808.
Fear, E.C. "Microwave Imaging of the Breast" Technol. Cancer Res. Treat. 2005, 4, 69-82.
Fear, et al. "Enhancing breast tumor detection with near-field imaging" IEEE Microw. Mag. 2002, 3, 48-56.
Fletcher, et al. "Mammographic Screening for Breast Cancer" N. Engl. J. Med. 2003, 348, 1672-1680.
Guo, et al. "Microwave Imaging Via Adaptive Beamforming Methods for Breast Cancer Detection" J. Electromagn. Waves Appl. 2006, 20, 53-63.
Hagl, et al. "Sensing volume of open-ended coaxial probes for dielectric characterization of breast tissue at microwave frequencies" IEEE Trans. Microw. Theory Tech. 2003, 51, 1194-1206.
Hagness, et al. "Two-dimensional FDTD analysis of a pulsed microwave confocal system for breast cancer detection: Fixed-focus and antenna-array sensors" IEEE Trans. Biomed. Eng. 1998, 45, 1470-1479.
Hassan, et al. "Review of Electromagnetic Techniques for Breast Cancer Detection" IEEE Rev. Biomed. Eng. 2011, 4, 103-118.
Klemm, et al. "Radar-Based Breast Cancer Detection Using a Hemispherical Antenna Array-Experimental Results" IEEE Trans. Antennas Propag. 2009, 57, 1692-1704.
Kothari, et al. "The Importance of Breast Adipose Tissue in Breast Cancer" Int. J. Mol. Sci. 2020, 21, 5760.
Kuwahara, et al. "Large Scale Analysis of Complex Permittivity of Breast Cancer in Microwave Band" Adv. Breast Cancer Res. 2020, 9, 101-109.
Kwon, et al. "Recent Advances in Microwave Imaging for Breast Cancer Detection" Int. J. Biomed. Imaging 2016, 2016, 5054912-5054926.
Lazebnik, et al. "A large-scale study of the ultrawideband microwave dielectric properties of normal breast tissue obtained from reduction surgeries" Phys. Med. Biol. 2007, 52, 2637-2656.
Lazebnik, et al. "Tissue-mimicking phantom materials for narrowband and ultrawideband microwave applications" Phys. Med. Biol. 2005, 50, 4245-4258.
Lin, J.C. "Microwave Thermoelastic Tomography and Imaging; Advances in Electromagnetic Fields in Living Systems" Springer: Boston, MA, USA, 2005; pp. 41-76.
Mayrovitz, et al. "Characterizing the tissue dielectric constant of skin basal cell cancer lesions" Ski. Res. Technol. 2018, 24, 686-691.
Porter, et al. "Improved tissue phantoms for experimental validation of microwave breast cancer detection" In Proceedings of the Fourth European Conference on Antennas and Propagation, Barcelona, Spain, Apr. 12-16, 2010; IEEE: Piscataway, NJ, USA, 2010; pp. 1-5.
Siegel, et al. "Cancer statistics" 2022. CA Cancer J. Clin. 2022, 72, 7-33.
Walter, et al. "The Andersen Model of Total Patient Delay: A systematic review of its application in cancer diagnosis" J. Health Serv. Res. Policy 2012, 17, 110-118.
Xie, et al. "Multistatic Adaptive Microwave Imaging for Early Breast Cancer Detection" IEEE Trans. Biomed. Eng. 2006, 53, 1647-1657.

* cited by examiner

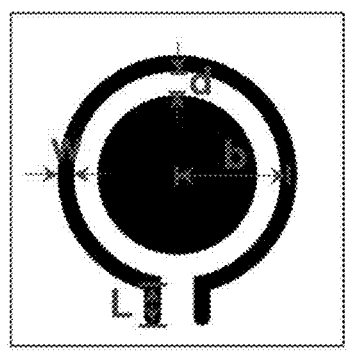
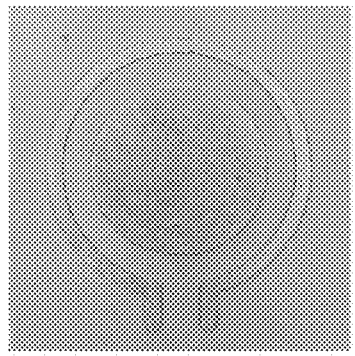
(a)  (b)
FIG. 28A  FIG. 28B
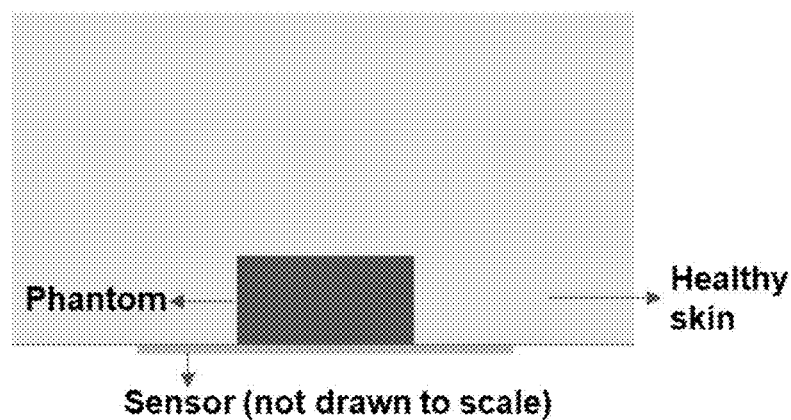
FIG. 29

(a) (b)

(a)

(b)

(a)            (b)

TUNED MICROWAVE RESONANT SYSTEM FOR SUBCUTANEOUS IMAGING

CROSS-REFERENCE TO RELATED APPLICATIONS

This application is a continuation-in-part patent application of U.S. non-provisional patent application Ser. No. 18/598,239 filed on Mar. 7, 2024, which claims priority to U.S. Provisional Application Ser. No. 63/489,642, filed Mar. 10, 2023, the entire contents of which are incorporated herein by reference.

STATEMENT OF FEDERALLY-FUNDED RESEARCH

This invention was made with government support under 1929953 awarded by the National Science Foundation. The government has certain rights in the invention.

TECHNICAL FIELD OF THE INVENTION

The present invention relates in general to resonant coupler systems and methods. In particular, the present invention relates to the resonant coupler systems and methods for detection of tumors and for cancer screening.

BACKGROUND OF THE INVENTION

Without limiting the scope of the invention, its background is described in connection with tumor detection systems and methods and in connection with cancer screening.

Traditional nondestructive evaluation (NDE) methods [1-4], including computed tomography (CT), X-ray imaging, magnetic resonance imaging (MRI), and ultrasonic measurements, have been widely used for noninvasive cancerous tissue detection, such as breast tumor screening. However, the current instruments are bulky, expensive, and have potential risks. X-ray mammography screening is the mainstay for breast imaging [5,6], but it has been limited by discomfort, the high costs of the instruments, and a shortage of trained radiologists. The high false negative and recall rates require additional imaging and biopsies [7-9], further increasing patients' stress and financial burden. Frequent X-ray exposure may create additional risks. To increase screening accuracy, magnetic resonance imaging (MRI) has been used to provide a second modality of imaging to reduce the rate of false negatives [10], especially for those at high risk. The instrument costs and operation requirements are higher than those of mammography. Due to the limited instruments, potential patients need to travel. They are often unavailable in rural areas where economically disadvantaged groups which are disproportionally high-risk exist. Such inconvenience and complexity increase the possibility of behavioral delay in the potential cancer-patient population for periodic screening, which reduces the chances of identifying pre- or early-stage cancer tissues. Once the tumor is established, the possibility of cancer-cell migration and metastasis increases significantly. Metastasis dramatically reduces the patient survival rate and could be avoided if a timely diagnosis and early treatments are applied [12, 13]. Skin cancer screening is urgently needed in regular clinical diagnosis due to its high occurrence and large populations of patients [58]. The Skin Cancer Foundation estimates that over 187,000 new cases of skin cancers will be diagnosed in the US in 2023 [59]. Skin cancers are roughly categorized into three cell types: basal cells, squamous cells, and melanoma cells [60]. The first two types can be grouped into non-melanoma skin cancers, and most skin cancer occurrences are the non-melanoma type [61]. The lesion area usually can be seen by the naked eye as its color and shape change over time, but it is required to be further investigated if the lesion part is cancerous or benign. For example, even experienced caregivers often confuse the Seborrheic Keratosis (non-cancerous) as a Basal Cell Carcinoma lesion, which may lead to unnecessary biopsies due to suspicion of malignancy [62]. Dermoscopy based on visual analysis is typically the primary skin cancer diagnosis [61], [63]. However, its resolution is limited [60], [64], [65], and accuracy has been highly variable since it mainly depends on the examiner's skill and experience [66], [67], which may increase false positives or unnecessary biopsies. The unnecessary intervention can exaggerate further dermal complications such as scarring, bruising, and infection, especially on the faces, and increase patients' stress and financial burdens [68]. The biopsy procedure is an invasive process that can cause pain, anxiety, and disfigurement in patients. The histopathological procedures can take several days to produce results. Typically, around 15-30 benign lesions must be biopsied to diagnose a single case of cancer [69]. Additionally, due to tissue processing and sectioning, a maximum of only 2% samples sent for pathology examination are actually analyzed [70]. Such high costs and inconvenience add behavioral delay for regular check-ups in the potential cancer patient populations, which reduces early or pre-stage cancer identification. The possibility of metastasis and cancer cell migration increases significantly once the skin tissue becomes malignant. Metastasis reduces the survival rate of patients dramatically and can be avoided with a timely diagnosis and treatment [72], [73]. Thus, a more convenient, accurate, and noninvasive method with lower costs suitable for large-population skin cancer screening is needed.

Noninvasive methods, such as bioimpedance measurements, thermography, and ultrasound, suffer from low accuracy and higher costs [74], [75], [76], [77], [78], [79], [80], [81]. Nonionizing electromagnetic waves may provide a noninvasive evaluation of biological tissues due to the inherently high contrast of dielectric properties among cancerous, benign, and healthy tissues [82], [83], [84], [85], [86], [87]. It has been shown that cancer tumors have distinct water content [83], and biochemistry [89], such as metal concentrations [90], consequently causing significant changes in dielectric properties. With optics, Raman spectroscopy has been used to investigate water content and structural alterations in skin malignancy, specifically Basal Cell Carcinoma (BCC). The study revealed an increase of approximately 15% in the free (bulk) water content in malignant BCC tissues compared to normal skin tissues. Millimeter waves (30-300 GHz) have been recently utilized for assessing skin lesions and detecting tumors [91], [92], [93], [94]. Shorter wavelengths provide a higher spatial resolution, however, at the cost of a reduced penetration depth ranging from 600 µm to 1.2 mm [95]. Imaging deeper tissues may become an issue with limited radiation powers. Nevertheless, they have been demonstrated as effective in sensing pathological changes in surface layers or outer tissue layers of excised organs. Working with millimeter waves currently may still require expensive and bulky instruments.

What is needed are novel devices, methods, and systems for rapid, in situ detection of tumors that reduced the cost and inconvenience of traveling obtain X-rays or large magnetic resonance imaging (MRI) devices. Further, what is needed is a more convenient, accurate, and noninvasive method with lower costs suitable for large-population skin cancer screening.

SUMMARY OF THE INVENTION

As embodied and broadly described herein, an aspect of the present disclosure relates to a method for non-invasively identifying a location of a subcutaneous tumor comprising, consisting essentially of, or consisting of providing a patient with a possible subcutaneous tumor; providing a detector comprising one or more radio-frequency (RF) planar resonant loop sensors, each sensor comprising a planar resonant loop and an element disposed within and co-planar with a loop formed by the planar resonant loop; creating a first localization map of resonant frequencies of an area including the possible tumor using the detector; and creating a second localization map of $|s_{11}|$ reflection coefficients of the area including the possible tumor using the detector. In one aspect, each sensor is disposed on a flexible film to provide firm contact with a skin of the patient. In another aspect, the first localization map is created by moving a single sensor over the area including the possible tumor. In another aspect, the first localization map is created by moving a single sensor over the area including the possible tumor. In another aspect, the first localization map is created by temporally switching an array of the one or more sensors over the area including the possible tumor. In another aspect, the second localization map is created by moving a single sensor over the area including the possible tumor. In another aspect, the second localization map is created by temporally switching an array of the one or more sensors over the area including the possible tumor.

As embodied and broadly described herein, another aspect of the present disclosure relates to a method for non-invasively identifying a location of a subcutaneous tumor comprising, consisting essentially of, or consisting of providing a patient with a possible subcutaneous tumor; providing a detector comprising one or more radio-frequency (RF) planar resonant loop sensors, each sensor comprising a planar resonant loop and an element disposed within and co-planar with a loop formed by the planar resonant loop; creating a first localization map of resonant frequencies of an area including the possible tumor using the detector; creating a second localization map of $|s_{11}|$ reflection coefficients of the area including the possible tumor using the detector; normalizing the first localization map and the second localization map to a range from zero to one; converting the normalized second localization map to match the normalized first localization map using a linear transformation; applying a weighting factor to the converted normalized second localized map and to the normalized first localization map to construct a third localization map; and visually locating the tumor on the third localization map. In one aspect, each sensor is disposed on a flexible film to provide firm contact with a skin of the patient. In another aspect, the first localization map is created by moving a single sensor over the area including the possible tumor. In another aspect, the first localization map is created by temporally switching an array of the one or more sensors over the area including the possible tumor. In another aspect, the second localization map is created by moving a single sensor over the area including the possible tumor. In another aspect, the second localization map is created by temporally switching an array of the one or more sensors over the area including the possible tumor. In another aspect, the first localization map is created by moving a single sensor over the area including the possible tumor.

As embodied and broadly described herein, another aspect of the present disclosure relates to a detector for non-invasively identifying the location of a subcutaneous tumor comprising, consisting essentially of, or consisting of an array of sensors, each sensor comprising a planar resonant loop and an element disposed within and co-planar with a loop formed by the planar resonant loop, wherein each sensor is configured to at a phase shift with an adjacent sensor in the array. In one aspect, the array of sensors is disposed on a flexible film to provide firm contact with a skin of the patient. In another aspect, the array of sensors is a two-by-two array. In another aspect, each sensor is configured to operate at a phase shift of 180 degrees with an adjacent sensor in the array to maximize a depth of penetration of electric fields generated by the array of sensors. In another aspect, each sensor is configured to operate at a phase shift other than 180 degrees with an adjacent sensor in the array to change a direction of electric fields generated by the array of sensors without moving the array of sensors. In another aspect, the first localization map is created by moving a single sensor over the area including the possible tumor.

As embodied and broadly described herein, an aspect of the present disclosure relates to a method for non-invasively identifying a type of a skin lesion, the method including providing a patient with a skin lesion; providing a detector comprising one or more radio-frequency (RF) planar resonant loop sensors, each sensor comprising a planar resonant loop and an element disposed within and co-planar with a loop formed by the planar resonant loop; using the detector to measure a resonance frequency of healthy skin of the patient; using the detector to measure a resonance frequency of the skin lesion; quantifying a shift between the resonance frequency of the heathy skin and the resonance frequency of the skin lesion; and using the shift to identify a type of the skin lesion. In one aspect, each sensor is disposed on a flexible film to provide firm contact with a skin of the patient. In another aspect, the type of the lesion is basal cell carcinoma (BCC) or seborrheic keratosis (SK).

BRIEF DESCRIPTION OF THE DRAWINGS

For a more complete understanding of the features and advantages of the present invention, reference is now made to the detailed description of the invention along with the accompanying figures, in which:

FIG. 10A shows a map of resonant frequencies; the dark-blue pixel indicates the tumor's location.

FIG. 10B shows a map of $|s_{11}|$; the light-yellow pixel indicates the tumor's location.

FIG. 20A shows a side view and FIG. 20B shows a top view.

FIG. 22A shows a map of resonant frequencies and FIG. 22B shows a map of the magnitudes of reflection coefficients.

FIG. 28A shows a configuration of the tuned sensor with radius b=5.4 mm, loop width w=0.8 mm, stub length L=1.5 mm, and tuning gap d=1.13 mm. FIG. 28B shows a photograph of the tuned sensor on a flexible polyimide substrate in its flat condition.

FIG. 29 shows a schematic simulation setup for the sensor designed to differentiate benign and cancerous phantoms embedded in the healthy skin.

FIG. 30A shows a top view, FIG. 30B shows a side view.

FIG. 32A shows a top view, and FIG. 32B shows a side view. The tumor's square side lengths range from 4 to 16 mm with a constant thickness of 4 mm.

FIG. 34A shows dielectric constant, and FIG. 34B shows conductivity in the phantoms made of tissue-mimicking materials. The dielectric properties mimic the healthy skin, Basal Cell Carcinoma (BCC), and Seborrheic Keratosis (SK) tissues. The error bars were obtained from 4 measurements with respect to their averaged values.

DETAILED DESCRIPTION OF THE INVENTION

Figure 1A:
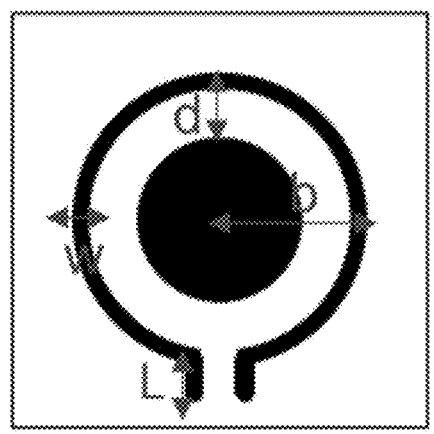
FIG. 1A shows the configuration of the tuned sensor: radius b=5.7 mm, loop width w=0.7 mm, stub length L=1.5 mm, tuning gap d=1.95 mm.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Due to the inconsistency in distribution and high contrast in dielectric properties between normal and malignant tissues [14-19], the present inventors recognized that electromagnetic waves provide a way for noninvasive probing of biochemical properties in tissues. Nonionizing radiation does not have enough energy to damage tissues, unlike X-rays. The microwave electronic components and integrated circuits are readily available and affordable. The dielectric contrasts, electromagnetic propagation, and interference of abnormal tissues can indicate their boundaries. Microwave scattering, including reflection and transmission, measurements have been used to detect breast tumors noninvasively [6,20-22]. Such imaging techniques utilizing scattering parameters to reconstruct images include tomography-based passive methods [23,24] and radar-based active methods [25-29]. Recently, microwave-acoustic imaging systems that use microwave pulses to create thermal effects and induce acoustic pressure waves across tissues have been demonstrated [30-33]. These methods hold great promise for another sensing modality to detect abnormal tissues. However, they still require significant effort in instrumentation because the wave-scattering environments are complex. Methods with various forms of illumination, time-delay estimation of signals, space-time beamforming, adaptive radar synthesis, and short-pulse high-power microwave pulses have been utilized to overcome the challenges of modeling and detecting wave scattering in complicated biological environments. Image reconstruction for each method also requires sophisticated algorithms for beam pattern and multi-path time delay correction and calibration.

Microwave resonators can potentially be used for subcutaneous breast cancer screening. The interaction of electromagnetic fields with tissues provides the potential for noninvasive and high-sensitivity sensing. The resonant frequency and magnitude changes in the reflection coefficients can be evaluated to distinguish tissue types. Resonators typically have smaller footprints compared to bulky instruments, such as X-ray tomography and MRI machines. Resonating cavities or dielectric resonators do not have suitable mechanical configurations to interface with the skin. Planar circuits or antenna resonators are more appropriate, and recent advances in circuit and antenna fabrication on flexible substrates make them able to be worn on the skin. However, the poor resonance at microwave frequencies in most planar resonators that can conform to the skin means they fail to provide reliable and sufficiently deep penetration into tissues. The differences in the tissue permittivities among individuals also make impedance tuning difficult. Thus, the performance suffers from low sensitivity. Using a dynamic matching circuit to achieve a high-quality factor is possible but makes it bulky with design constraints. Impedance tuning for each pixel in an image makes the technique time-consuming and increases insertion losses. The technical challenges in such a conformal microwave resonator are to achieve a high-quality factor without sacrificing the features of being planar and small-form factors.

Preliminary work by the present inventors involved developing a self-tuned method for impedance-matching in planar-loop resonators by embedding a metal pad. The principle is based on the presence of the center pad to provide distributed capacitances by the gap between the loop and metal pad and the mutual inductance between metal strips across the gap owing to coupled magnetic fields. The distance between the loop and the center pad serves to tune the distributed reactances to match the port impedance in the desired frequency range. The resonance becomes significantly improved without changing the overall size of the loop. The tuning principle is similar to the ones for transmission-line impedance tuning, except no additional transmission line is added outside the loop. With the proposed tuning principle, loop resonators can be made into compact forms with high resonance performance, and they provide great advantages for sensing or near-field signal/power coupling. Applications have been investigated for human hydration monitoring [37,38], subcutaneous implant localization, and wireless power transfer [39,40].

The present invention includes the development of a subcutaneous tumor screening system based on the tuned loop resonator of the present inventors. Due to providing the most critical screening need, breast cancers were used as an example. Breast tumors typically have higher water content than normal tissues, especially adipose tissues [15]. Adipose tissues in the breast secrete biochemical growth factors that have been shown to be related to cancer-cell growth [42]. The water contrast can be up to 10:1 [14], and it consequently determines the distinct dielectric property variations between the malignant and normal tissues in the breast [43,44]. Since the tuned resonance is highly susceptible to dielectric property changes, the tuned sensor can be used to noninvasively locate abnormal subcutaneous tissue boundaries for breast tumor screening. When abnormal tissue is underneath the loop, the resonant frequency or reflection coefficient su will have a noticeable shift or change. The inventors' previous work developed an implant-locating mechanism based on this principle. However, the implant has a corresponding metal loop, which creates a new resonance with the external sensing resonator to emphasize the contrast for its location. The present invention includes the developed of new variations and contrasts in the dielectric properties in biological objects have similar effects, and their uses, to create an image of tissues.

The present invention provides a compact and planar imaging system developed using a flexible polymer substrate that can distinguish subcutaneous tissue abnormalities, such as breast tumors, based on electromagnetic-wave interactions in materials where permittivity variations affect wave reflection. The sensing element is a tuned loop resonator operating in the industrial, scientific, and medical (ISM) band at 2.423 GHz, providing a localized high-intensity electric field that penetrates into tissues with sufficient spatial and spectral resolutions. The resonant frequency shifts and magnitudes of the reflection coefficients indicate the boundaries of abnormal tissues under the skin due to their high contrasts to normal tissues. The sensor was tuned to the desired resonant frequency with a reflection coefficient of −68.8 dB for a radius of 5.7 mm, with a tuning pad. Quality factors of 173.1 and 34.4 were achieved in simulations and measurements in phantoms. An image-processing method was introduced to fuse raster-scanned 9×9 images of resonant frequencies and reflection coefficients for image-contrast enhancement. The results showed a clear indication of the tumor's location at a depth of 15 mm and the capability to identify two tumors both at the depth of 10 mm. The sensing element can be expanded to a four-element phased array for deeper field penetration. Field analysis showed the depths of −20 dB attenuation were improved from 19 to 42 mm, giving wider coverage in tissues at resonance. Results showed that a quality factor of 152.5 was achieved and a tumor could be identified at a depth of up to 50 mm. In this work, simulations and measurements were conducted to validate the concept, showing great potential for subcutaneous imaging in medical applications in a noninvasive, efficient, and lower-cost way.

Sensor Design and Simulations.

Taking the compact size and sufficient field depth into account, the sensor is designed to function within the ISM (industrial, scientific, and medical) band frequencies at around 2.432 GHz. In the simulations, the model consisted of three parts: skin with a thickness of 2 mm, normal breast tissues, and a malignant tumor in the shape of a cube, 17.1×17.1×17.1 mm$^3$.

Figure 2A:
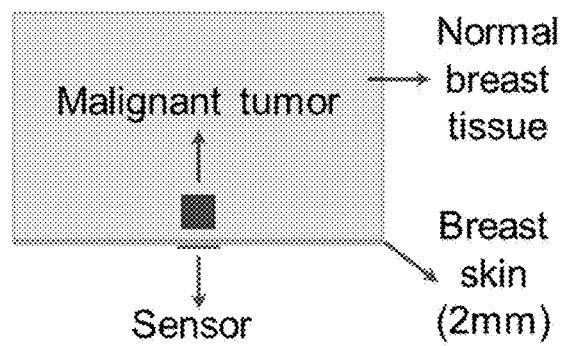
FIG. 2A shows a simulation setup.

We assumed first a cube shape with the same side length as the length of the sensor substrate, so it would be easier to validate with experiments. After validation, tumor and substrate sizes could be varied to investigate details. The sensor was conformed to the breast skin with a distance of 10 mm between the tumor and the sensor. FIG. 1A shows the top view of the sensor with its configurations, and FIG. 2A shows the simulation setup. Dielectric constants applied in the simulations for breast skin, breast tissues, and tumors were 38, 6, and 59; and the corresponding conductivities were 1.45, 0.13, and 2.8 S/m, respectively, [26,43-49].

Figure 1B:
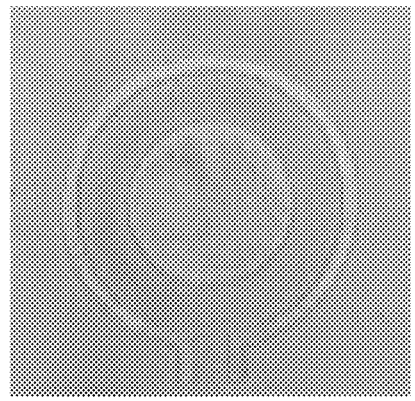
FIG. 1B shows a photograph of the tuned sensor on a flexible polyimide substrate in its flat condition.
Figure 2B:
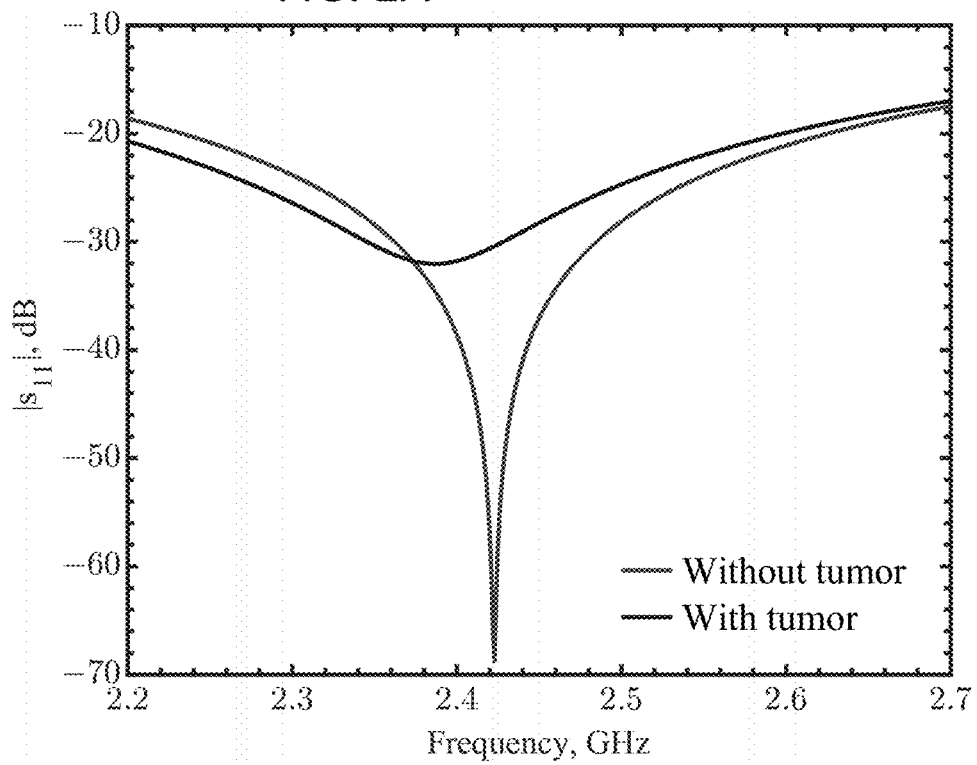
FIG. 2B shows a comparison of the magnitudes of reflection coefficients between the cases with and without a tumor inside.

Considering the curvature of the body part, the resonator loop was designed on a flexible polyimide film (DuPont™ PYRALUX® FR9220R, Wilmington, Delaware) that could provide firm contact to the skin. The thickness of the film was 76 µm, and it had a dielectric constant of 3.2. The copper's thickness was 70 µm. The substrate parameters in simulations were the same as the ones in fabrication. The tuned loop configuration is shown in FIG. 1a. For an operating frequency of 2.423 GHz for the case without a tumor underneath, the radius of the loop resonator b was fixed at 5.7 mm with a connecting stub length L=1.5 mm that was prepared for the measurement connector port. The metal width w was 0.7 mm. The spacing d between the loop and metal pad was 1.95 mm, tuning the resonance with a reflection-coefficient magnitude of −68.8 dB when no tumor was underneath. A photo of the resonator is shown in FIG. 1B. When a tumor was underneath, simulations showed that the resonant frequency shifted to 2.387 GHz with a reflection coefficient of −32 dB, as shown in FIGS. 2A and 2B. The distinguishable frequency shift and the change of |s11| indicate the possibility of detecting the presence of a tumor.

Figure 3B:
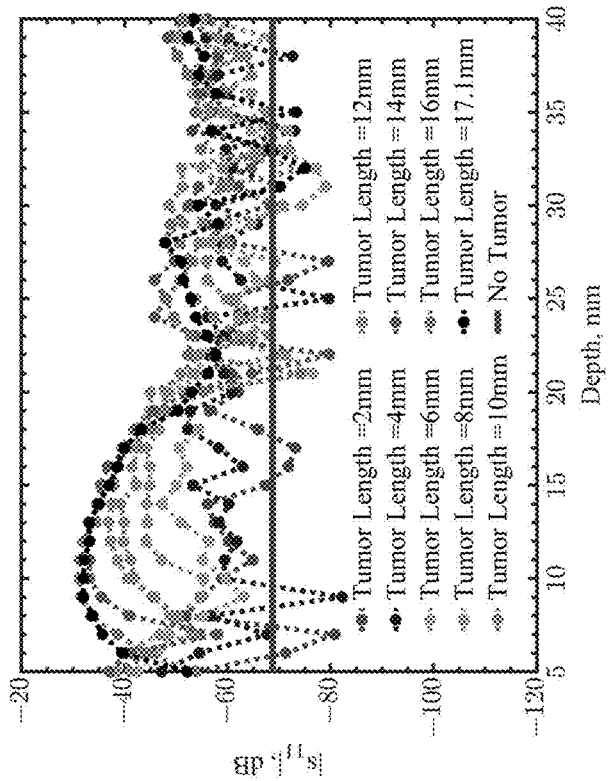
FIG. 3B shows a comparison of the same simulations in terms of magnitudes of reflection coefficients.
Figure 3A:
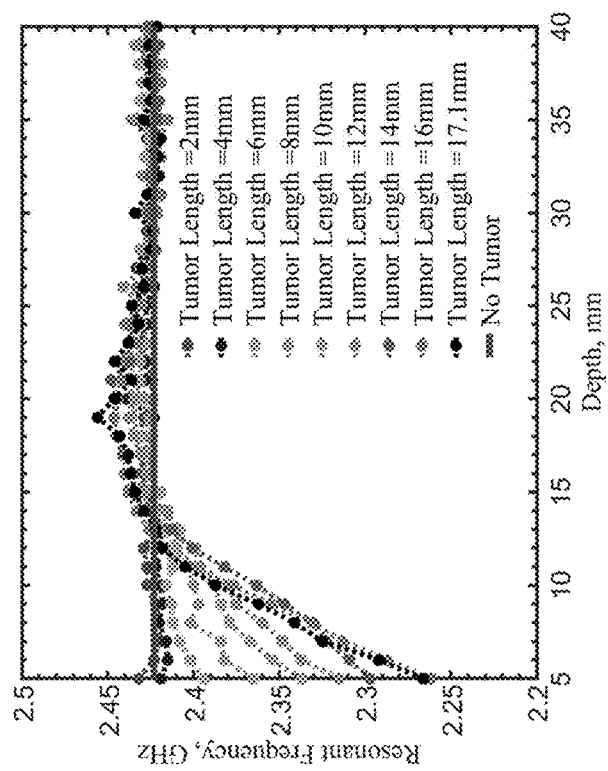
FIG. 3A shows a comparison of simulations with tumor cubic lengths from 2 to 17.1 mm at a depth range from 5 to 40 mm in terms of resonant frequencies.

Based on the same principle, more simulations were conducted with smaller tumors at different depths to further test the sensitivity. The side lengths of simulated tumors varied from 2 to 17.1 mm. The depth was varied from 5 to 40 mm. For each simulated configuration, resonant frequency and its corresponding magnitude of reflection coefficient were collected and plotted in FIGS. 3A and 3B, compared to the case without a tumor (solid red line). From the perspective of resonant frequency shift, the tumor became undetectable when the tumor side length was smaller than 4 mm for the depth range of 5-40 mm. The resonant frequency shifted below 2.423 GHz for a tumor depth within 14 mm. The resonant frequencies shifted to higher ones above 14 mm. Resonant frequencies eventually became the same as the ones without a tumor when a tumor was deeper than 25 mm. Similarly, the magnitudes of reflection coefficients did not change monotonically with increasing depth. This phenomenon is likely due to the fact that the electrical fields from the loop were not uniformly distributed or linearly decayed throughout the depth underneath the sensor. Such field distributions change the impact of the tumor permittivity on the effective permittivity experienced by the resonator, inevitably affecting the resonance in the loop. Both information from resonant frequencies and magnitudes of reflection coefficients, however, provide redundancy, so they can be used together to determine the presence of the tumor. Combining both factors may make the detection clearer. A weighted image-fusion method will be introduced later in this work.

Tumor Localization and Imaging

Raster Scan

Figure 4:
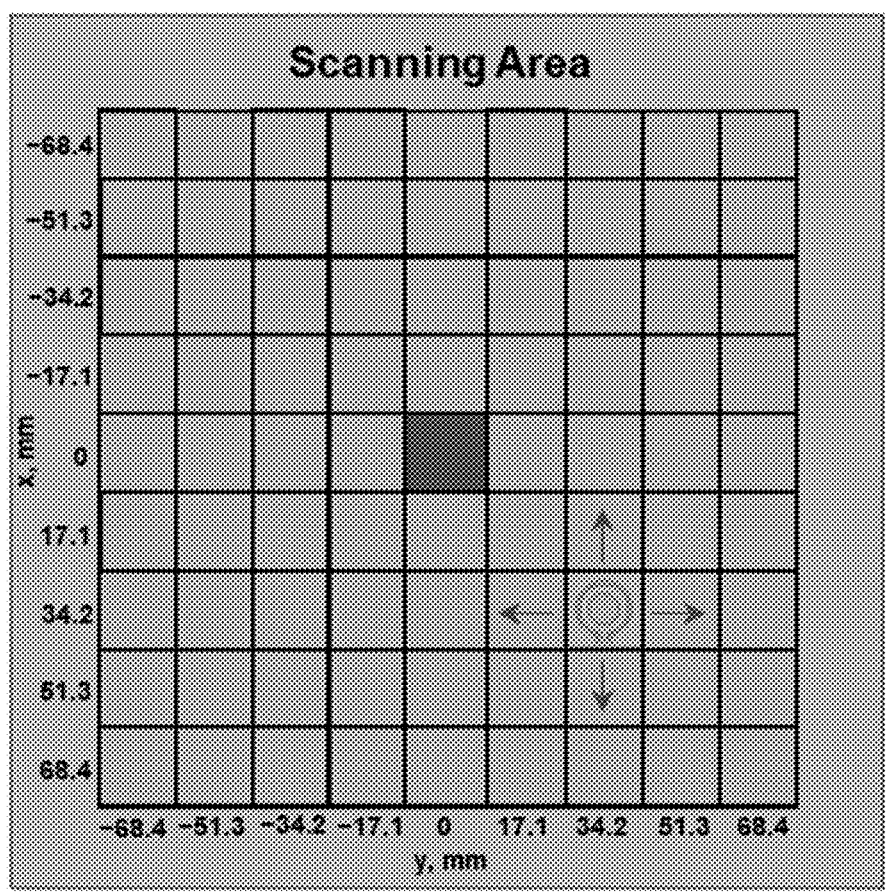
FIG. 4 shows a schematic for a raster scan, for which a tumor with a volume of 17.13 mm$^3$ was positioned at a depth of 10 mm and (x=0, y=0); in the illustration, the sensor is (34.2, 34.2) to obtain the reflection coefficient of the pixel (34.2, 34.2).

In applications, the tumor's location requires a "heatmap" with a 2-dimensional raster scan of the targeted tissue area by moving one sensor. The image can also be obtained with an array of loop resonators switched temporally to acquire individual pixel data. Based on the reflection coefficients, heatmaps can be generated to illustrate the location of the abnormal tissue. A discrete raster scan was conducted in simulations with the tuned loop to validate this concept. FIG. 4 shows the schematic of the simulation setup for the raster scan. A tumor size of 17.13 mm³ was placed at (x, y)=(0, 0) at a depth of 10 mm, where the distance from top surface of the tumor to the skin surface was 10 mm. The resonator loop diameter was 11.4 mm. Each pixel was 17.1×17.1 mm². The total scanning area was 13.68×13.68 cm² with 9×9 pixels. The sensor in FIG. 4 was at (34.2, 34.2) and would complete the raster scan.

Figures 5A, 5B:
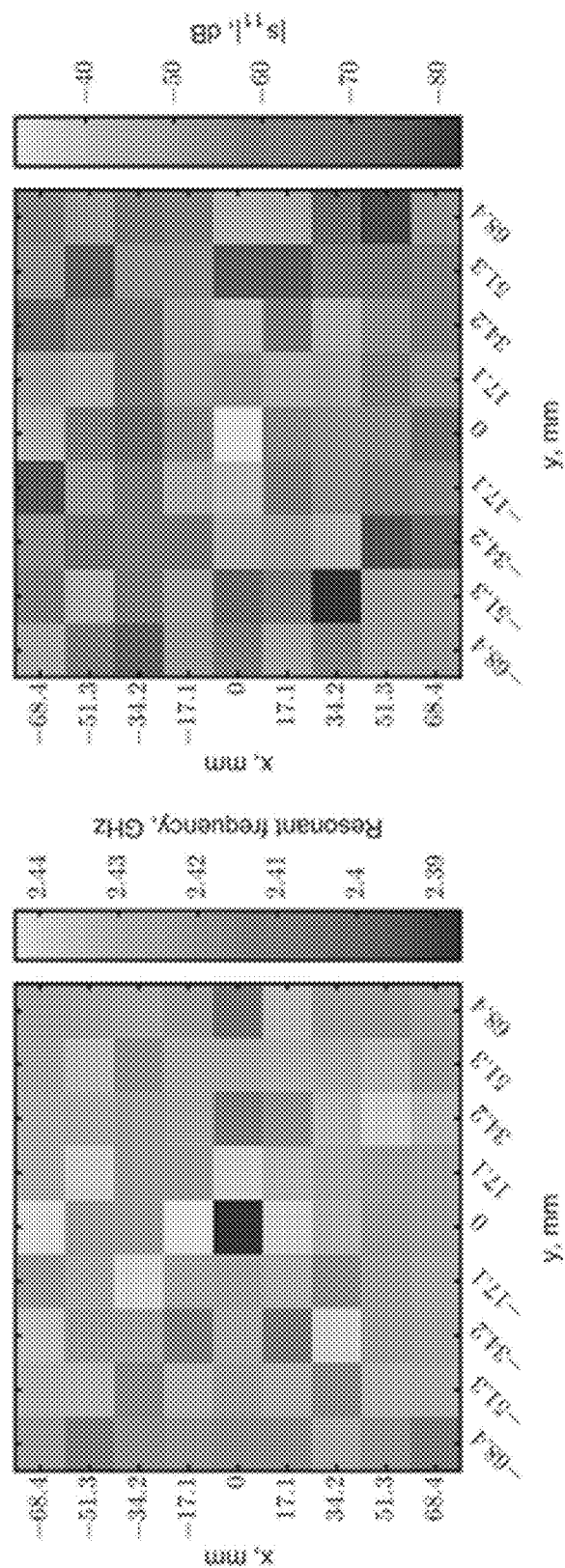
FIG. 5A shows a localization map of resonant frequencies generated from the reflection coefficients for the tumor at a depth of 10 mm, where the tumor is located at (x=0, y=0); the dark pixel indicates the tumor's location.
FIG. 5B shows a localization map of |s11| for the same tumor; the light-yellow pixel indicates the tumor's location.
Figure 6:
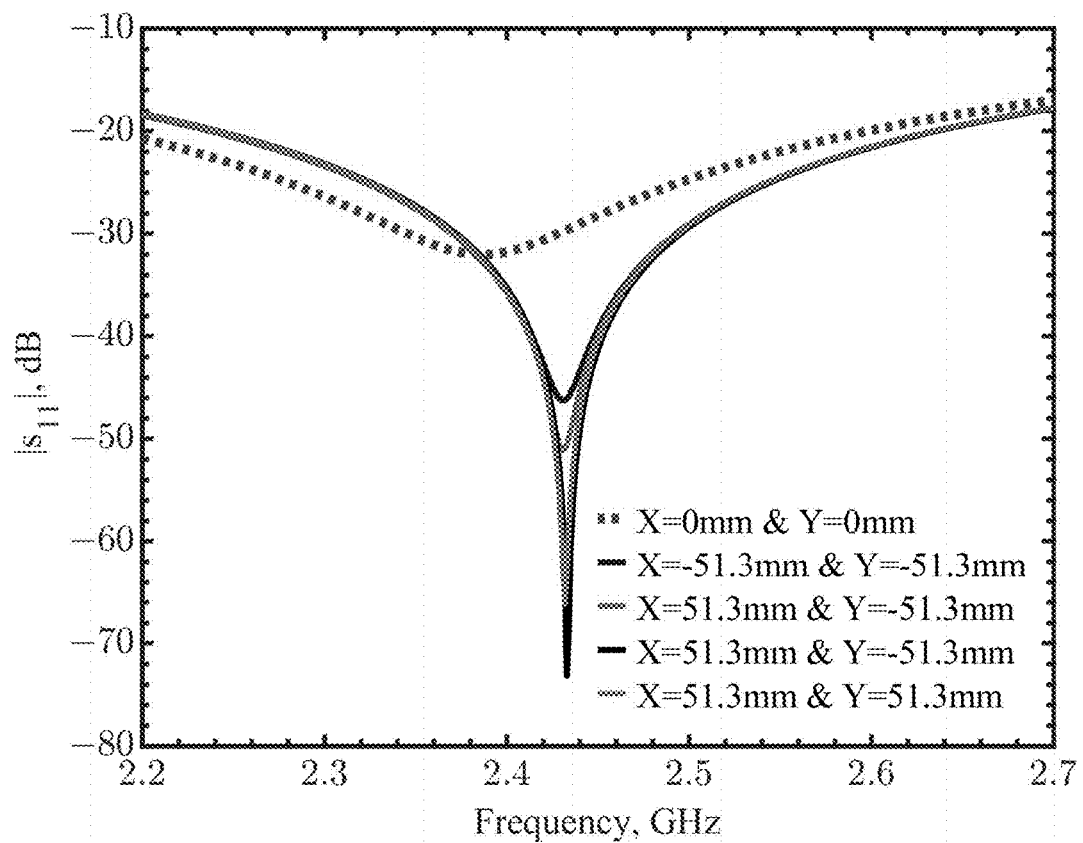
FIG. 6 shows a comparison of reflection coefficients at the center (dashed line) and four near corners (solid line); the tumor is at the center as (x=0, y=0).

FIG. 5A shows the heatmap of the resonant frequencies, which is represented in pixels with different color scales normalized from 2.387 to 2.443 GHz. It clearly shows that the location of the tumor is at (0, 0), where the resonant frequency is the minimum. The reflection coefficients in the pixels at the four corners of this scanned map are compared with the one in the center, as shown in FIG. 6. The spectral curves clearly indicate that the distinguish frequency shifts with or without a tumor underneath can be distinguished. Moreover, the magnitudes of reflection coefficients can further clarify the tumor's location. When a tumor is directly underneath, the effective permittivity variation makes the tuned loop become untuned, significantly changing $|s_{11}|$. FIG. 5B shows the heatmap generated from the magnitudes of reflection coefficients. The light-yellow pixel in the center with a reflection coefficient of −32 dB indicates the tumor's location, compared to the neighbor pixels with reflection coefficients of around −60 dB. The adjacent pixel and other pixels away from the center show magnitudes in the range of −40 to −50 dB. The increases in $|s_{11}|$ were likely due to the resonator field distributions making the heatmap look noisy.

Figures 7A, 7B:
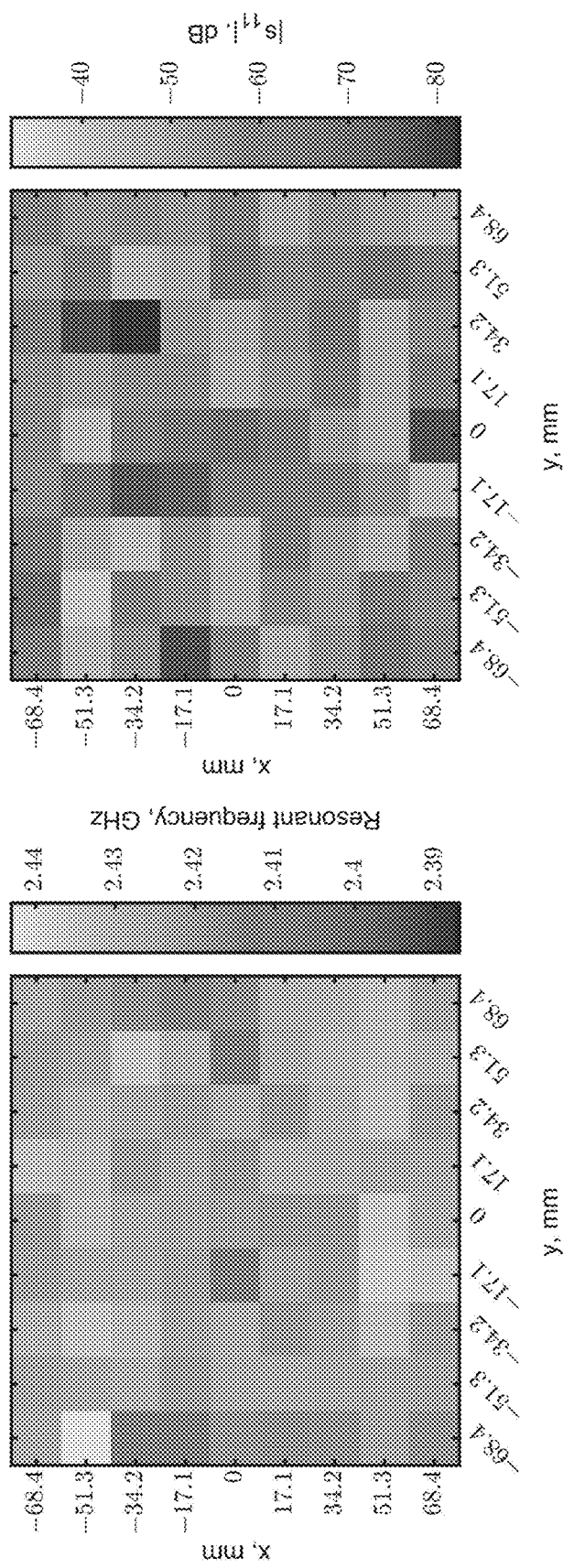
FIGS. 7A and 7B show localization maps generated from resonant frequencies (FIG. 7A) and reflection-coefficient magnitudes (FIG. 7B) for the case without a tumor, where the color scales are the same as the ones in FIGS. 5A and 5B.

A raster scan was performed with the same setup without a tumor. The heatmaps of resonant frequencies and reflection-coefficient magnitudes are shown in FIGS. 7A and 7B, using the same color scales as FIGS. 5A and 5B. Compare FIGS. 5A and 7A: no dark pixel was in FIG. 7A. Similarly, FIG. 5B shows clearly the center pixel with a higher reflection coefficient compared to other pixels in FIG. 5B and all pixels in FIG. 7B.

Weighted Image Synthesis

Figure 8A:
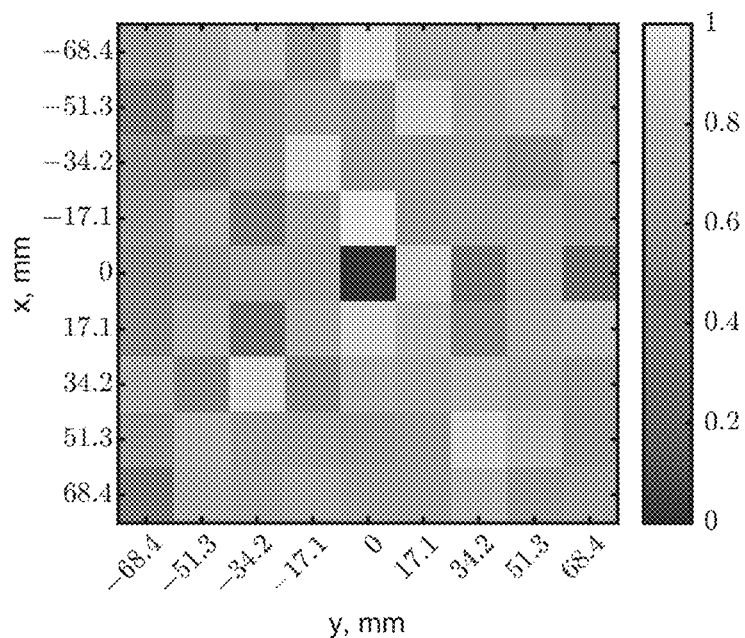
FIGS. 8A and 8B show normalized localization maps from resonant frequencies (FIG. 8A) and magnitudes of reflection coefficients (FIG. 8B), where the tumor is located in (x=0, y=0) at a depth of 10 mm, and the dark-blue pixel indicates the tumor's location.
Figure 8B:
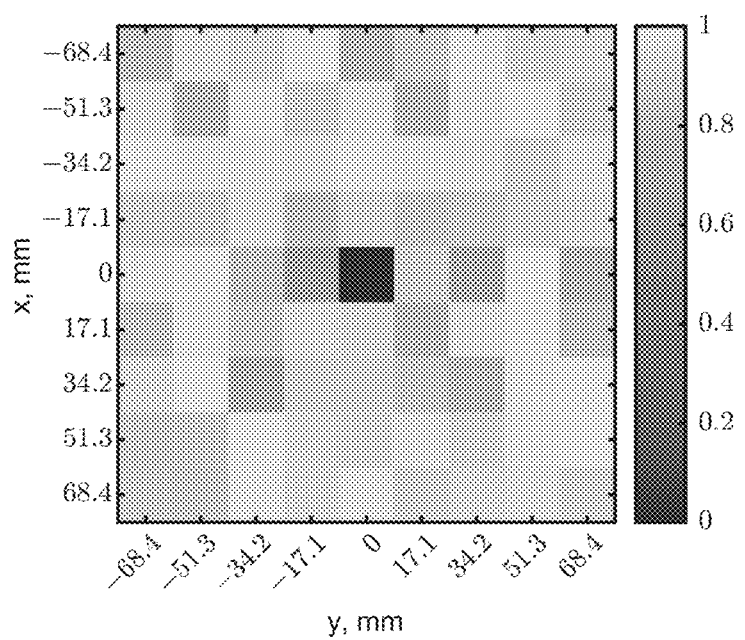

Unlike using only the frequency shift information in [39], the reflection-coefficient magnitudes may provide a second set of data to reconstruct the image. To combine these two sets of data, resonant frequencies and $|s_{11}|$ magnitudes (in ratio instead of dB) of each pixel were normalized to a range from zero to one by their minimal and maximal values in the map. In FIG. 5A, the resonant frequency decreased with the presence of a tumor at 10 mm depth, compared to other pixels with no tumor. Therefore, the center pixel became zero after normalization, as its resonant frequency was the lowest on the map. On the contrary, due to the detuned resonance, $|s_{11}|$ increased, as shown in FIG. 5B. The center pixel became closer to one after normalization because it has the largest value. A linear transformation converted the normalized $|s_{11}|$ map to match the indication in the resonant frequency map. FIGS. 8A and 8B show the normalized heatmaps of resonant frequency and $|s_{11}|$, respectively. The colors clearly indicate the tumor's location. However, FIGS. 8A and 8B show a special case with specific tumor size and depth. According to FIGS. 3A and 3B, resonant frequencies could increase when tumor sizes vary or at other depths, and reflection-coefficient magnitudes decrease compared to those without tumors. The same linear transformation is applied to the normalized resonant frequency map or $|s_{11}|$ map as one sees fit to have consistent scale maps.

Although to human eyes, the heatmaps in FIGS. 8A and 8B seem obvious and easily identify the tumor's location, comparing the heatmaps may be tedious and subjective if the images are noisy. We further fused the heatmaps together with a weighting factor. FIGS. 3A and 3B show that changes of $|s_{11}|$ are more sensitive than the resonant frequency shifts when a tumor is in a shallow depth above 14 mm. Additionally, as expected, $|s_{11}|$ images were found to become noisy, even when the deep tumor was directly underneath the sensor. The normalization further magnified the noises in $|s_{11}|$, making it difficult to recognize the tumor's location. A weighting factor W was applied to the normalized resonant frequency matrix $M_f$ and the $|s_{11}|$ matrix $M_r$ to construct a heatmap $M_s$ as:

$$M_s = M_f \times W + M_r \times (1 - W) \quad (1)$$

Figure 9:
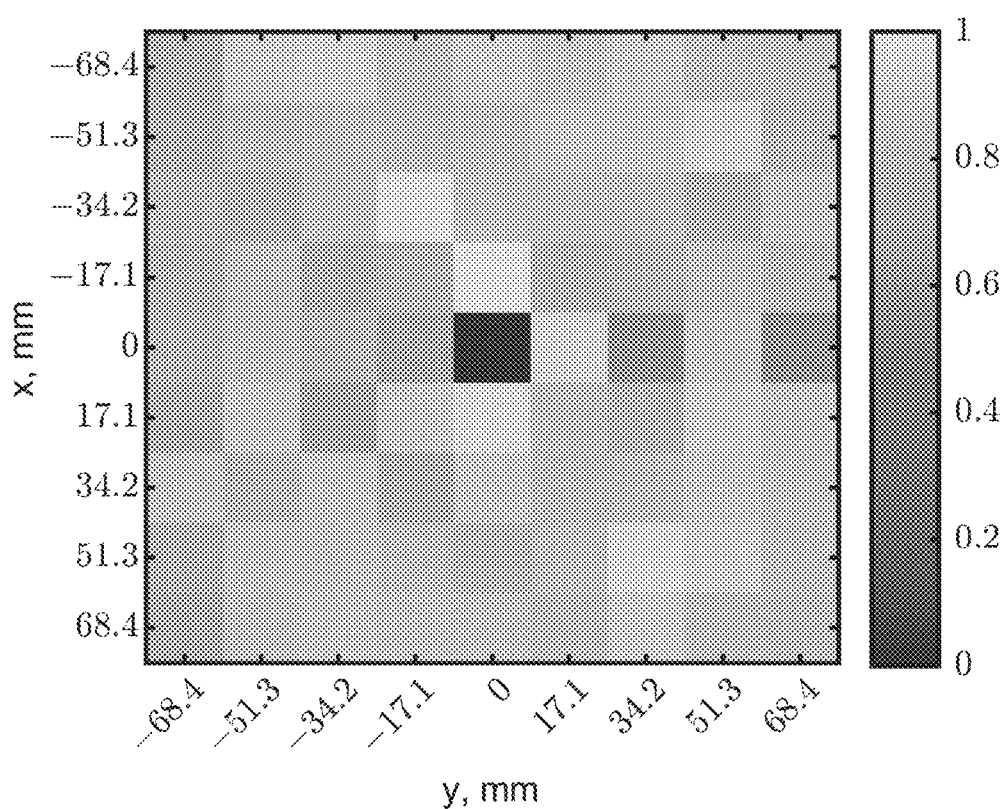
FIG. 9 shows a synthesized heatmap with a weight W=0.5 in the normalized resonant frequencies and $|s_{11}|$., where the dark-blue pixel indicates the tumor's location

The weighted images provide an option for evaluating the significance between resonant frequencies and the magnitudes of reflection coefficients at specific depth ranges. Due to the unknown and unpredictable electromagnetic field distributions inside the tissues, which are person-dependent and physiologically variable, the weighted images can help to highlight the contrasts. A proper W can enhance the image quality, and in return, increase the detection depth. W was set as 0.5 as the default and could be changed according to the image quality. FIG. 9 shows the constructed image with W=0.5. The dark pixel in the middle clearly shows the tumor's location. The pixel magnitude in the center had a scale of 0, and the eight neighbors had scales of 0.69-1. Compared to FIGS. 5A and 5B, the synthesized image has a better contrast for the pixel with a tumor underneath, and the single fused image provides a more convenient means for image recognition.

Figure 10A:
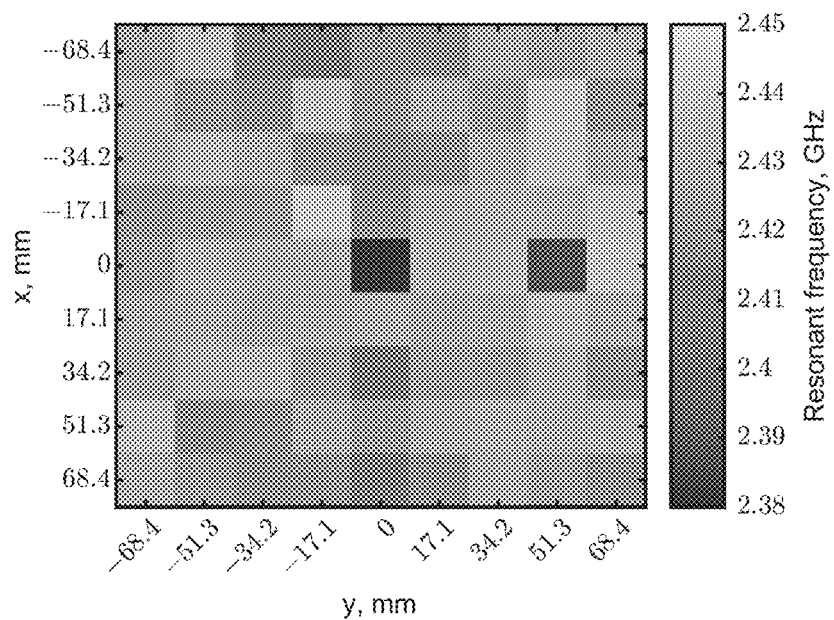
FIGS. 10A and 10B show heatmaps generated from reflection coefficients for two tumors at a depth=10 mm, where the tumors were located at (x, y)=(0, 0) and (0, 51.3).
Figure 10B:
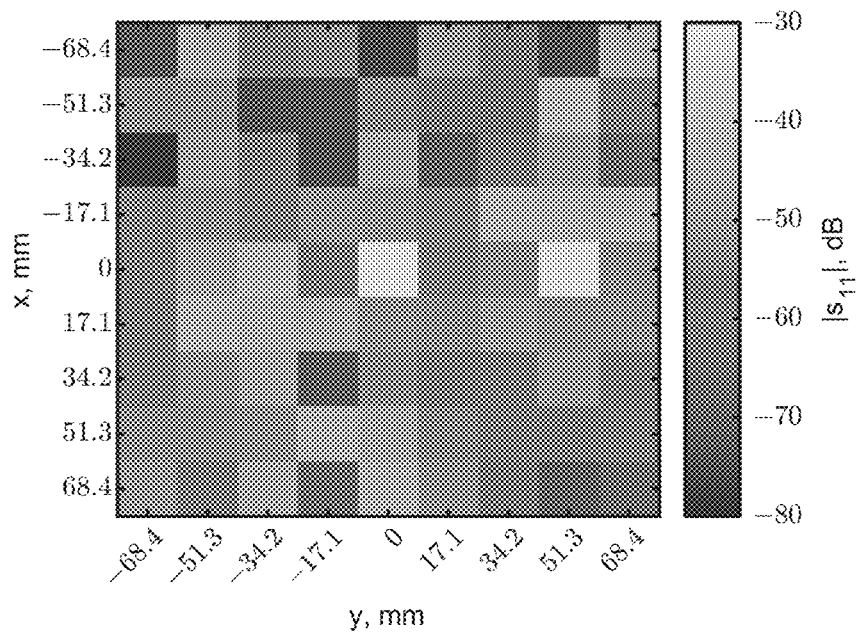
Figure 11:
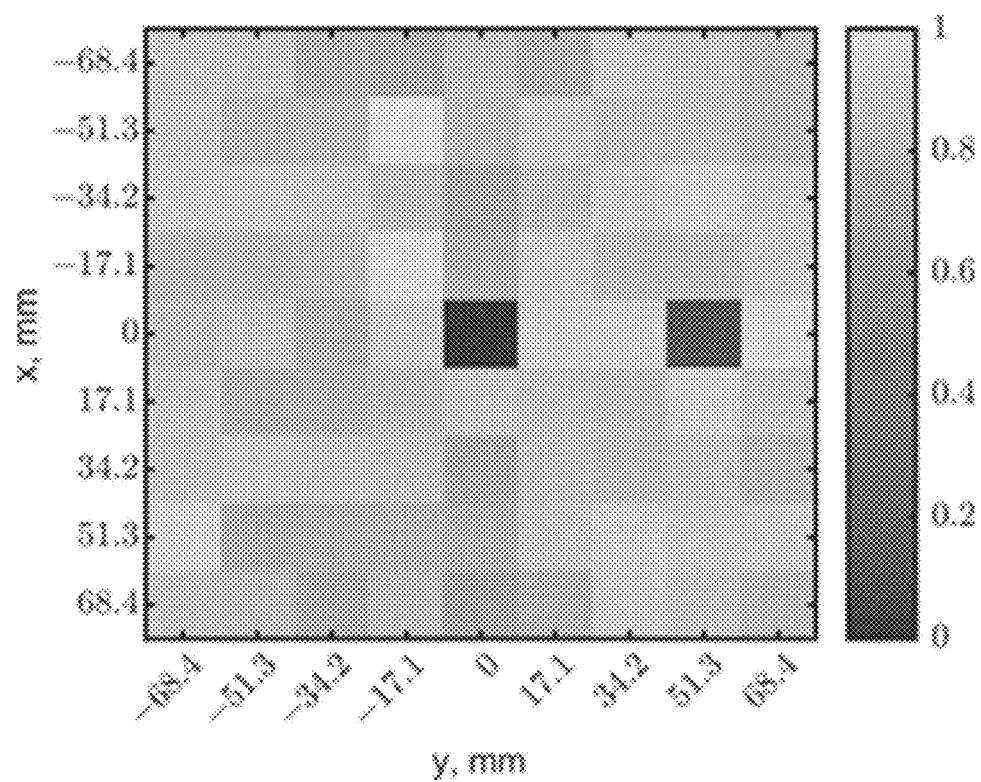
FIG. 11 shows a synthesized heatmap for two tumors at (x=0, y=0) and (x=0, y=51.3); the dark-blue pixels indicate the tumors' locations.

To test the method, two identical tumors with the same cubic dimensions were placed at (x, y)=(0, 0) and (0, 51.3), both at a depth of 10 mm. The same 2-dimensional raster was conducted with a 9×9-pixel resolution. FIGS. 10A and 10B show the heatmaps generated from the resonant frequencies and reflection-coefficient magnitudes, respectively. With the same approach implemented for FIG. 9, the resonant frequencies and reflection-coefficient magnitudes were normalized and then fused to create a 9×9 image. FIG. 11 shows the synthesized image with W=0.5. It clearly identifies the locations of two tumors in the dark pixels. Compared to the raw images in FIG. 10, the synthesized image has better contrasts, as expected, further validating the method.

Measurements

The tuned loop was fabricated on the flexible polyimide film (DuPont™ PYRALUX® FR9220R). The metal pattern was etched after photolithography was applied with a photomask on the photoresist-covered film. FIG. 1B shows a photo of the fabricated resonator. The parameters and dimensions in the fabricated devices are identical to those in simulations. The resonator was connected with a 50-22 adaptor to a vector network analyzer (Keysight PNA N5227B).

Figure 12A:
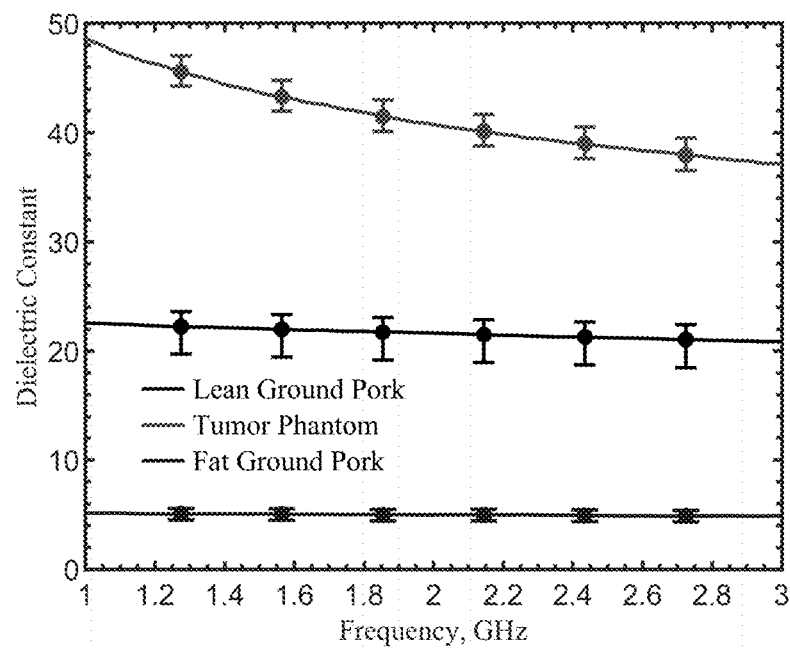
FIGS. 12A and 12B show measurements of dielectric constant (FIG. 12A) and conductivity (FIG. 12B) for lean ground pork, tumor phantom, and fat ground pork, which mimic the breast skin, normal breast tissue, and breast tumor in experiments, where the error bars were obtained from 5 measurements with respect to averaged values.
Figure 12B:
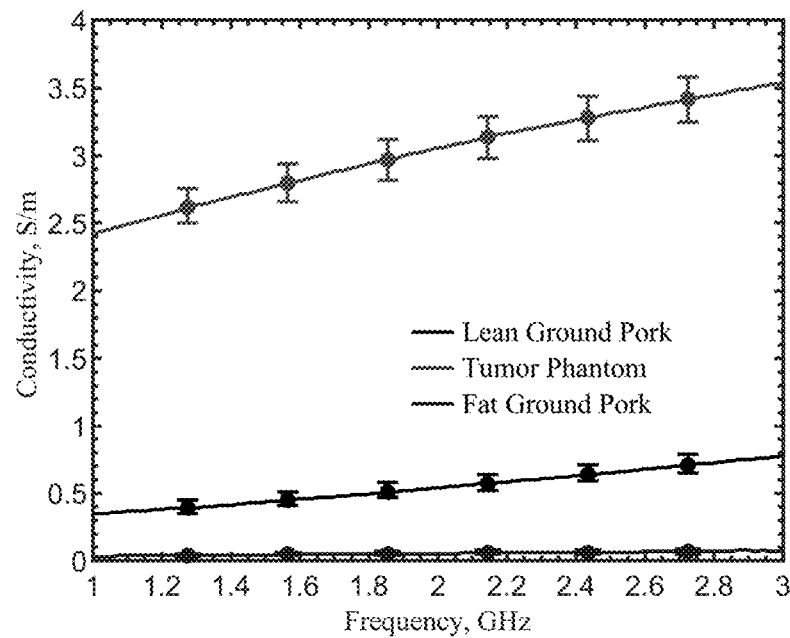
Figures 13A, 13B:
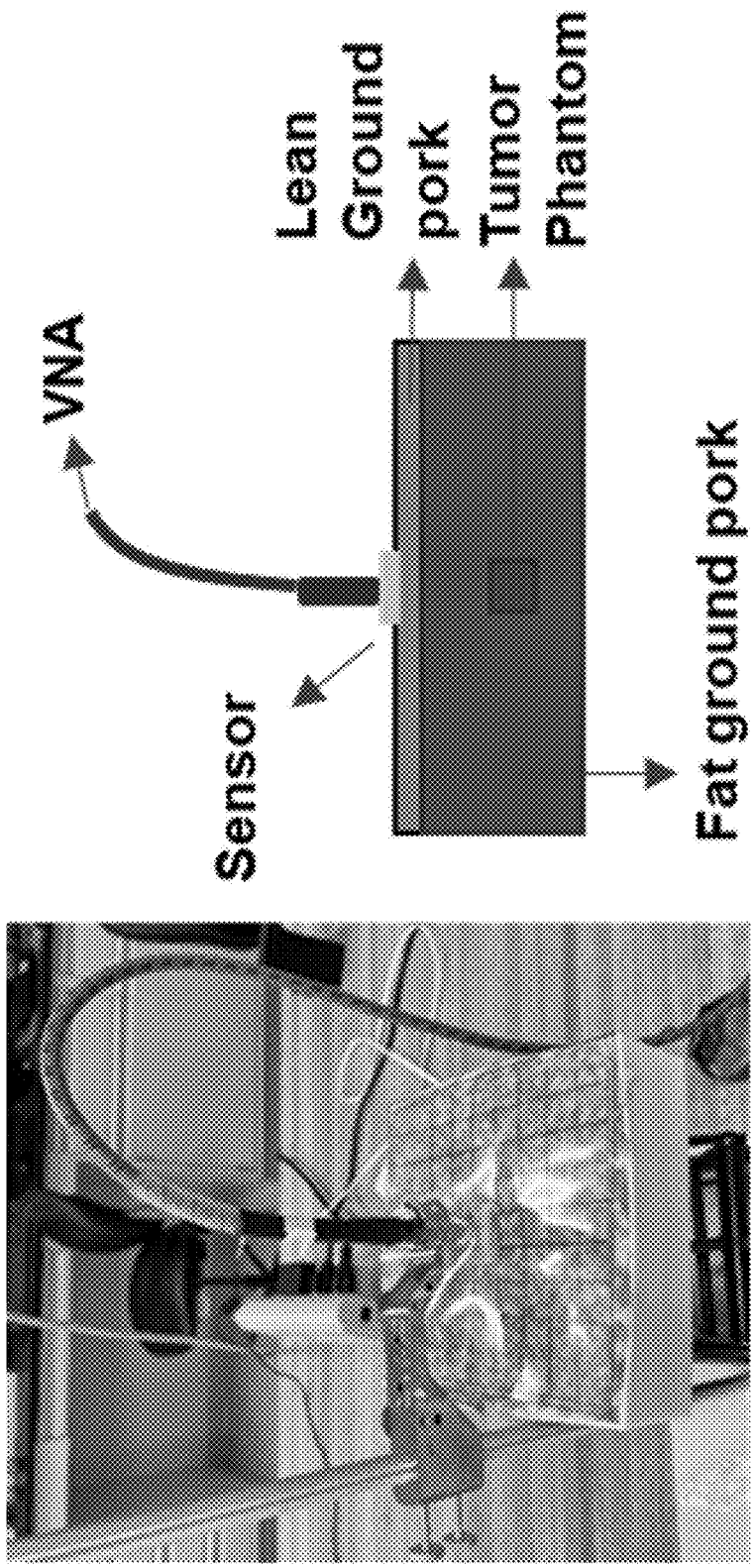
FIGS. 13A and 13B show the setup of the subcutaneous imaging experiments.
Figure 14:
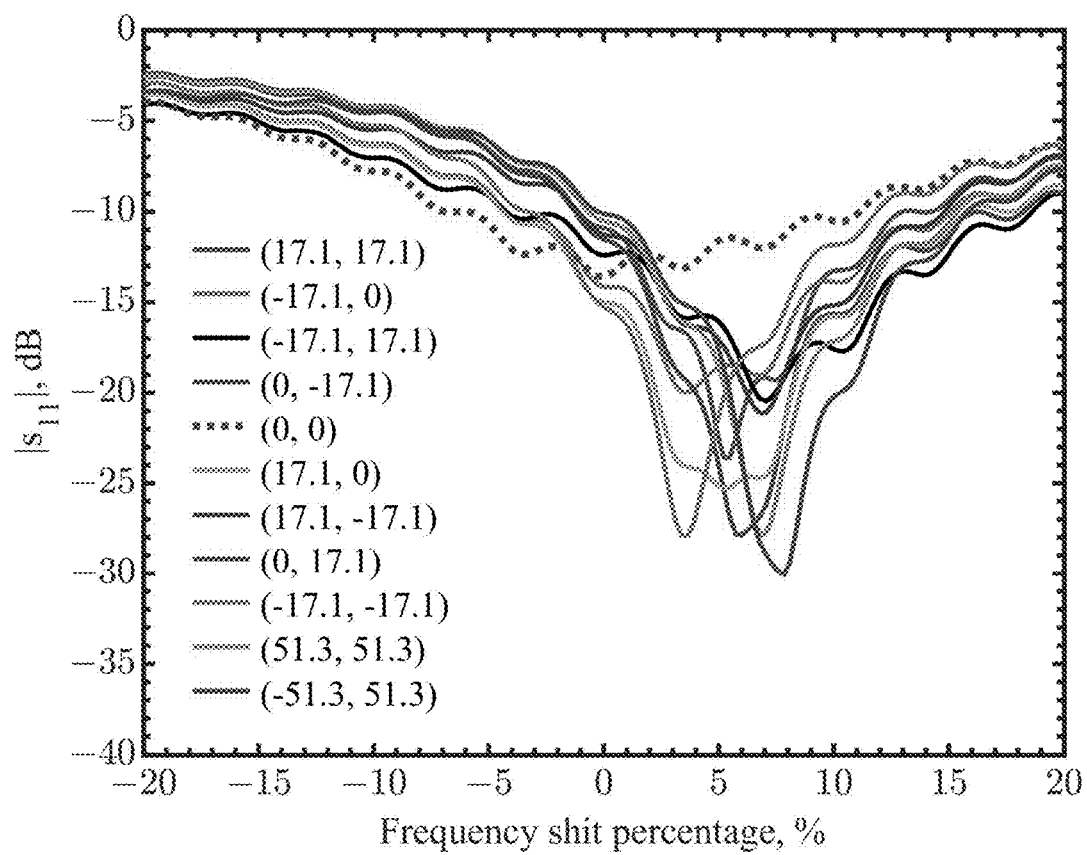
FIG. 14 shows a comparison of normalized frequency shifts in measurements at the center (dashed line), the neighbor pixels, and two pixels at the corners (solid lines), where the pixel location is indicated as (x, y) on the map, and the tumor is at the center as (0, 0).

In the literature, there are some discrepancies in dielectric properties. Generally speaking, high dielectric contrasts were found between malignant tissues and normal tissues [16,43-49]. However, a high contrast was observed between malignant tissues and adipose-dominated tissues, up to a 10:1 ratio, but it became much lower between malignant tissues and fibroconnective/glandular tissues, which have high water content [44]. Therefore, it should be noted that a high-contrast tumor phantom model was chosen, mimicking the specific adipose-dominated cases mentioned in the literature, to validate the concept and detection feasibility. Ground pork mixed with fat and lean ground pork was used to mimic breast tissues and skin. Artificial silicone- and carbon-based materials [14], mixed to reach targeted permittivities, were selected to mimic the documented tumor dielectric properties in simulation. Dielectric properties measurements for these phantom tissues were conducted using a coaxial probe kit (Keysight N1501A). The measured dielectric constants and conductivities are shown in FIGS. 12A and 12B. Each dataset with the error bars was obtained from five measurements at five locations, with spacing at least 5 cm apart to avoid sensing overlapped volumes [50]. Average values were then obtained. Discrepancies were observed between the measurements in phantoms and the simulations that utilized the documented dielectric parameters [16,43-46]. This was expected because the documented dielectric parameters in the literature were obtained from tissues removed from the human body, in small volumes and with loss of water. The contrasts in dielectric properties between normal and malignant tissues, however, were kept consistent with the phantoms used. The phantom materials were packed into a cubic box of $19 \times 19 \times 12$ cm$^3$ to mimic the body part. The measurement configuration was the same as the one in the simulations. FIGS. 13A and 13B show the measurement setup. The tumor cube was inserted at the center point (0, 0) at a depth of 10 mm. The phantom sides were protected from water evaporation. The sensor scanned the phantom surface with a step spacing of 17.1 mm. The results of the 3×3 pixels in the center were compared with the two pixels at the corners (51.3, 51.3) and (−51.3, 51.3) of the phantom in FIG. 14. The frequencies were normalized by the resonant frequency at the center point (0, 0), showing shifts of about 3.66-6.79% for the neighbor pixels and 7.05-7.83% for the two corner pixels that did not have a tumor underneath. The ripples in the frequency spectrum were likely due to the standing waves between the sensor adaptor and the skin, as applied pressures on the cable changed the ripple magnitudes.

Figure 15:
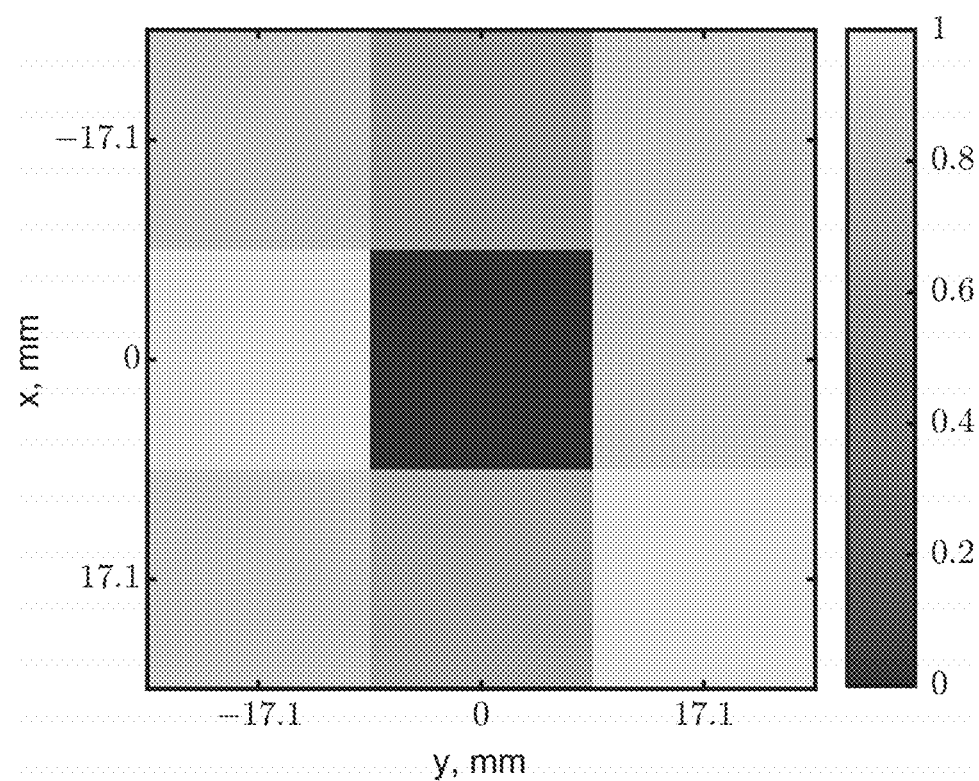
FIG. 15 shows a heatmap from measurements with a tumor of 17.13 mm$^3$ located at (0, 0) with a depth of 10 mm.

Frequency shifts and reflection-coefficient magnitudes were normalized, and their maps were fused with the aforementioned method. FIG. 15 shows the synthesized heatmap with a weighting factor of 0.5. The tumor's location was clearly identified. Other pixels outside the 3×3 pixels are similar to the surrounding pixels, so they are not shown. The eight neighbor pixels had both resonant frequencies and reflection-coefficient magnitudes different from the center pixel where the rumor located, shown with the spectral curves in FIG. 14. The normalization and fusion of both maps further enhanced the image, as the center close to the scale zero and other pixels above 0.6. Simulation and measurement results match well, and they validate the imaging method of a raster scan using the tuned loop resonator.

Phased Array Loops
Design and Validation

Figure 16A:
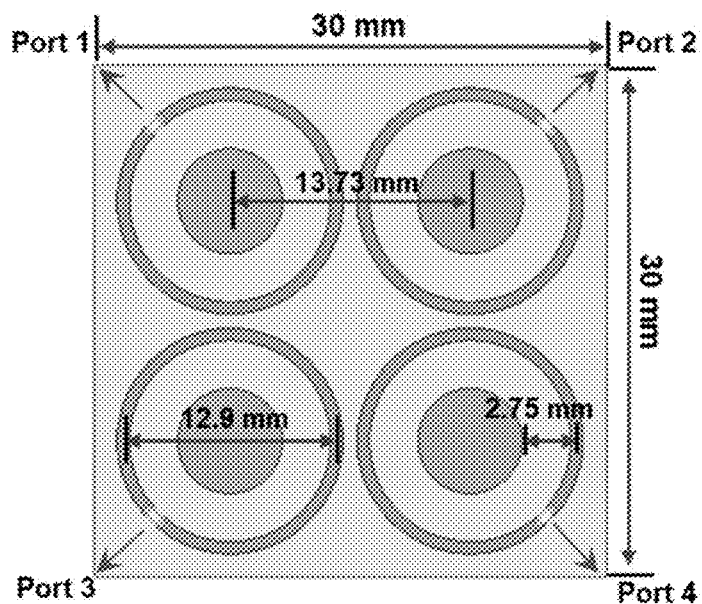
FIG. 16A shows phased array loop structure consisting of four tuned loops in a mirrored configuration; the phase difference was 180° between the neighbor elements.
Figure 16B:
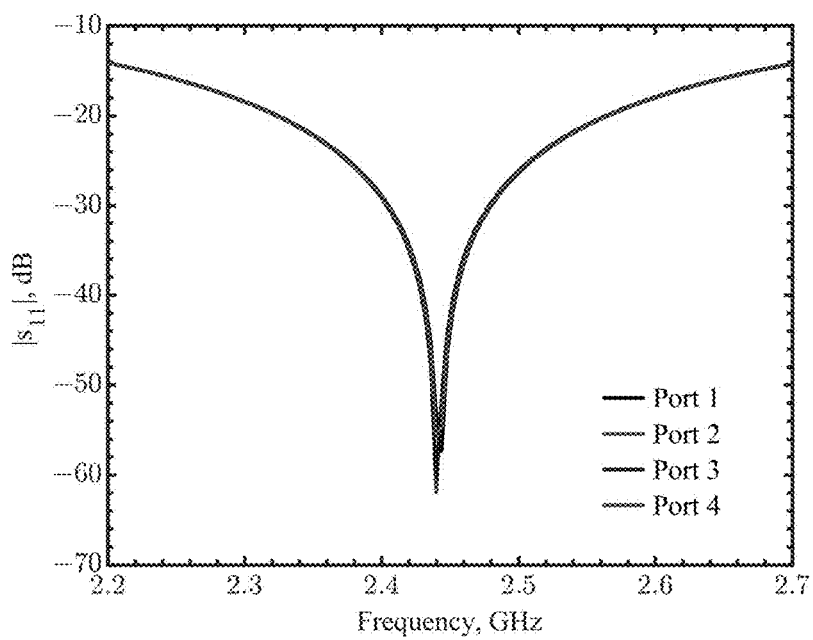
FIG. 16B shows simulations of reflection coefficients for ports 1~4 in the tuned phased loop array.

Typical normal and nonlactating female human breast tissue thickness is around 50 mm [51-53]. Nearly 50% of breast tumors occur in the quadrant close to the armpit [54], where the thickness of the breast is less than 25 mm. Considering a mildly compressed breast spanning between the skin surface and rib cage, the sensor needs to be able to detect a depth of at least 30 mm. To increase the field depth, four tuned loops were placed in a 2×2 array with a mirrored configuration to form better field coverage in the tissues. The spacing between the loop centers was 13.73 mm, and the ports faced outward, as shown in FIG. 16A. The radius b for each loop was 6.1 mm with a tuning gap spacing d=2.75 mm. Four 50-02 lumped ports had a phase difference of 180° between the neighbor elements. FIG. 16B shows the resonance in these four ports at 2.44 GHz. The quality factor, defined as the center frequency divided by the 3-dB bandwidth, was 152.5.

Figures 17A, 17B:
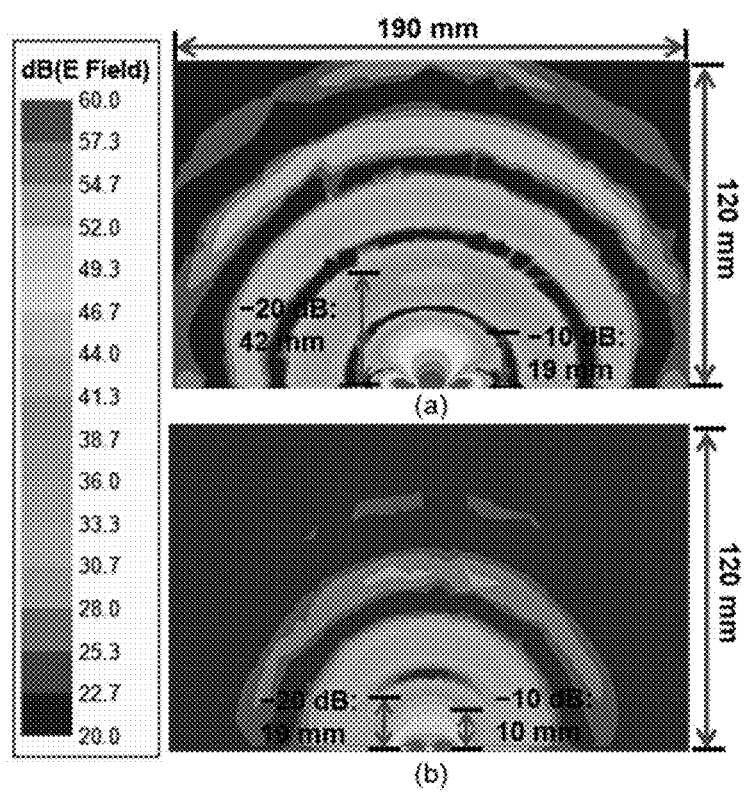
FIGS. 17A and 17B shows electric fields in the vertical cross-section plane into the tissue for the tuned phased loop array (FIG. 17A) and the single tuned loop resonator (FIG. 17B).

In the tuned-loop-array configuration, the combined electrical fields penetrate deeper into the tissues. The field distribution in a 2D cross-section inside the tissue is shown in FIG. 17A, compared to the fields in the same plane for a single-tuned-loop resonator in FIG. 17B. With higher intensities of electric fields, the effective permittivity experienced by the resonator has a more pronounced effect on the resonance. This effect makes the object at the same depth contribute more to the effective permittivity, so it can help sense a smaller size of the tumor. The dielectric property at a deeper depth also has more impact on the effective permittivity because the fields reach deeper. Comparing the field distributions, the −10-dB and −20-dB attenuation depths increased from 10 and 19 mm to 19 and 42 mm for the arrayed configuration, respectively. A raster scan was conducted for a tumor of 17.13 mm$^3$ at a depth of 50 mm. The tumor dimensions were the same as the ones in previous simulations with a single loop for comparison. The pixel size was set as 30×30 mm$^2$, the same as the dimensions of the array substrate. In each scan, the resonant frequencies and reflection-coefficient magnitudes at ports 1~4 were averaged first before normalization. Then, the fused image matrix was obtained with Equation (2), where I=1-4 for the specific port:

$$M_s = \frac{1}{4}\sum M_{fI} \times W + \frac{1}{4}\sum M_{rI} \times (1-W) \qquad (2)$$

Figure 18:
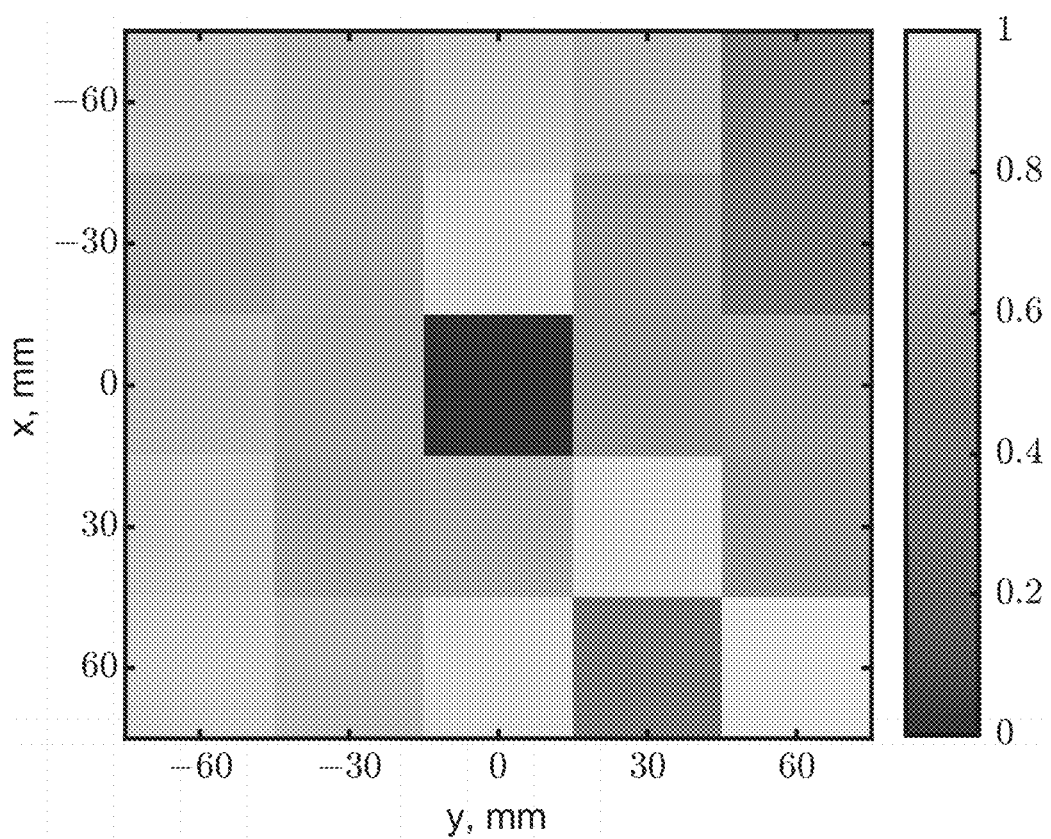
FIG. 18 shows a heatmap by the tuned phased loop array, where the tumor was placed at (0, 0) with a depth of 50 mm and had a size of 17.13 mm$^3$, and the dark-blue pixel indicates the tumor's location.

FIG. 18 shows the fused heatmap with 5×5 pixels from the normalized resonant frequencies and reflection-coefficient magnitudes with a weighting factor of 0.5. The dark pixel clearly identifies the tumor's location in FIG. 18. With the same tumor and weighting factor, the array can detect the tumor at a depth of 50 mm, compared to the 25 mm depth by a single loop.

Figure 19A:
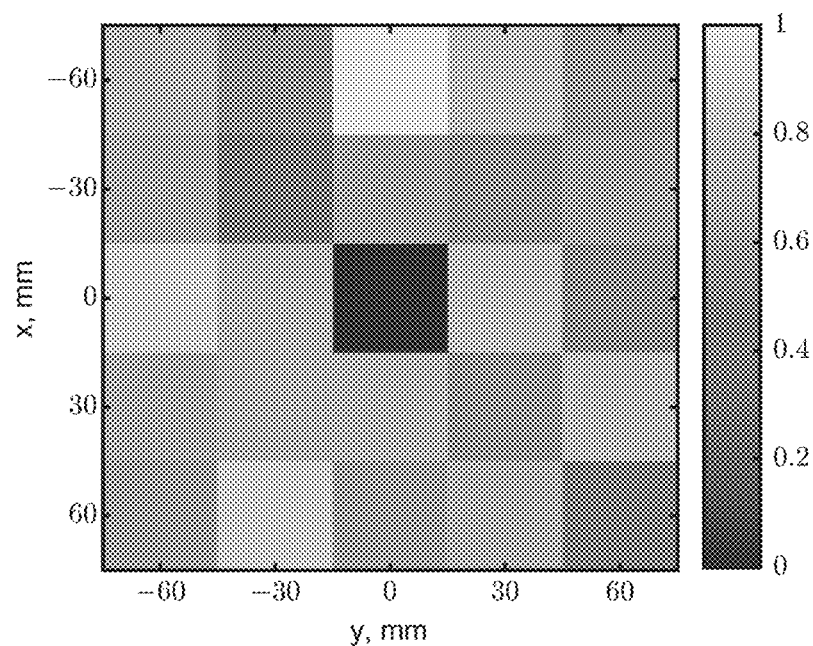
FIGS. 19A and 19B show a heatmaps by the tuned phased loop array with different raster step sizes of 30 mm (FIG. 19A) and 10 mm (FIG. 19B), where the tumor was placed in (0, 0) at a depth of 25 mm and had a smaller size of 103 mm$^3$, and the dark-blue pixels indicate the tumor's locations.
Figure 19B:
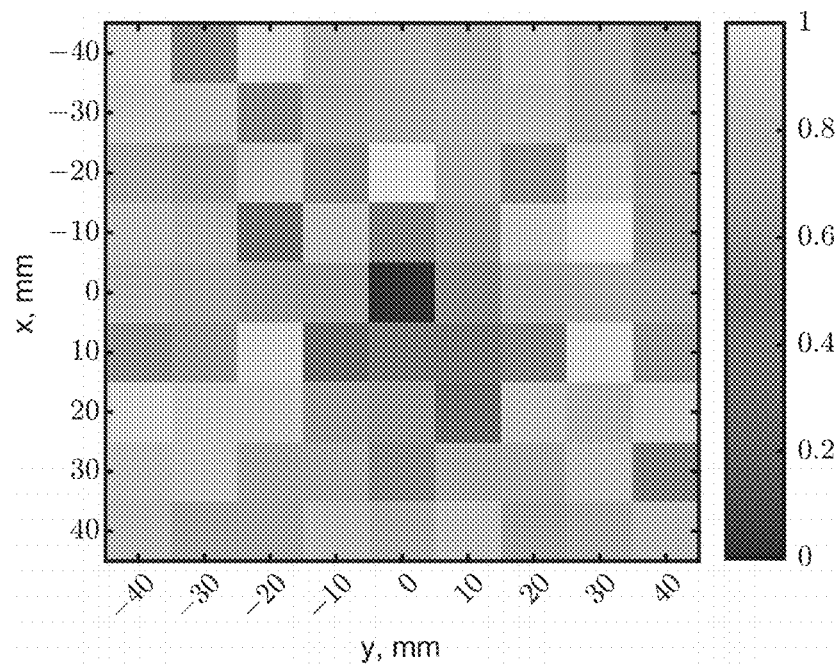

To test the ability to sense a smaller tumor, another raster scan was conducted with a tumor of 10×10×10 mm$^3$ at a depth of 25 mm. The raster scan had a step of 30 mm. FIG. 19A shows the fused heatmap and correctly indicates the tumor's location. To identify the tumor size, an oversampling scan was repeated with a scan step of 10 mm. The dark pixel clearly indicates the tumor's location with a better resolution of the tumor size, as shown in the 9×9-pixel fused heatmap of FIG. 19B. This shows that the array can be used, similarly to the principles of synthetic aperture radar [55], with oversampling techniques and related image processing algorithms to increase spatial resolutions at a deeper depth in tissues.

Radiation Direction Steering

Figures 20A, 20B:
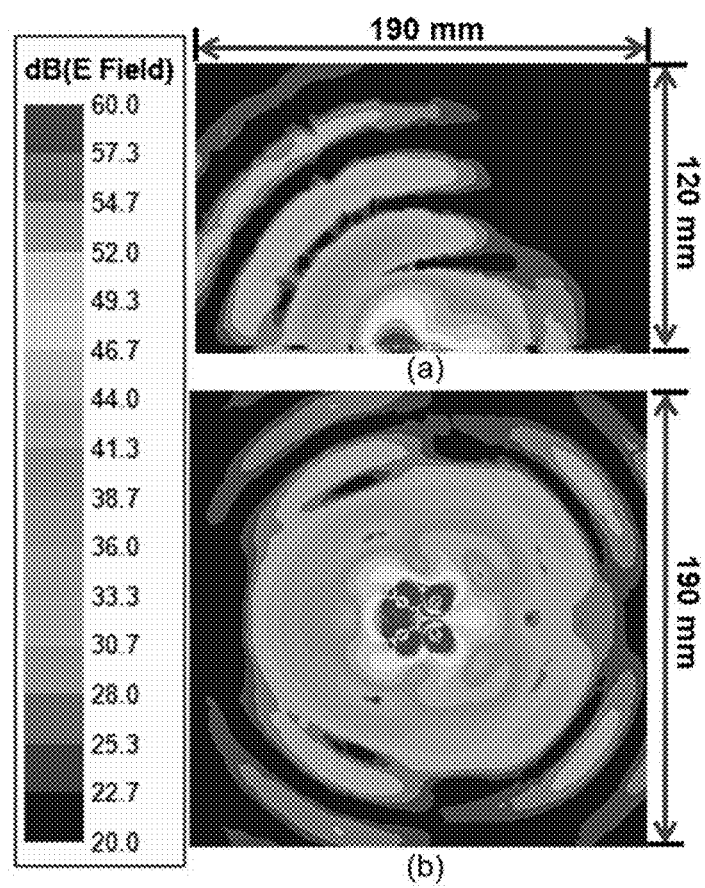
FIGS. 20A and 20B show cross-sections of electric field distributions of the tuned phased array loop resonator with a phase difference of 90°.

In the loop array structure, the phase difference was fixed at 180°, which concentrated the electric fields and penetrated deeper into tissues underneath the center of the array. In the finite-element simulations, the inventors found that the radiation direction of the electrical field could be steered with different phase shifts. For instance, the electric fields radiated in a certain direction when the phase difference of 90° between adjacent loops was set, shown in the cross-section and top views of FIGS. 20A and 20B. This feature suggests that the phased loop array can change the sensing area without physically moving its location. The change in field distributions in a certain direction highlights the contribution of tissue permittivities in the effective permittivity experienced by the resonator.

Figure 21A:
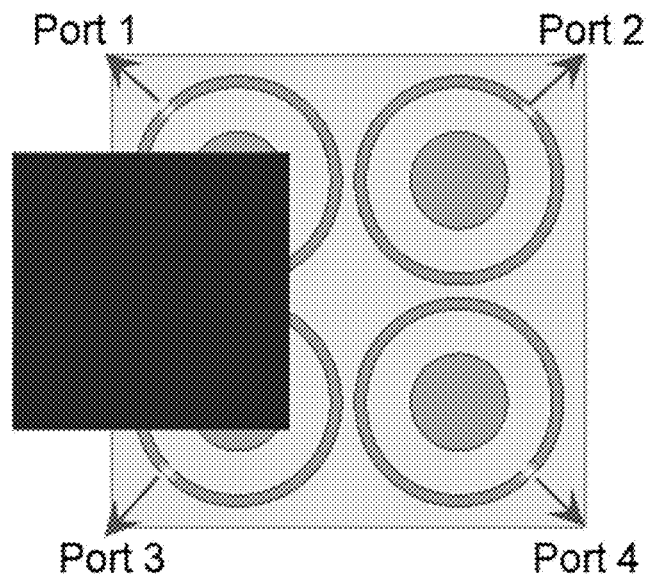
FIG. 21A shows a setup to investigate the impact of steered fields by changing the phase difference in the array, where a tumor was placed off-center, symmetrically but partly underneath loops 1 and 3 at a depth of 10 mm.
Figure 21B:
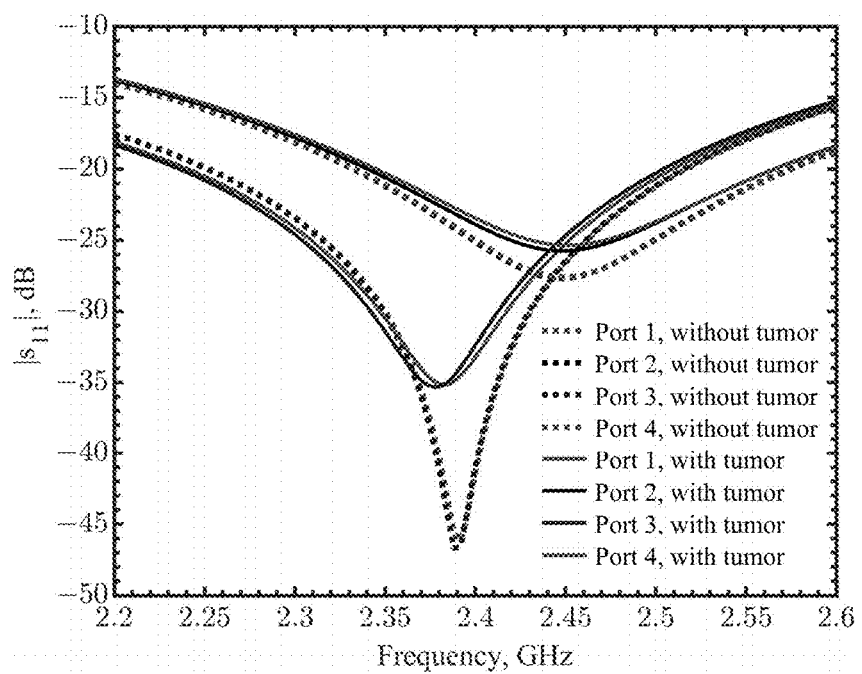
FIG. 21B shows a comparison of reflection coefficients at ports with and without a tumor underneath the array.

For verification, simulations with and without a tumor underneath the skin were conducted using the phased array with a phase shift of 90°. Dashed and solid lines indicate two sets of resonance in four ports, shown in FIG. 21B. Without a tumor, a frequency shift of 56 MHz between ports 1 and 3 and ports 2 and 4 was observed. The same phenomenon can be found in due to the field coupling between adjacent metal patterns. When the field distributions are changed, steered in this case underneath ports 1 and 3, the distributed capacitance and mutual inductance inevitably affect the resonances in the loops. From FIG. 20, the field distribution changes occur similarly to ports 1 and 3. Ports 2 and 4 also experience the opposite changes. Ports 1 and 3 have stronger field coverages compared to ports 2 or 4, presenting more effects on the effective permittivities of ports 1 and 3. As a result, the resonance frequency shifts by 56 MHz in these two ports. A tumor of 17.13 mm$^3$ was placed off-center, symmetrically but partly covering loops 1 and 3, at a depth of 10 mm, as shown in FIG. 21A. The solid curves in FIG. 21B show the frequency shifts in ports 1 and 3 from 2.392 to 2.378 GHz, with $|s_{11}|$ changed from −46.5 to −35.3 dB, while the reflection coefficients for ports 2 and 4 nearly stay the same. The noticeable frequency shifts and $|s_{11}|$ magnitude changes can be used to indicate the presence of the tumor in a specified direction under the skin. Without moving the arrayed sensors, nearby areas can be scanned with phase changes in ports to highlight the direction or area of interest before a finer-resolution scan to find the tumor size and depth.

Figure 22A:
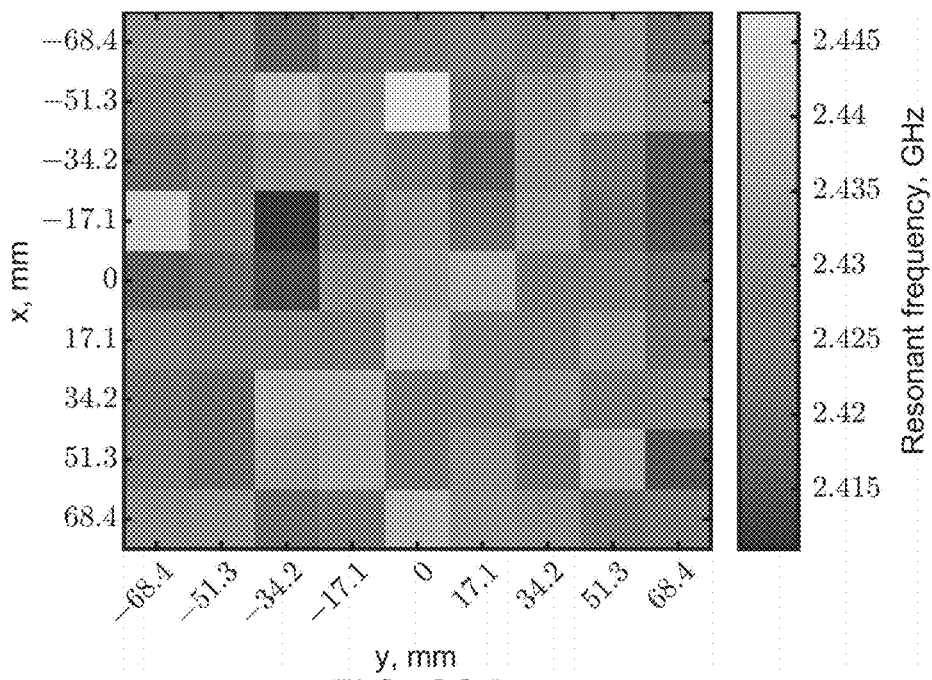
FIGS. 22A and 22B show heatmaps generated from reflection coefficients for a tumor at a depth=15 mm, where the tumor was located at (x=0, y=0).
Figure 22B:
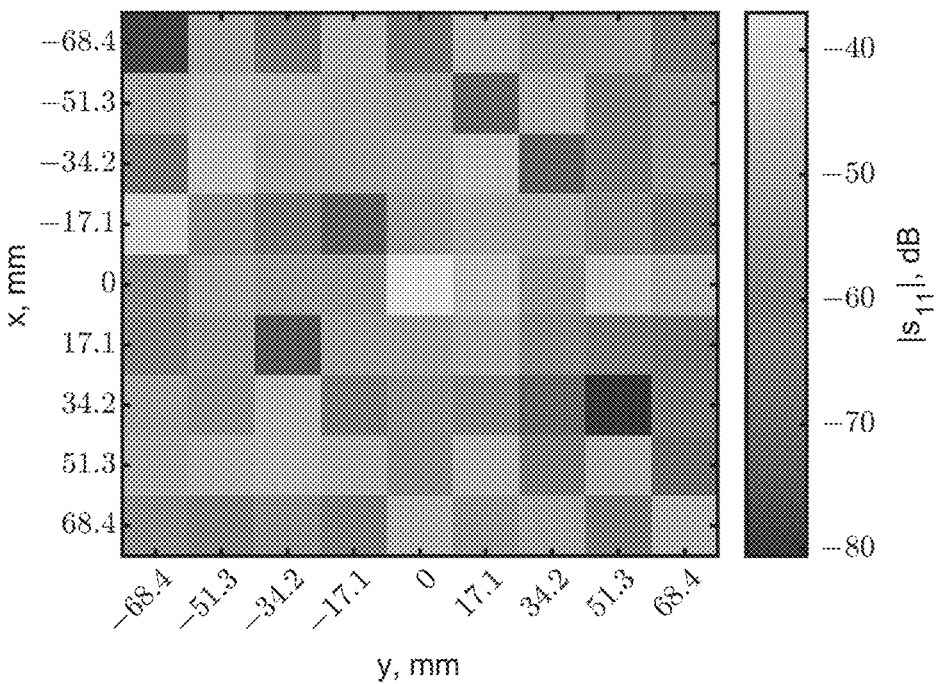
Figure 23:
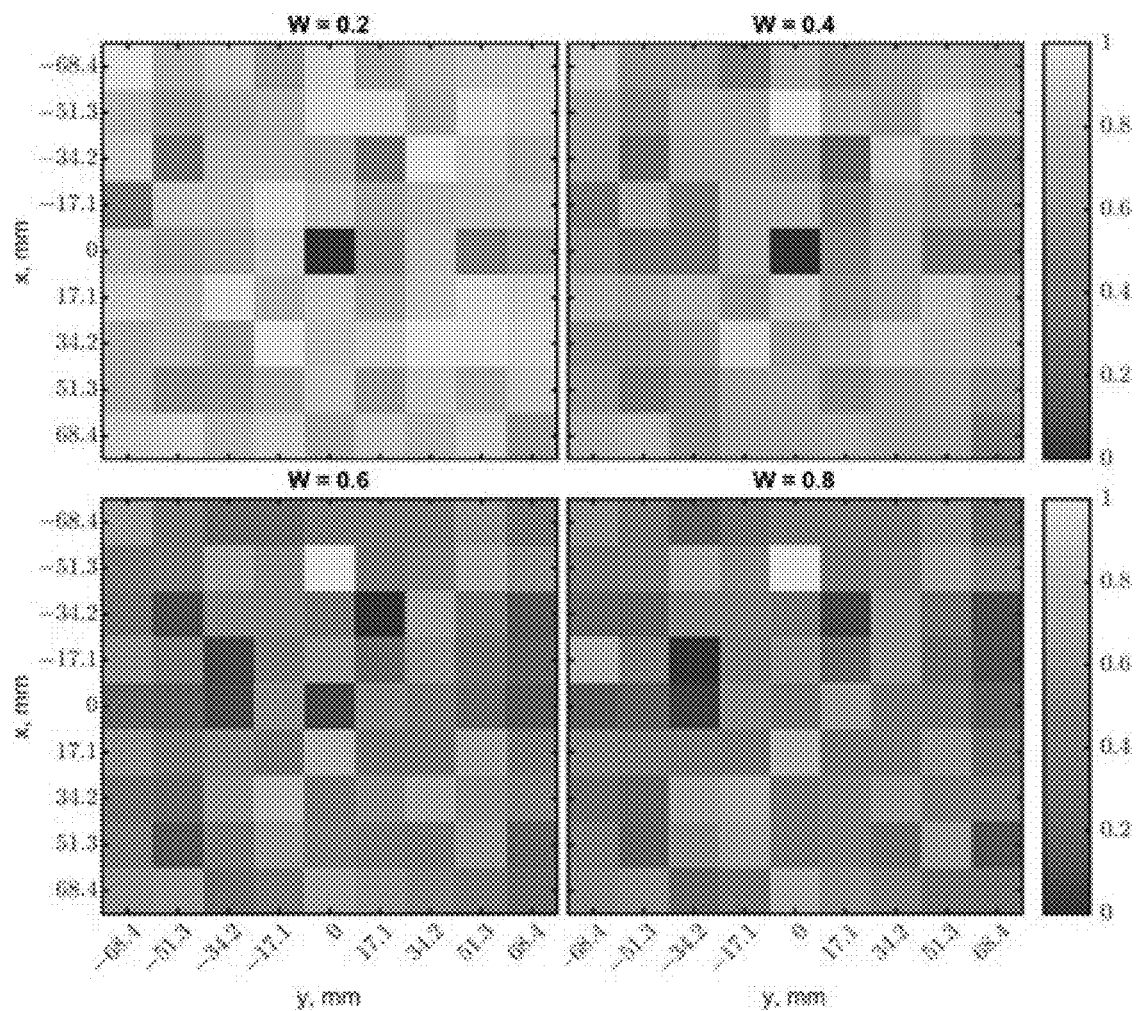
FIG. 23 shows heatmaps fused with normalized results in FIGS. 22A and 22B and with different weighting factors W of 0.2, 0.4, 0.6, and 0.8.
Figure 24:
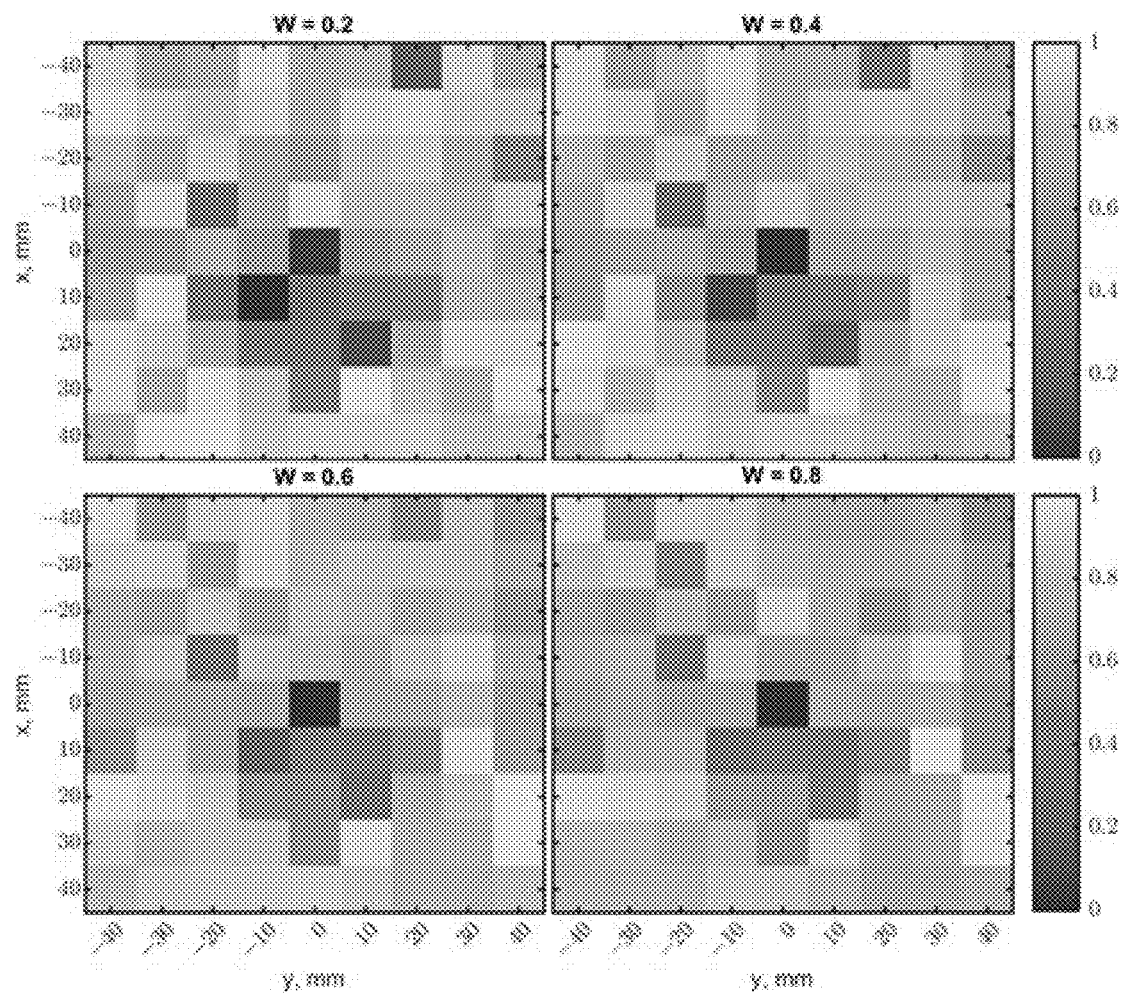
FIG. 24 shows heatmaps fused from the results in FIGS. 19A and 19B with different weighting factors W of 0.2, 0.4, 0.6, and 0.8; the case of W=0.8 produces a better contrast with which to locate the tumor.

The weight factor W was fixed at 0.5 as a default for both the single loop and loop array, providing performance comparison with different variables. However, a proper W can increase the image quality and detection depth by enhancing contrasts. To demonstrate this idea, raster-scan simulations were conducted with a tumor of 17.13 mm$^3$ placed at (0, 0) at a depth of 15 mm. FIG. 22A shows the heatmap generated from the resonant frequencies. The scanning result was blurry with noises. The heatmap of $|s_{11}|$ shows a better ability to identify the tumor's location in FIG. 22B, but the image still looks fuzzy. Similarly, FIG. 3 shows that $|s_{11}|$ changes are distinguishable at a depth range of 13-15 mm, and it is not easy to identify the locations with their resonant frequencies. In such a case, normalized a $|s_{11}|$ matrix $M_r$ should be emphasized to make the fused image $M_s$ have better contrast for location detection. FIG. 23 shows fused images with weight factors W of 0.2, 0.4, 0.6, and 0.8. The tumor's location becomes more evident with W=0.2. On the contrary, based on the results in FIG. 19B, when different weight factors W from 0.2 to 0.8 were applied, as shown in FIG. 24, the tumor's location became more apparent with a weighting factor W of 0.8. In practical scenarios, tumor size and depth are unknown, so multiple heatmaps with a range of weighting factors should be generated to find the image with the best contrast. An algorithm for the automation of image generation and classification will be investigated as the next step.

The purpose of this work was to demonstrate the principle and feasibility of utilizing a flexible radio-frequency resonator that provides convenience and comfort as a first-step, quick screening tool to detect abnormal tissues within the skin, noninvasively. The method is different from microwave radar-based and microwave-acoustic imagers that are under research and serves a different purpose. Some assumptions were made in this stage of concept validation. The simulation and measurement models were simplified in order to exclude interference elements in the studies and compare scenarios directly, including pixel sizes and tumor sizes/shapes. Specific fibroglandular tissues were excluded. Fibroglandular tissues consist of fibrous connective tissues; functional glandular tissues, such as milk glands and ducts; and fatty tissues. The compositions of fibroglandular tissues and their densities are related to the risk of breast cancer occurrences [56,57] and should be considered in clinical imaging. In this study, the inventors chose the high-dielectric-contrast cases between malignant and normal adipose-dominated tissues with the assumption of dielectric constants of 6 and 59 (from [16,43-49], close to the 1:10 contrast observed in [14,44,50]) for normal and tumor tissues, along with their corresponding conductivities of 0.13 and 2.8 S/m to illustrate the principle of noninvasive detection and imaging. According to [50], the contrast ratios of dielectric constants and conductivities between normal and cancer tissues were 63:8 and 4:0.5 at 2 GHz, respectively. The results agreed with those in [44], as the biopsy samples of normal tissues were predominantly adipose tissues with low water content. However, the dielectric constants and conductivities were found to be only 17.5% and 16.2% higher than those in mammary gland tissues at 1.6 GHz [51]. Discrepancies in dielectric properties in biopsy samples were likely due to the volume fractions of cancer cells in the excised tumors, according to [43,51]. When comparing malignant tissues to fibroconnective and glandular tissues that have high water content, their contrasts may dramatically decrease. Therefore, in the next steps, incorporating different compositions of fibroglandular tissues within the models will be investigated by varying the contrast ratios.

In this work, the inventors demonstrated a new nondestructive evaluation (NDE) method using a tuned radio-frequency resonant loop that can conform to the skin to detect tissue-effective permittivity variations under the skin. The detection of breast tumors was selected to demonstrate the concept of subcutaneous sensing. Tissue-mimicking materials and ground pork, with similar dielectric properties to normal and tumor tissues, were used in phantoms for simulations and measurements. Simulations and corresponding measurements verified the feasibility of noninvasive sensing. It was shown that electromagnetic fields were altered in the presence of a tumor phantom due to the high contrast between the tumor and normal breast tissues. The high-quality-factor resonance was able to detect the abnormity. A construction method of fused images from the heatmaps of normalized resonant frequencies and magnitudes of reflection coefficients was introduced. The fused heatmaps highlight the boundaries of the tumor images with a weighting factor. A tuned array of four loops was developed to provide better spatial resolutions to recognize deeper or smaller tumors. Preliminary studies showed its feasibility.

Additionally, by varying phase shifts among resonators, distributions of electromagnetic fields can be modified without moving the sensor and provide a means to scan electrically to identify the area of interest. The tumor's location and size in the area of interest then can be better identified with oversampling scans. The synthesized images further emphasize the contrast of the image. This work mainly focused on validating the feasibility of subcutaneous tumor imaging. The tumor's sizes were set up to be close to the sensor's dimensions for the purposes of illustration and demonstration. The tumor's sizes may have been relatively larger than the tumors of interest in the realistic cases. Therefore, future works will focus on exploring the sensing capability for smaller tumors. Moreover, potential methods to improve the spatial resolution, such as reducing loop dimensions at a higher operating frequency, scanning with oversampling, optimizing the weighting factor by utilizing machine learning, and increasing the element number in the array, will be investigated.

Figure 25:
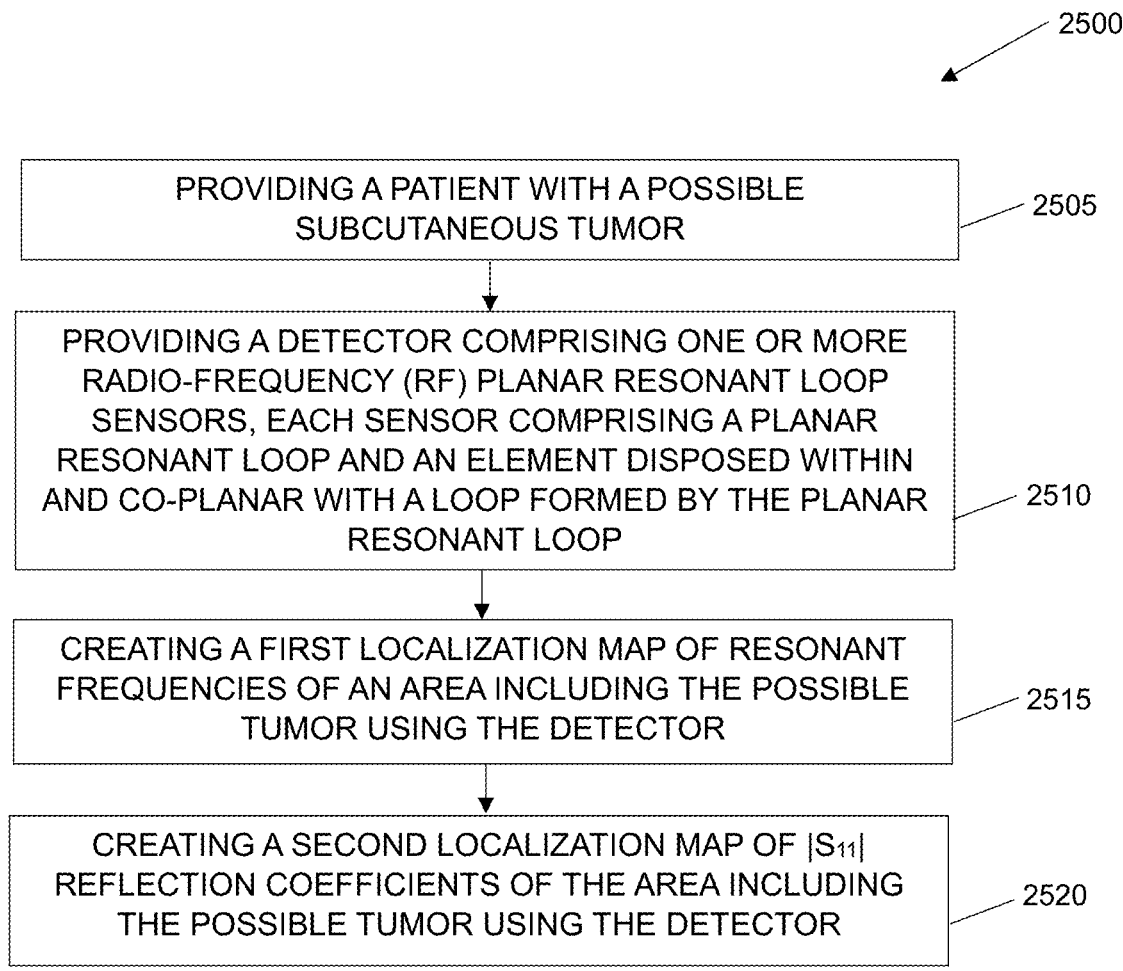
FIG. 25 shows a flowchart for a method embodiment of the present invention.

FIG. 25 shows a flowchart for a method 2500, an embodiment of the present invention. Method 2500 includes block 2505, providing a patient with a possible subcutaneous tumor, and block 2510, providing a detector comprising one or more radio-frequency (RF) planar resonant loop sensors, each sensor comprising a planar resonant loop and an element disposed within and co-planar with a loop formed by the planar resonant loop. Method 2500 further includes block 2515, creating a first localization map of resonant frequencies of an area including the possible tumor using the detector, and block 2520, creating a second localization map of $|s_{11}|$ reflection coefficients of the area including the possible tumor using the detector.

Figure 26:
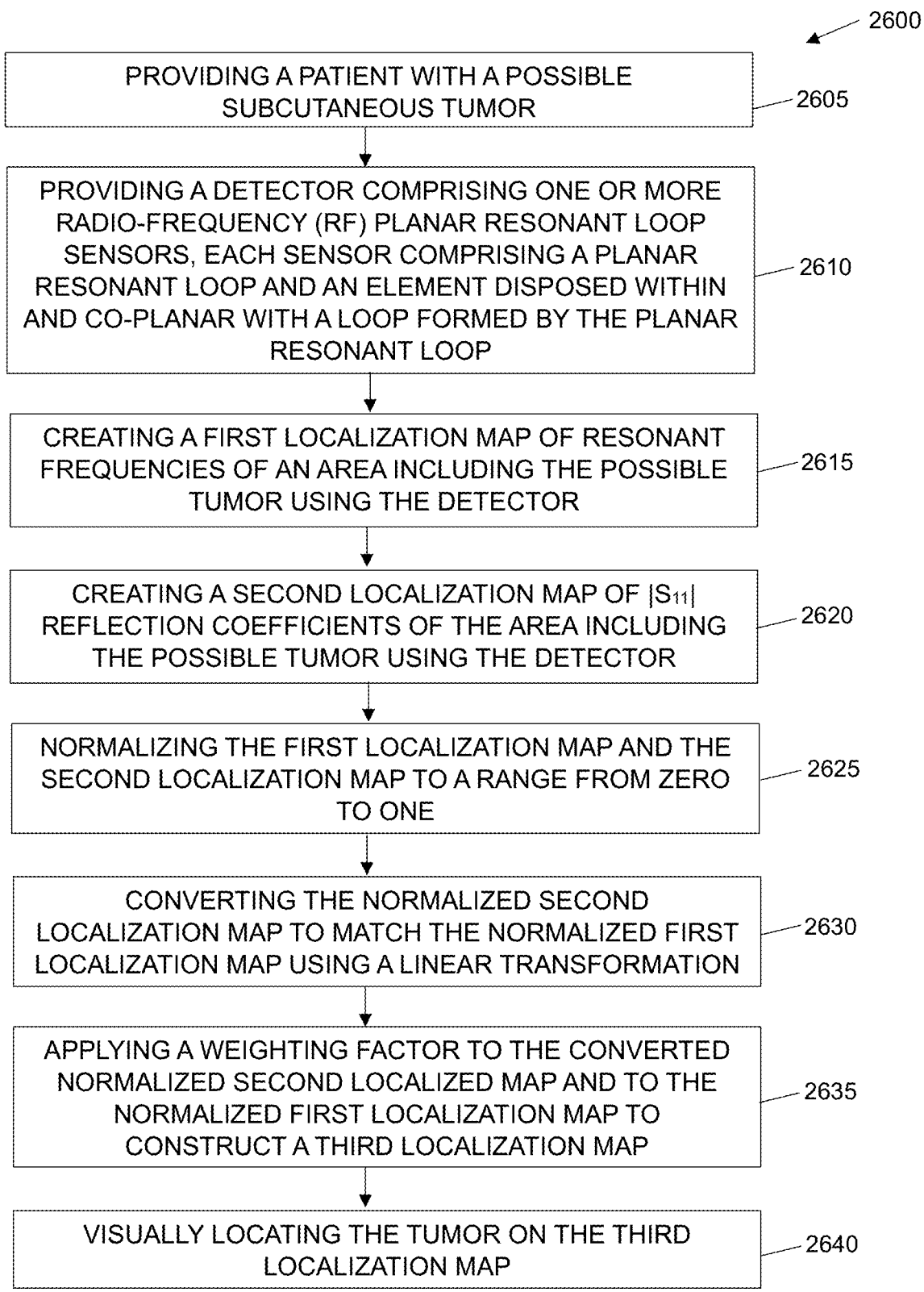
FIG. 26 shows a flowchart for another method embodiment of the present invention.

FIG. 26 shows a flowchart for a method 2600, another embodiment of the present invention. Method 2600 includes block 2605, providing a patient with a possible subcutaneous tumor, and block 2610, providing a detector comprising one or more radio-frequency (RF) planar resonant loop sensors, each sensor comprising a planar resonant loop and an element disposed within and co-planar with a loop formed by the planar resonant loop. Method 2600 also includes block 2615, creating a first localization map of resonant frequencies of an area including the possible tumor using the detector, and block 2620, creating a second localization map of $|s_{11}|$ reflection coefficients of the area including the possible tumor using the detector. Method 2600 further includes block 2625, normalizing the first localization map and the second localization map to a range from zero to one, and block 2630, converting the normalized second localization map to match the normalized first localization map using a linear transformation. In addition, method 2600 includes block 2635, applying a weighting factor to the converted normalized second localized map and to the normalized first localization map to construct a third localization map, and block 2640, visually locating the tumor on the third localization map.

Sensor Design and Simulations

Microwaves with deeper penetration depths can be used for cancer screening. The interactions of electromagnetic waves with different tissues affect wave scattering. Tissue types can be distinguished by evaluating resonant frequency shifts and magnitude changes in reflection coefficients. Microwave reflectometry system has been used for detecting skin abnormalities. An open-end coaxial probe was used to explore the detection of benign lesions compared to adjacent and distanced normal skins [93]. This technique is similar the dielectric property probe (N1501 A, Keysight) and compared the magnitudes and phases of reflection coefficients at 0.3-3 GHz. A coplanar waveguide probe performed raster scans to obtain near-field images of fat masses with a fixed standoff distance of λ/10 at 14.36 GHz [96]. Fat masses with a size larger than 5 mm can be imaged with more than 20 dB contrast in reflections at a single frequency of 14.36 GHz. The probe could produce high-resolution images and was used to detect malignant tumors from healthy skins and benign lesions with 15 and 8 dB contrasts [97], respectively. Designed for skin measurements, a truncated open-ended coaxial probe was used to sense moles and benign and malignant tumors in multiple subjects with a reflectometry-based system [98]. The magnitudes of reflection coefficients of suspected tumors and healthy skins were compared at 0.25-3 GHz. The complex permittivities of skin, mole, and benign and malignant tumors could be extracted from the magnitude differences across the frequency of interest. The extracted dielectric data show distinguishable profiles and values between four different types of tissues. The results helped us to design our resonator. These promising techniques require the rigid probe to be placed on the skin either at a precisely fixed distance or with consistent pressure, which can be difficult as human skins are elastic. Thus, we focus our effort on a conformable solution Compared to sophisticated instruments, microwave resonators usually have a compact size. Circuits, antennas, or resonators fabricated on monolithic, flexible substrates can be potentially made into a wearable conforming to the skin. However, most planar resonators fail to provide sufficiently high-intensity fields and spatial resolutions into the tissues due to their poor resonance at microwaves, suffering from low sensitivity. Additional dynamic matching circuits may achieve a high-quality factor, but they are bulky with design constraints, increase insertion losses and limit resonance frequency ranges. It is challenging to tune the impedance and achieve a high-quality factor in such a conformal microwave resonator without losing the advantages of being small and planar. Our preliminary work has developed a simple self-tuned method for impedance-matching of planar-loop resonators by embedding a center metal pad. The presence of the metal pad provides distributed capacitance and mutual inductance [101], variable with the gap spacing between the loop and pad, matching the port impedance at the desired operating frequency. Without changing the overall loop size or adding additional tuning circuits outside of the loop, the resonance of the planar loop is improved significantly. Furthermore, the tuned loop can be made of thin-film metal on a polymeric substrate while maintaining a compact size with high resonance performance, providing great potential for near-field sensing on curved surfaces. Applications based on the tuned loop structures have been investigated for wireless power transfer, subcutaneous implant localization [102], [103], human hydration monitoring [104], [105], and breast cancer imaging [106]. This work aims to utilize a similar device architecture as a noninvasive sensor to screen skin lesion types.

Figure 27A:
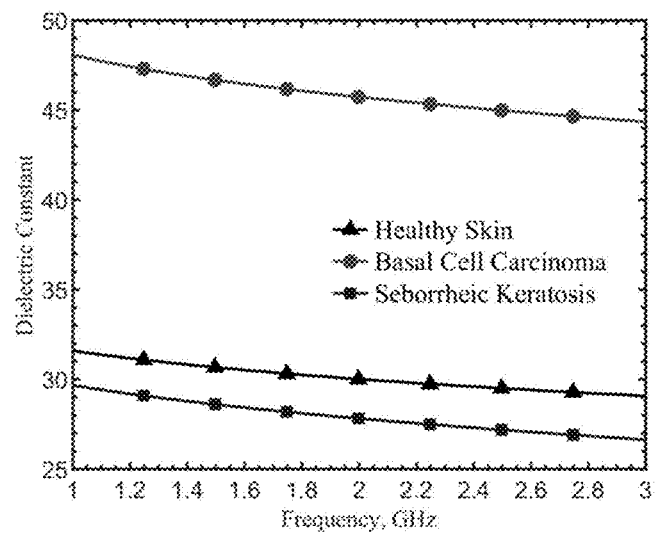
FIGS. 27A and 27B show a comparison of documented dielectric properties of healthy skin, Basal Cell Carcinoma (BCC), and Seborrheic Keratosis (SK) tissues. (a) Dielectric constant and (b) conductivity.
Figure 27B:
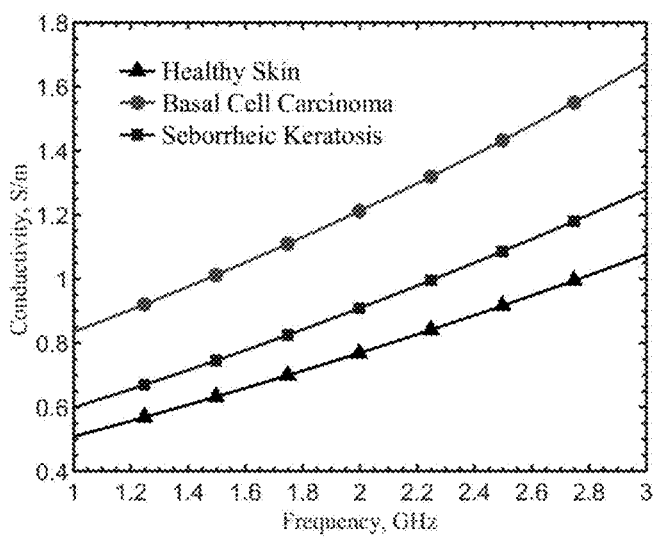

Lesion areas could often be ambiguous due to the visual similarity between malignant and benign tissues [62], [107], [108]. Basal Cell Carcinoma (BCC) is the most common malignant tumor cells of the skin, while Seborrheic Keratosis (SK) is one of the most common benign skin tumors [109]. They have close visual similarities as representative pigmented skin tumors [110], [111], which make it difficult to distinguish clinically by eyes. However, they have high contrast in dielectric properties. Thus, BCC and SK cell properties are selected to demonstrate the feasibility of determining whether the lesion area is malignant or benign by our sensor. According to the literature, cancerous BCC has significantly higher dielectric properties than those of healthy skin or benign lesions [85]. FIGS. 27A and 27B show the dielectric properties of BCC, SK, and healthy skin obtained from the fourth-order Cole-Cole model by in-vivo measurements 61]. Our initial resonator design and simulations are based on the dielectric properties data in FIGS. 27A and 27B.

Figures 30A, 30B:
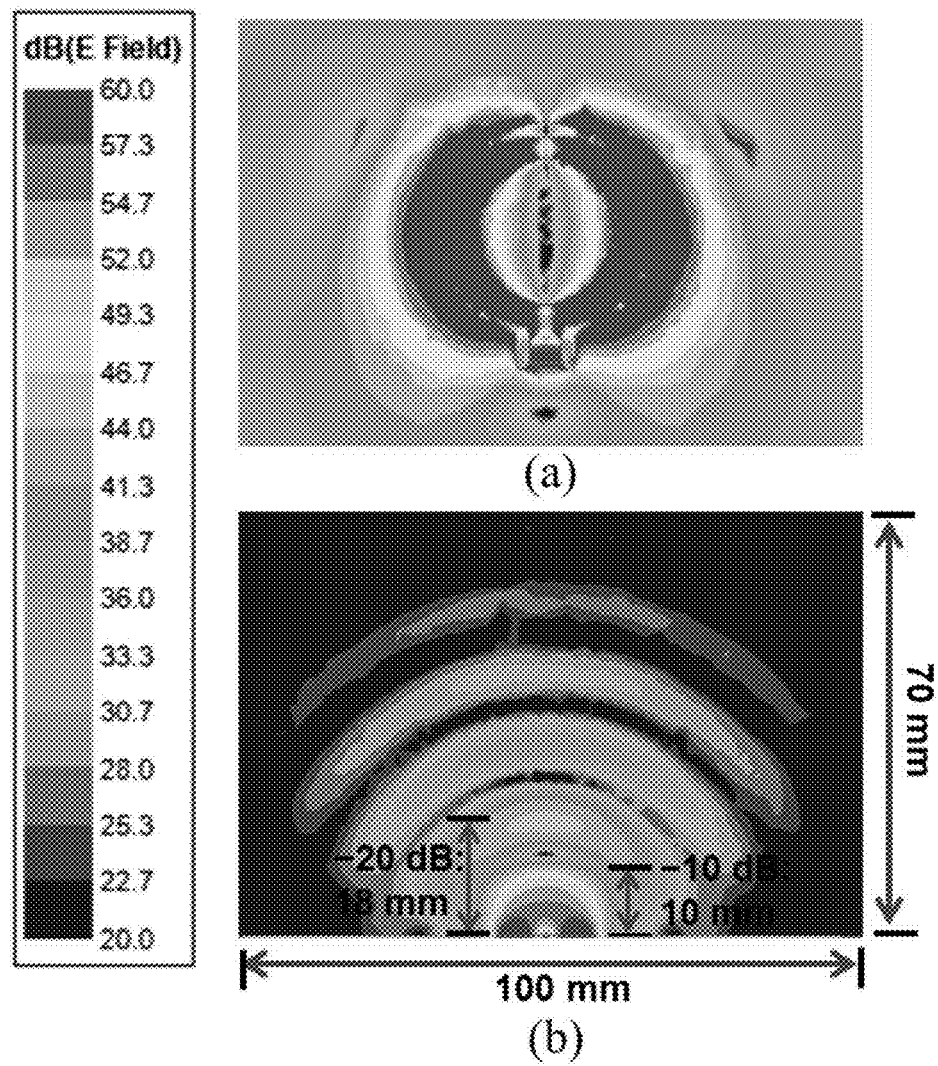
FIGS. 30A and 30B show cross sections of electric field distributions of the tuned loop resonator.

Considering the curvatures of the body parts, the tuned loop is designed on a flexible polyimide film (DuPont™ PYRALUX® FR9220R) that can have firm contact with the skin. The thickness of the film is 76 μm with a dielectric constant of 3.2, and the copper thickness is 70 μm. The substrate parameters in simulations are the same as the ones in fabrication. FIGS. 28A and 28B show the configuration of the tuned loop (FIG. 28A) with a photo of the sensor (FIG. 28B). The sensor is designed to operate in an ISM (Industrial, Scientific, and Medical) band at 2.465 GHz with considerations for a compact size and sufficient field depths. The loop radius is b=5.4 mm with a connecting stub length L=1.5 mm. The metal width w is 0.8 mm. The gap between the loop and the center pad is d=1.13 mm, which tunes and optimizes the resonance up to −63.98 dB with a quality factor of 98.7 when it is placed on the skin. FIG. 29 shows the simulation setup. The simulation phantom consists of healthy skin and lesion tissue parts. The lesion tissue is set as a 12 mm×12 mm×4 mm cuboid surrounded by healthy skin. The sensor is directly above the lesion on the skin. The robust resonance provides confined electric field distributions into the skin tissues, as shown in FIGS. 30A and 30B. FIG. 30A strong fields across the gap and around the loop. The −10-dB and −20-dB attenuation depths from the surface of the loop, in FIG. 30B, are 10 mm and 18 mm, respectively, providing confined fields deep enough to penetrate through the epidermis layer and detect abnormality up to the dermis and hypodermis layers. As a result, the resonator provides a higher sensitivity to detect effective permittivities contributed by skin tissues while limiting its probing to a spatially confined area.

Figure 31:
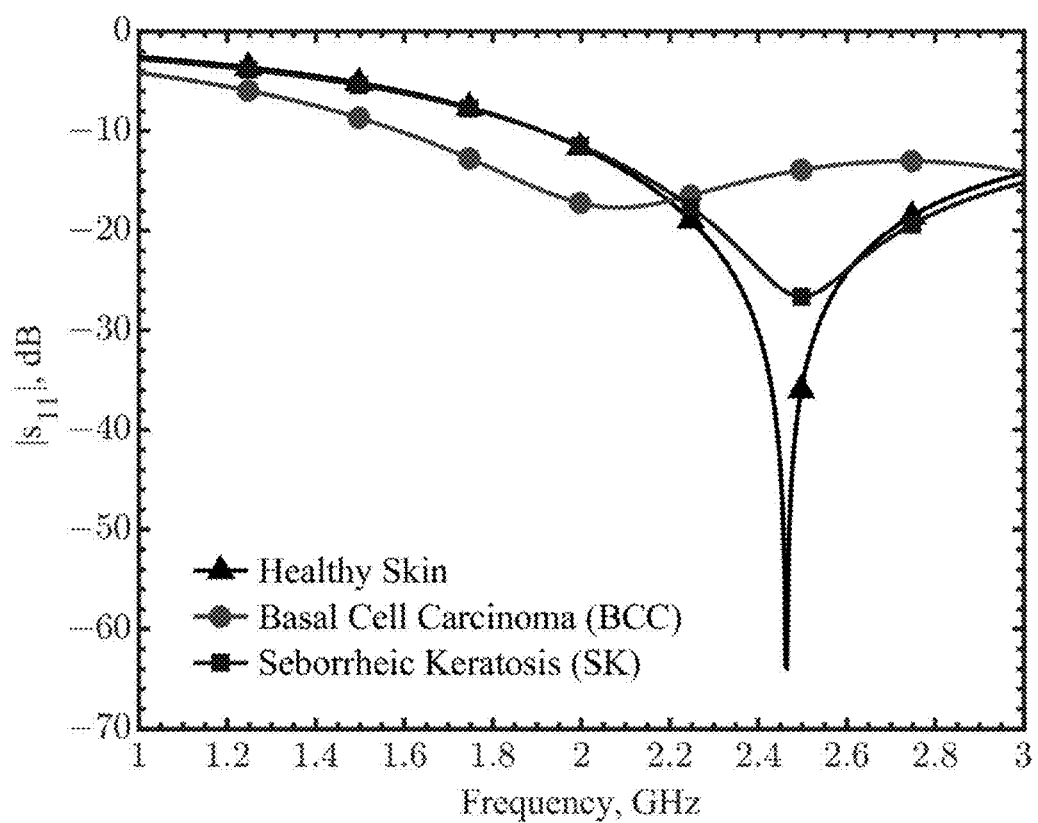
FIG. 31 shows a comparison of reflection coefficients for healthy skin, Basal Cell Carcinoma (BCC), and Seborrheic Keratosis (SK) tissues at frequencies band 1-3 GHz.

Finite-element simulations were conducted with the configuration in FIG. 29 and phantoms, including Seborrheic Keratosis (SK), Basal Cell Carcinoma (BCC), and healthy skin tissues. FIG. 31 shows the simulation results of reflection coefficients. The resonance is optimized for the healthy skin condition at 2.465 GHz with |s11| of −63.98 dB. BCC has a resonant frequency of 2.08 GHz with |s11| of −17.68 dB, whereas SK has a resonant frequency at 2.5 GHz with |s11| of −26.62 dB. The frequency shift between SK (benign) and BCC (cancerous) is 0.42 GHz. The frequency shift is 0.39 GHz from the healthy skin to BCC. The frequency shifts are distinguishable.

Figure 32A:
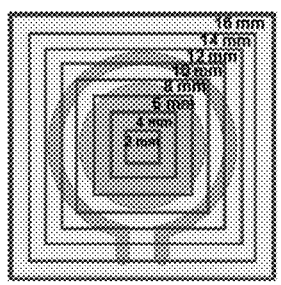
FIGS. 32A and 32B show a comparison of tumor sizes and sensor dimensions.
Figure 32B:
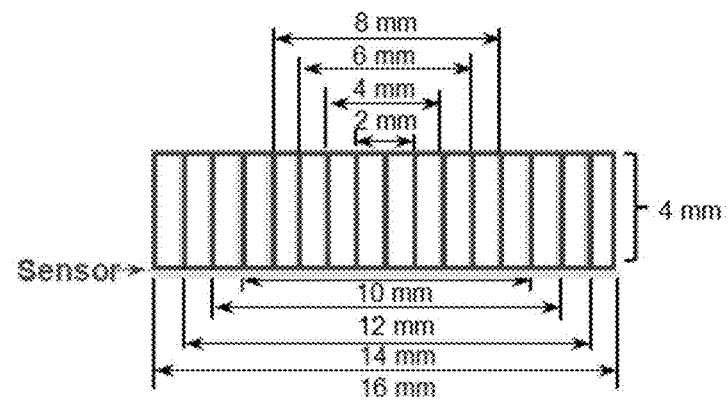

To further test the performance, more simulations were conducted for different tumors with side lengths of the cuboid phantoms from 2 to 16 mm. The phantom thickness was kept at 4 mm. The size comparison between the tumor and sensor is illustrated in FIGS. 32A and 32B, where the red lines indicate tumor boundaries. Reflection coefficients are collected for each configuration, and resonant frequencies are compared in FIG. 33. When the cuboid tumor side length exceeds 6 mm, a noticeable difference in resonant frequency shifts is observed between BCC and SK. When the tumors are equal to or smaller than 6 mm on the side, they are located in the areas where the electric fields are weak, based on FIGS. 30A and 30B. As a result, the resonant frequency shifts are limited in these cases. However, by utilizing oversampling in spatial scans to place the lesion area under the strong fields, small tumors with a side length of as small as 2 mm can be detected. Further details regarding the use of oversampling to improve the detection of smaller tumors is discussed below.

Measurements
Artificial Tumor Phantoms

Tissue mimicking materials (TMMs) were created to imitate simulated tissue types, including Basal Cell Carcinoma (BCC), Seborrheic Keratosis (SK), and healthy skin. This is because of practical and clinical challenges to produce controlled and sufficiently large tissue samples from biopsies. The samples may also become dehydrated after being removed from the skin. It is also a great challenge to perform in-vivo measurements directly on patients at this feasibility study period due to the limited availability of patients with controlled tumor types. Therefore, we decided to create artificial tumor phantoms with dielectric properties documented in the literature. Amir et al. developed semi-solid phantoms to simulate human skin and skin tumors by altering the mixtures of conductive filler and polymer matrix. Likewise, Garrett et al. presented dielectric tunable tissue-mimicking materials (TMMs) composed of urethane rubber, graphite powders, and carbon black powders. Both approaches produced stable, ultrawideband, and tunable skin-equivalent phantoms.

Figure 34A:
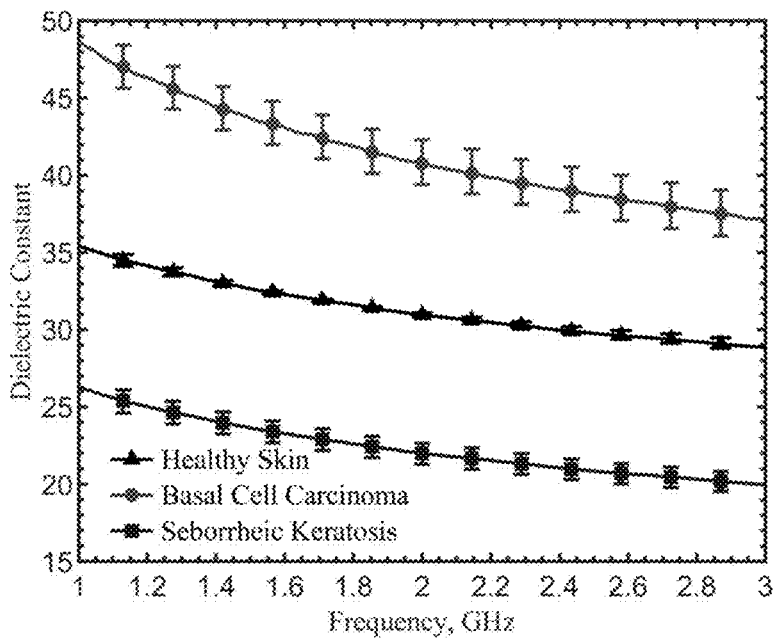
FIGS. 34A and 34B show measurements of dielectric properties.
Figure 34B:
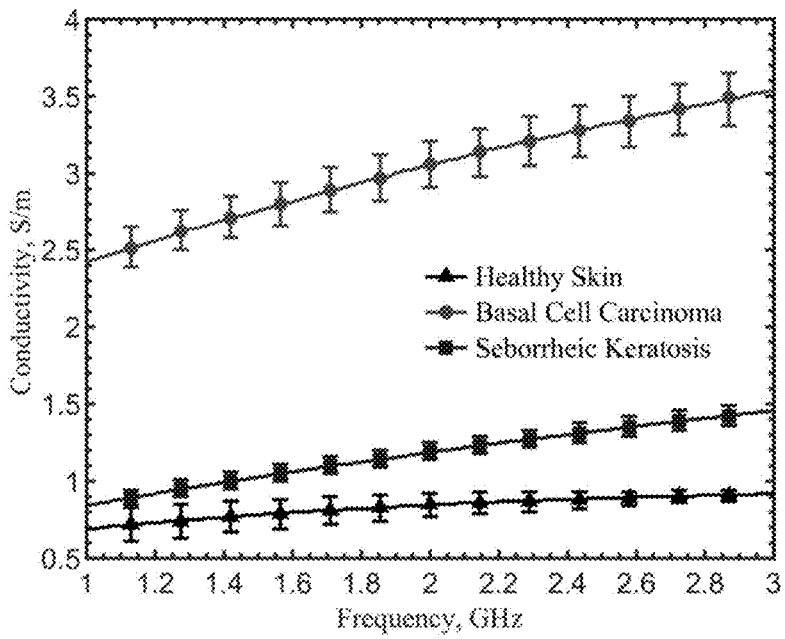

Following the methodology by Garrett et al. [113], PMC-121urethane rubber (Smooth-On Inc, Texas) was chosen as the polymer matrix with conductive fillers consisting of graphite powders (Sigma-Aldrich, Saint Louis) and carbon black powders (Thermo Fisher Scientific, Massachusetts) incorporated. By varying the concentrations of the conductive fillers, the dielectric properties of the TMMs were adjusted. Phantoms with healthy skin, BCC, SK tissues were made in a cylindrical shape with a diameter of 10 cm and a thickness of 3 cm. Dielectric properties were measured using a broadband, open-ended coaxial probe kit (Keysight N1501 A) [114]. The flange-free probe provided firm contact with the material. Four measurements were taken in four different locations at least 5 cm apart to avoid overlapping volumes [93]. The averages were calculated from four measurements for each phantom. After adjusting the conductive filler concentrations, three TMMs were finalized with different combinations of graphite and carbon black powders, corresponding to healthy skin (17.9%-wt & 12.1%-wt), BCC (25.6%-wt & 11.9%-wt), and SK (5.6%-wt & 12.1%-wt). The measured dielectric properties of these three phantoms were plotted in FIGS. 34A and 34B, and error bars were derived from four measurements taken for each phantom. It should be noted that the error bars might be due to the contact pressures from the probe to the phantoms and imperfect/nonuniform mixtures of powders in polymer matrices. When the powder concentrations increased, the mixtures hardened, making it difficult to mix uniformly.

Similar to the simulations, the dielectric properties of cancerous and benign tissues exhibited high contrasts. However, discrepancies in the dielectric properties across the frequencies between the fabricated TMMs and simulation phantoms were expected because the spectral profiles of the dielectric properties in the polymer matrix did not follow exactly those of tissues documented in the literature. It should also be noticed that the dielectric properties data from a Cole-Cole model were derived from averages among multiple measurements with clear deviations in the data. With these observations, the measured dielectric property data in the final phantom design were within the range of the in-vivo skin cancer measurements in [61].

Results

Figure 35:
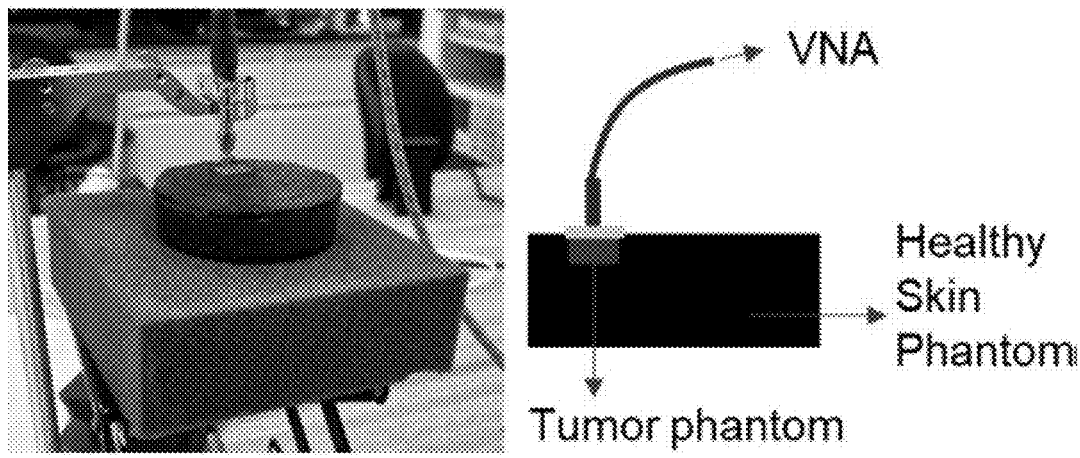
FIG. 35 shows a setup for skin cancer measurements using custom-made tissue mimicking materials.
Figure 36:
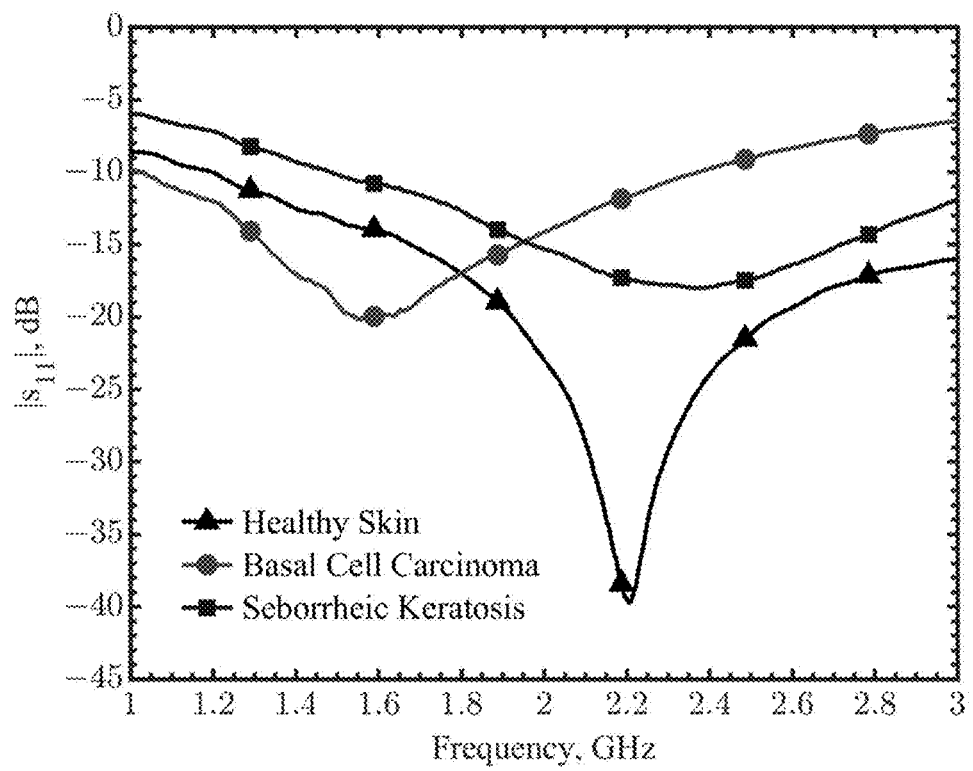
FIG. 36 shows reflection coefficients in measurements for healthy skin phantom, Basal Cell Carcinoma (BCC), and Seborrheic Keratosis (SK) tumor phantoms embedded in healthy skin at the frequency band of 1-3 GHz.

The fabricated BCC and SK phantoms were sliced into small pieces with dimensions of 12 mm×12 mm×4×mm and inserted into the healthy skin phantom. The measurement setup and photo are shown in FIG. 35. To ensure a stable and firm contact, a medical-grade tape (3 M Nexcare Durapore Durable Cloth Tape, USA) was used to attach the sensor to the phantom. The sensor was connected to a vector network analyzer (Keysight PNA N5227B). Measurements were conducted with the BCC and SK inside the healthy skin phantoms and a single healthy skin phantom. The resonant frequency of the BCC-in-skin phantom was 1.6 GHz and shifted to 2.36 GHz for the SK-in-skin phantom, as shown in FIG. 36. The healthy skin phantom had a resonant frequency of 2.2 GHz. The spectral shapes in three different scenarios matched with simulations. Discrepancies existed between simulations and measurements, primarily were due to the difference in the dielectric properties from the literature used in the simulations and those measured in the phantoms. The frequency shift between BCC and healthy tissue was 0.76 GHz (32.18%) in the measurement, compared to 0.42 GHz (16.62%) in the simulations. However, the permittivity and conductivity contrast in the tissues can still be used to recognize tissue types with the resonator.

Figure 37:
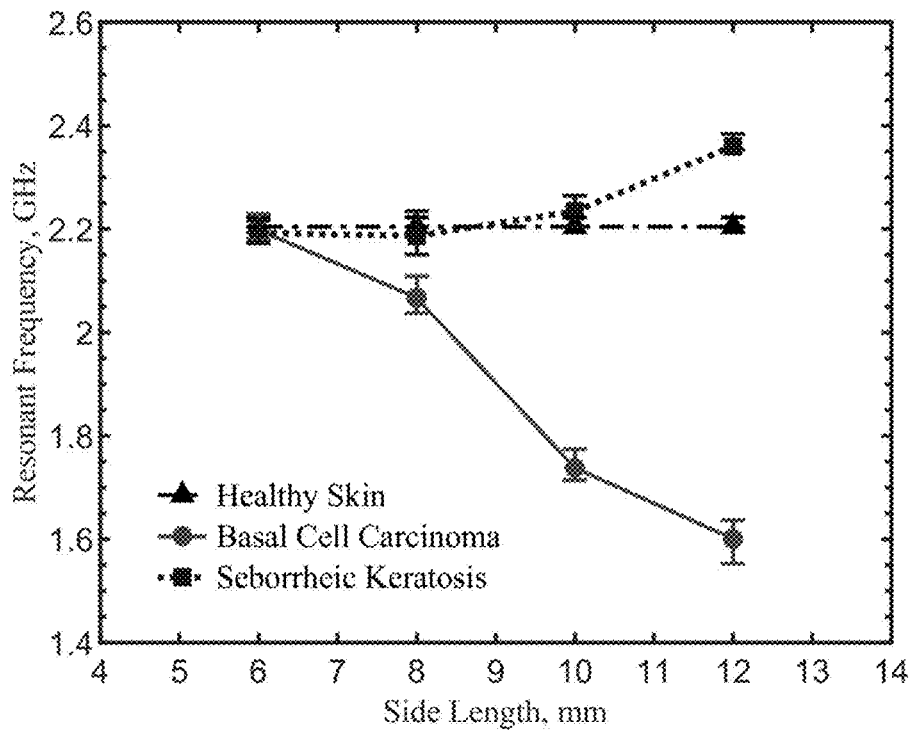
FIG. 37 shows measured resonant frequencies for healthy skin, and Basal Cell Carcinoma (BCC) and Seborrheic Keratosis (SK) tumors in the skin. Tumors have square side lengths of 6, 8, 10, and 12 mm with a thickness of 4 mm.

Similar measurements were conducted for phantoms of 6×6, 8×8, and 10×10 mm$^2$, all with a thickness of 4 mm. Resonant frequencies for different sizes of tumors are shown in FIG. 37. The error bars were obtained from 5 measurements for each case. The frequency shifts between BCC and SK were 5.9, 119.6, 496.3, and 759.46 MHz for side lengths of 6, 8, 10, and 12 mm, respectively, while the ones in simulations were 27.5, 142.5, 337.5, and 415 MHz, shown in FIG. 33. The distinguishable frequency shifts between BCC and SK in simulations and measurements, demonstrated the feasibility of identifying cancerous and benign tissues using the tuned resonator. In measurements, the size limit of 6×6 mm$^2$ matched with simulation results.

Oversampling to Identify Smaller Tumors

During the mentioned tests, the center of the tumor-in-skin phantom was placed directly under the center point of the sensor. The tumor size changed in different measurements, but the centers were aligned. The procedure was to place the resonator loop on the spot where darker colors indicate a potential lesion area in order to identify the risk of the spot being malignant. Currently, caregivers visually inspect brownish spots or speckles, changing moles, or skin areas with colors changed and irregular borders. Because the spot is visibly defined, after placing the sensor center-to-center on the area of interest, the sensor can be moved off-center spatially to scan the area for oversampling the area. The purpose is to create high confidence before the biopsy is applied. This is particularly important for the skin areas around the eyes, lips, and noses on the faces where it is painful for biopsy or impacts self-perception of the patient's appearance.

Figure 33:
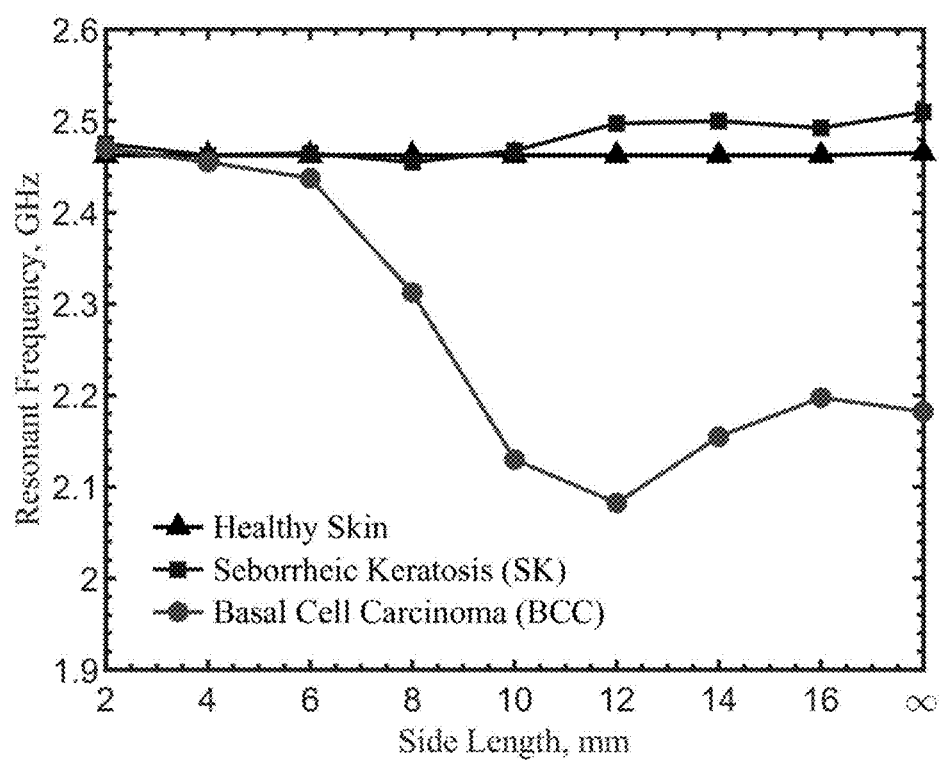
FIG. 33 shows resonant frequencies in simulations for healthy skin, and tumors of Basal Cell Carcinoma (BCC) and Seborrheic Keratosis (SK) embedded in the healthy skin. The tumors have a thickness of 4 mm and square side lengths from 2-16 mm, illustrated in FIGS. 32A and 32B. Complete phantoms made of BCC and SK materials have side lengths of infinite.

When the sensor was placed center-to-center on the spot, it can distinguish tissue types when the tumor was bigger than 6 mm, as shown in FIG. 33. This was due to the tumor being located within an area where electric fields were weak according to FIGS. 30A and 30B. The effective permittivity change that decided resonance had little contribution by the tumor. Since the high fields were around the ring gap, moving the loop in small steps to oversample the area may provide a better resolution to distinguish the boundary from the high permittivity contrast.

Figures 38A, 38B:
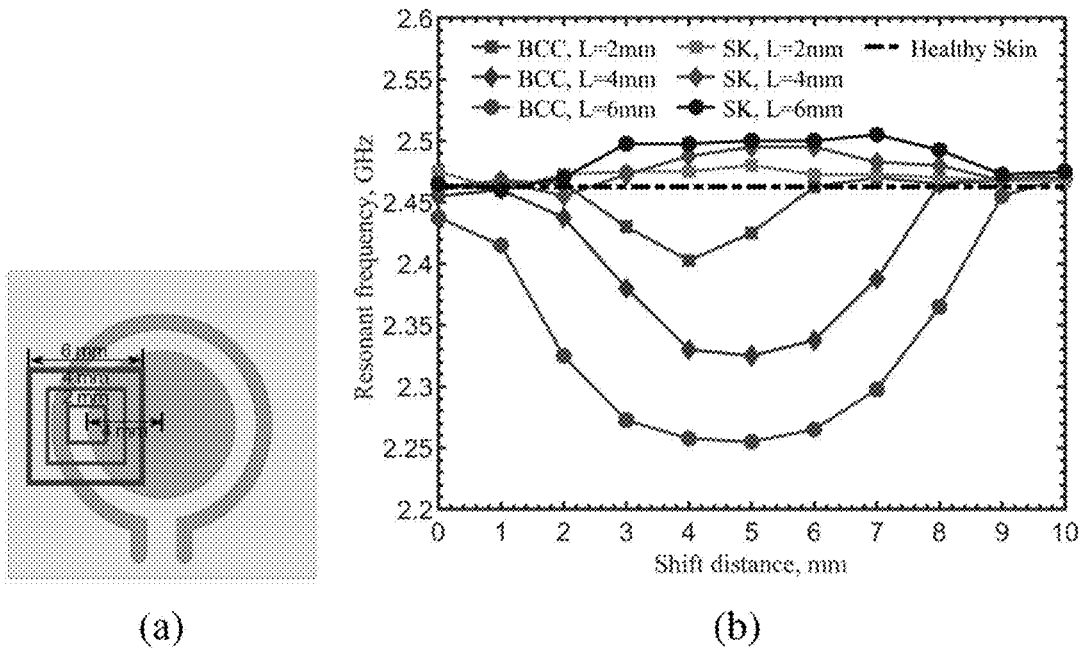
FIG. 38A shows a setup for oversampling experiment. The sensor is horizontally shifted by 10 mm with a step size of 1 mm. The red squares indicate the lesion volumes of 2×2×4, 4×4×4, and 6×6×4 mm$^3$ after the tumors move 4 mm from the center.
FIG. 38B shows resonant frequencies for BCC and SK tumors and healthy skin as a function of shifted distance in the oversampling setup.

The sensor was moved by 10 mm with a step size of 1 mm orthogonally to its port direction. FIG. 38A shows the setup for oversampling as the loop moved horizontally to the left on the skin through the tumor area. The simulations were repeated for lesion sizes of 2×2, 4×4, and 6×6 mm$^2$, each has a thickness of 4 mm. The center metal pad had a radius of 4 mm, so when the lesion area shifted a distance of 4 mm to the right, the center of the lesion was directly under the ring gap where the field magnitudes were highest. Resonant frequencies by oversampling are shown in FIG. 38B. When the distance was zero, the lesion center was directly under the center of the metal pad, so there was no resonant frequency shift for all three sizes of tumors. The resonant frequency shifts were distinguishable between the malignant (BCC) and benign (SK) tumors as 72.5 MHz, 157.5 MHz, and 240 MHz for the lesion side lengths of 2, 4, and 6 mm, respectively. The BCC could be clearly identified from the healthy skin too. Thus, malignant tissues can still be detected in lesions as small as 2×2×4 mm$^3$ by the oversampling technique.

Sensor Performance in Varied Skin Hydration Conditions

Figure 39:
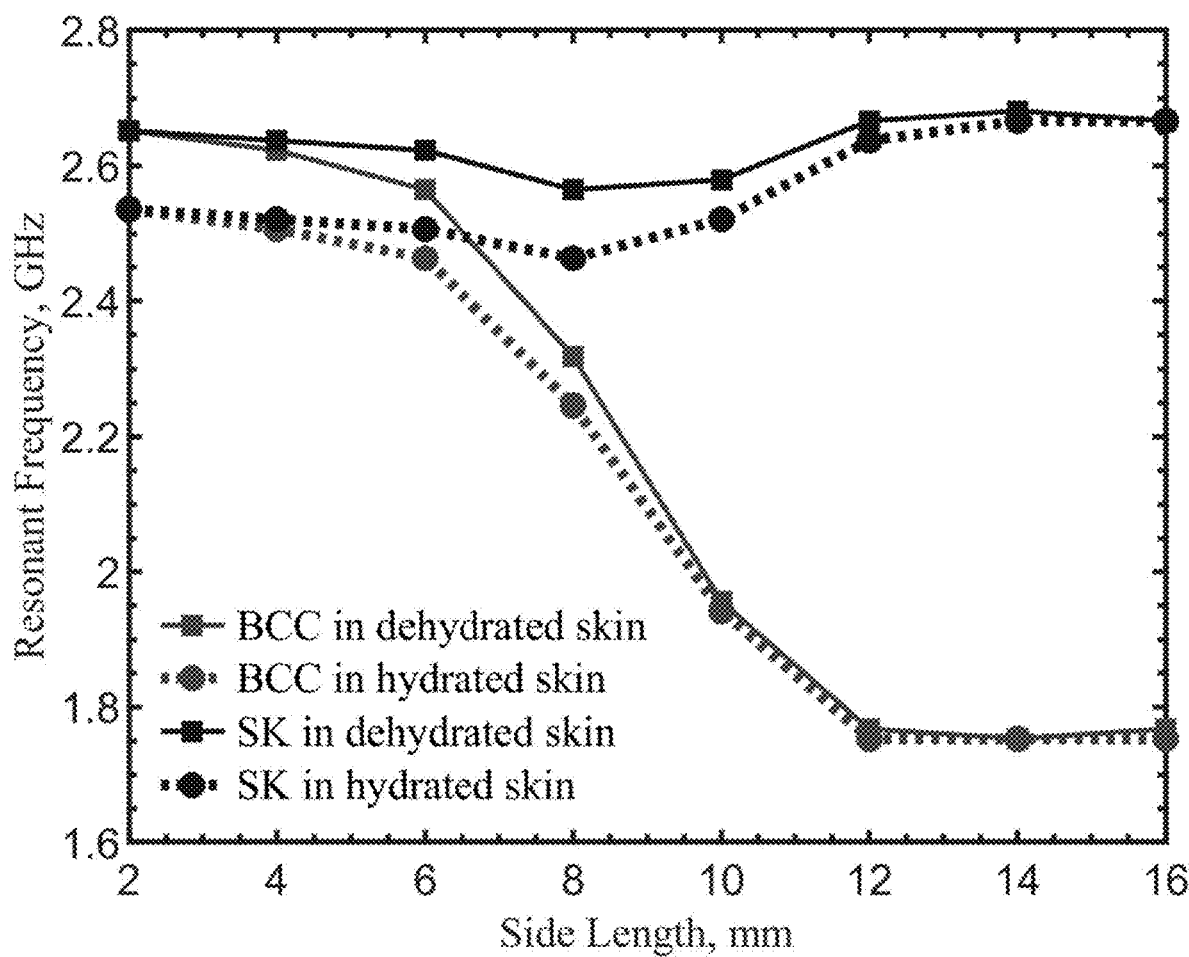
FIG. 39 shows comparisons of resonant frequencies between BCC (malignant) and SK (benign) tumors in simulations. The simulation parameters include measured dielectric properties of human skins: fully-hydrated (dashed line) and partially dehydrated (solid line). The tumors have volumes of 2×2 (a side length of 2 mm) to 16×16 (a side length of 16 mm) mm$^2$ with a thickness of 4 mm.

The resonator detects effective permittivity changes due to the differences in dielectric properties in malignant and benign tissues. Skin conditions, such as its water content in the dermis and hypodermis layers due to body hydration levels, may affect sensing results. Documented data [83], shows that the dielectric property difference between dry skin and wet skin is noticeable. Dielectric measurements on the skin of the same person at hydrated and dehydrated status showed the water content factor. And resonant frequency shifts in the resonator were due to the dielectric changes [104], [105]. To investigate the effect from water content variations in the skin, simulations were conducted for tumor cuboids with side lengths from 2 to 16 mm and a thickness of 4 mm, as the same as the ones in FIG. 33. Measured permittivities and conductivities were obtained from human forearms in fully-hydrated and partially-dehydrated statuses. The tumor phantoms were placed in these two different skin conditions. FIG. 39 shows the comparison of resonant frequencies between BCC and SK. Solid curves indicate the resonant frequencies detected on dehydrated skins and dashed ones are for hydrated skins. When the side length is less than 6 mm, there was no frequency shift between BCC and SK in hydrated or dehydrated skin conditions, similar trends as the results in FIG. 33. The frequency shifts above a 6-mm side length were noticeable between BCC and SK lesions considering the area being measured was either hydrated or partially-dehydrated. When the side length is larger than 10 mm, the dielectric properties were dominated by the lesion as the water content effect was decreased. The frequency shifts between BCC and SK for tumor sizes of 6×6×4-16×16×4 mm$^3$ were 43.5 and 913.5 MHz for a fully hydrated skin condition, while they were 58 and 899 MHz for the partially-dehydrated skin condition, respectively. The sensor was able to distinguish malignant from benign lesions among different hydration levels in the body.

Figure 40:
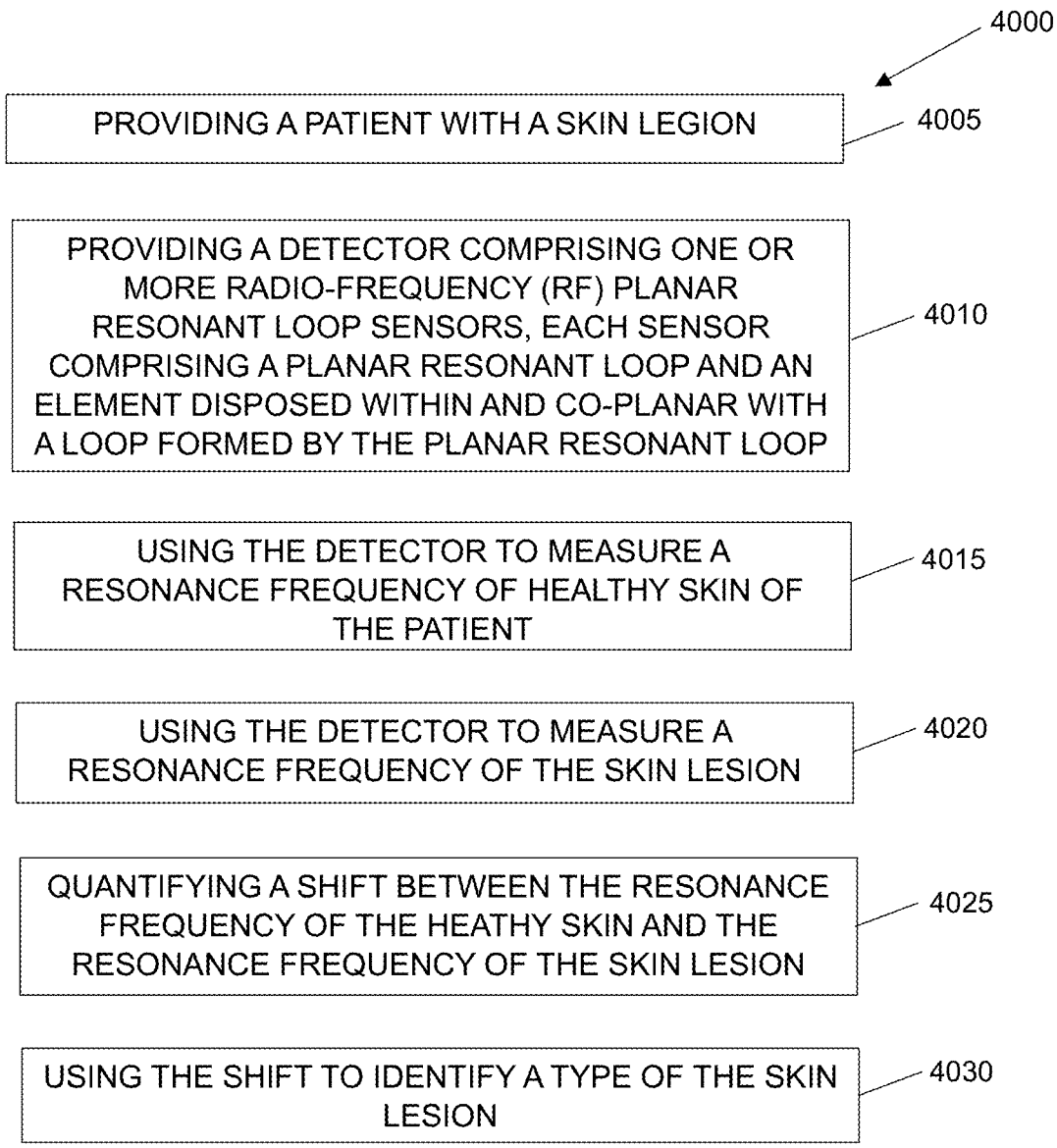
FIG. 40 shows a flowchart for another embodiment of the present invention.

FIG. 40 shows a flowchart of a method 4000, another embodiment of the present invention. Method 4000 includes block 4005, providing a patient with a skin lesion, and block 4010, providing a detector comprising one or more radio-frequency (RF) planar resonant loop sensors, each sensor comprising a planar resonant loop and an element disposed within and co-planar with a loop formed by the planar resonant loop. Method 4000 also includes block 4015, using the detector to measure a resonance frequency of healthy skin of the patient, and block 4020, using the detector to measure a resonance frequency of the skin lesion. Method 4000 further includes block 4025, quantifying a shift between the resonance frequency of the heathy skin and the resonance frequency of the skin lesion, and block 4030, using the shift to identify a type of the skin lesion.

Conclusion

We developed a flexible tuned microwave resonator that can conform to the skin to noninvasively identify if the lesion area of interest is cancerous, such as Basal Cell Carcinoma (BCC), or benign, such as Seborrheic Keratosis (SK). It can provide a quick and painless means to assist caregivers to evaluate potential cancerous lesion areas. Simulations and measurements by phantoms were designed to validate the concept feasibility of utilizing a planar tuned loop resonator for noninvasive skin cancer screening. Tissue-mimicking materials with similar documented dielectric properties in the literature of healthy skin, BCC, and SK tissues were used to fabricate phantoms for measurements. The presence of malignant lesions forms a high contrast of permittivities between cancerous and benign tissues. Owing to the robust and high quality factor resonance and sufficient field penetration into the dermis and hypodermis layers of the skin, the tuned loop was able to provide sufficient spatial and spectral resolutions to distinguish malignant lesions as small as 2×2×4 mm$^3$. Discrepancies between simulations and measurements existed because the documented data in the literature were averaged values, and the materials for making phantoms did not have the same spectral profiles for the skin and tumors. Investigation on the effects caused by skin hydration statuses was conducted by using measured data from fully-hydrated and partially-dehydrated human skins with the tumor phantoms. The distinguishable and consistent trends in different skin conditions showed robust performance by the tuned loop resonator. This work mainly focused on validating the feasibility of a noninvasive skin cancer screening tool with a tuned loop sensor. Phantoms were created because it is difficult to obtain controlled cancerous or benign tissue samples from biopsies. Therefore, future works need to focus on how to create quantifiable and uniform cancerous and benign tumor samples in a repeatable fashion and strategies toward clinical in vivo measurements in patients.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112

(f) as it exists on the date of filing hereof unless the words "means for" or "step for" are explicitly used in the particular claim.

REFERENCES

1. Tricoles, G.; Farhat, N. H. Microwave holography: Applications and techniques. *Proc. IEEE* 1977, 65, 108-121.
2. Deng, Y.; Liu, X. Electromagnetic Imaging Methods for Nondestructive Evaluation Applications. *Sensors* 2011, 11, 11774-11808.
3. Deng, Y. Forward and Inverse Problems in Noninvasive Imaging Techniques. Ph.D. Thesis, Michigan State University, East Lansing, MI, USA, 2009.
4. Chiao, J. C.; Bing, S.; Chawang, K. Review on Noninvasive Radio-Frequency Sensing for Closed-Loop Body Health Management. In Proceedings of the 2021 IEEE International Symposium on Radio-Frequency Integration Technology (RFIT), Hualien, Taiwan, 25-27 Aug. 2021; IEEE: Piscataway, NJ, USA 2021; pp. 1-3.
5. Säbel, M.; Aichinger, H. Recent developments in breast imaging. *Phys. Med. Biol.* 1996, 41, 315-368.
6. Fear, E. C. Microwave Imaging of the Breast. *Technol. Cancer Res. Treat.* 2005, 4, 69-82.
7. Huynh, P. T.; Jarolimek, A. M.; Daye, S. The false-negative mammogram. *Radiographics* 1998, 18, 1137-1154.
8. Fletcher, S. W.; Elmore, J. G. Mammographic Screening for Breast Cancer. *N. Engl. J. Med.* 2003, 348, 1672-1680.
9. Hagness, S. C.; Taflove, A.; Bridges, J. E. Two-dimensional FDTD analysis of a pulsed microwave confocal system for breast cancer detection: Fixed-focus and antenna-array sensors. *IEEE Trans. Biomed. Eng.* 1998, 45, 1470-1479.
10. Chiao, J. C.; Li, C.; Lin, J.; Caverly, R. H.; Hwang, J. C. M.; Rosen, H.; Rosen, A. Applications of Microwaves in Medicine. *IEEE J. Microwaves* 2023, 3, 134-169.
11. Walter, F.; Webster, A.; Scott, S.; Emery, J. The Andersen Model of Total Patient Delay: A systematic review of its application in cancer diagnosis. *J. Health Serv. Res. Policy* 2012, 17, 110-118.
12. Choi, J. W.; Cho, J.; Lee, Y.; Yim, J.; Kang, B.; Oh, K. K.; Jung, W. H.; Kim, H. J.; Cheon, C.; Lee, H. D.; et al. Microwave Detection of Metastasized Breast Cancer Cells in the Lymph Node; Potential Application for Sentinel Lymphadenectomy. *Breast Cancer Res. Treat.* 2004, 86, 107-115.
13. Arab, H.; Chioukh, L.; Ardakani, M. D.; Dufour, S.; Tatu, S. O. Early-Stage Detection of Melanoma Skin Cancer Using Contactless Millimeter-Wave Sensors. *IEEE Sens. J.* 2020, 20, 7310-7317.
14. Lazebnik, M.; Madsen, E. L.; Frank, G. R.; Hagness, S. C. Tissue-mimicking phantom materials for narrowband and ultrawideband microwave applications. *Phys. Med. Biol.* 2005, 50, 4245-4258.
15. Pollacco, D. A.; Farrugia, L.; Conti, M. C.; Farina, L.; Wismayer, P. S.; Sammut, C. V. Characterization of the dielectric properties of biological tissues using mixture equations and correlations to different states of hydration. *Biomed. Phys. Eng. Express* 2019, 5, 35022.
16. Gabriel, S.; Lau, R. W.; Gabriel, C. The dielectric properties of biological tissues: II. Measurements in the frequency range 10 Hz to 20 GHz. *Phys. Med. Biol.* 1996, 41, 2251-2269.
17. Mirbeik-Sabzevari, A.; Ashinoff, R.; Tavassolian, N. Ultra-Wideband Millimeter-Wave Dielectric Characteristics of Freshly Excised Normal and Malignant Human Skin Tissues. *IEEE Trans. Biomed. Eng.* 2018, 65, 1320-1329.
18. Gniadecka, M.; Nielsen, O. F.; Wulf, H. C. Water content and structure in malignant and benign skin tumours. *J. Mol. Struct.* 2003, 661, 405-410.
19. Mayrovitz, H. N.; Gildenberg, S. R.; Spagna, P.; Killpack, L.; Altman, D. A. Characterizing the tissue dielectric constant of skin basal cell cancer lesions. *Ski. Res. Technol.* 2018, 24, 686-691.
20. Pastorino, M. *Microwave Imaging*; Wiley: Hoboken, NJ, USA, 2010.
21. Kwon, S.; Lee, S. Recent Advances in Microwave Imaging for Breast Cancer Detection. *Int. J. Biomed. Imaging* 2016, 2016, 5054912-5054926.
22. Hassan, A. M.; El-Shenawee, M. Review of Electromagnetic Techniques for Breast Cancer Detection. *IEEE Rev. Biomed. Eng.* 2011, 4, 103-118.
23. Meaney, P. M.; Paulsen, K. D.; Hartov, A.; Crane, R. K. Microwave imaging for tissue assessment: Initial evaluation in multitarget tissue-equivalent phantoms. *IEEE Trans. Biomed. Eng.* 1996, 43, 878-890.
24. Meaney, P. M.; Paulsen, K. D.; Hartov, A.; Crane, R. K. An active microwave imaging system for reconstruction of 2-D electrical property distributions. *IEEE Trans. Biomed. Eng.* 1995, 42, 1017-1026.
25. Klemm, M.; Craddock, I. J.; Leendertz, J. A.; Preece, A.; Benjamin, R. Radar-Based Breast Cancer Detection Using a Hemispherical Antenna Array-Experimental Results. *IEEE Trans. Antennas Propag.* 2009, 57, 1692-1704.
26. Li, X.; Bond, E. J.; Veen, B. D. V.; Hagness, S. C. An overview of ultra-wideband microwave imaging via space-time beamforming for early-stage breast-cancer detection. *IEEE Antennas Propag. Mag.* 2005, 47, 19-4.
27. Guo, B.; Wang, Y.; Li, J.; Stoica, P.; Wu, R. Microwave Imaging Via Adaptive Beamforming Methods for Breast Cancer Detection. *J. Electromagn. Waves Appl.* 2006, 20, 53-63.
28. Xie, Y.; Guo, B.; Xu, L.; Li, J.; Stoica, P. Multistatic Adaptive Microwave Imaging for Early Breast Cancer Detection. *IEEE Trans. Biomed. Eng.* 2006, 53, 1647-1657.
29. Davis, S. K.; Tandradinata, H.; Hagness, S. C.; Veen, B. D. V. Ultrawideband microwave breast cancer detection: A detection-theoretic approach using the generalized likelihood ratio test. *IEEE Trans. Biomed. Eng.* 2005, 52, 1237-1250.
30. Lin, J. C. *Microwave Thermoelastic Tomography and Imaging*; Advances in Electromagnetic Fields in Living Systems; Springer: Boston, MA, USA, 2005; pp. 41-76.
31. Lin, J. C. Microwave thermoacoustic tomographic (MTT) imaging. *Phys. Med. Biol.* 2021, 66, 10.
32. Cui, Y.; Yuan, C.; Ji, Z. A review of microwave-induced thermoacoustic imaging: Excitation source, data acquisition system and biomedical applications. *J. Innov. Opt. Health Sci.* 2017, 10, 1730007-18.
33. Zhao, S.; Wang, H.; Li, Y.; Nie, L.; Zhang, S.; Xing, D.; Qin, H. Ultrashort-Pulse-Microwave Excited Whole-Breast Thermoacoustic Imaging With Uniform Field of Large Size Aperture Antenna for Tumor Screening. *IEEE Trans. Biomed. Eng.* 2022, 69, 725-733.

34. Bing, S.; Chawang, K.; Chiao, J. C. A Self-Tuned Method for Impedance-Matching of Planar-Loop Resonators in Conformable Wearables. *Electronics* 2022, 11, 2784.

35. Wei, J. Distributed capacitance of planar electrodes in optic and acoustic surface wave devices. *IEEE J. Quantum Electron.* 1977, 13, 152-158.

36. Maradei, F.; Caniggia, S. Appendix A: Formulae for Partial Inductance Calculation; Signal Integrity and Radiated Emission of High-Speed Digital Systems; John Wiley & Sons, Ltd: Chichester, UK, 2008; pp. 481-486.

37. Bing, S.; Chawang, K.; Chiao, J. C. A Flexible Tuned Radio-Frequency Planar Resonant Loop for Noninvasive Hydration Sensing. *IEEE J. Microwaves* 2022, 3, 181-192.

38. Bing, S.; Chawang, K.; Chiao, J. C. A Radio-Frequency Planar Resonant Loop for Noninvasive Monitoring of Water Content. In Proceedings of the 2022 IEEE Sensors, Dallas, TX, USA, 30 October-2 Nov. 2022; IEEE: Piscataway, NJ, USA, 2022; pp. 1-4.

39. Bing, S.; Chawang, K.; Chiao, J. C. A Resonant Coupler for Subcutaneous Implant. *Sensors* 2021, 21, 8141.

40. Bing, S.; Chawang, K.; Chiao, J. C. Resonant Coupler Designs for Subcutaneous Implants. In Proceedings of the 2021 IEEE Wireless Power Transfer Conference (WPTC), San Diego, CA, USA, 1-4 Jun. 2021; pp. 1-4.

41. Siegel, R. L.; Miller, K. D.; Fuchs, H. E.; Jemal, A. Cancer statistics, 2022. *CA Cancer J. Clin.* 2022, 72, 7-33.

42. Kothari, C.; Diorio, C.; Durocher, F. The Importance of Breast Adipose Tissue in Breast Cancer. *Int. J. Mol. Sci.* 2020, 21, 5760.

43. Sugitani, T.; ichi Kubota, S.; 40chiro Kuroki, S.; Sogo, K.; Arihiro, K.; Okada, M.; Kadoya, T.; Hide, M.; Oda, M.; Kikkawa, T. Complex permittivities of breast tumor tissues obtained from cancer surgeries. *Appl. Phys. Lett.* 2014, 104, 253702.

44. Lazebnik, M.; McCartney, L.; Popovic, D.; Watkins, C. B.; Lindstrom, M. J.; Harter, J.; Sewall, S.; Magliocco, A.; Booske, J. H.; Okoniewski, M.; et al. A large-scale study of the ultrawideband microwave dielectric properties of normal breast tissue obtained from reduction surgeries. *Phys. Med. Biol.* 2007, 52, 2637-2656.

45. Porter, E.; Fakhoury, J.; Oprisor, R.; Coates, M.; Popovic', M. Improved tissue phantoms for experimental validation of microwave breast cancer detection. In Proceedings of the Fourth European Conference on Antennas and Propagation, Barcelona, Spain, 12-16 Apr. 2010; IEEE: Piscataway, NJ, USA, 2010; pp. 1-5.

46. Fear, E. C.; Hagness, S. C.; Meaney, P. M.; Okoniewski, M.; Stuchly, M. A. Enhancing breast tumor detection with near-field imaging. *IEEE Microw. Mag.* 2002, 3, 48-56.

47. Cheng, Y.; Fu, M. Dielectric properties for non-invasive detection of normal, benign, and malignant breast tissues using microwave theories. *Thorac. Cancer* 2018, 9, 459-465.

48. Kuwahara, Y.; Nozaki, A.; Fujii, K. Large Scale Analysis of Complex Permittivity of Breast Cancer in Microwave Band. *Adv. Breast Cancer Res.* 2020, 9, 101-109.

49. Andreuccetti, D.; Fossi, R.; Petrucci, C. An Internet Resource for the Calculation of the Dielectric Properties of Body Tissues in the Frequency Range 10 Hz-100 GHz. 1997. Available online: http://niremf.ifac.cnr.it/tissprop/(accessed on !9 Nov. 2022). IFAC-CNR, Florence (Italy), Based on data published by C. Gabriel et al. in 1996.

50. Hagl, D. M.; Popovic, D.; Hagness, S. C.; Booske, J. H.; Okoniewski, M. Sensing volume of open-ended coaxial probes for dielectric characterization of breast tissue at microwave frequencies. *IEEE Trans. Microw. Theory Tech.* 2003, 51, 1194-1206.

51. Gray, H.; (Ed.), C. M. G. *Anatomy of the Human Body;* 25th ed.; Lea & Febiger: Philadelphia, PA, USA, 1949.

52. Rosenstein, M.; Andersen, L. W.; Warner, G. *Handbook of Glandular Tissue Doses in Mammography*; Food and Drug Administration: Rockville, MD, USA, 1985.

53. Wu, X.; Barnes, G. T.; Tucker, D. M. Spectral dependence of glandular tissue dose in screen-film mammography. *Radiology* 1991, 179, 143-148.

54. Parsons, W. H. *Cancer of the Breast*; Thomas: Springfield, IL, USA, 1959.

55. Curlander, J. C.; MacDonough, R. N. *Synthetic Aperture Radar*; Wiley: New York, NY, USA, 1991.

56. Boyd, N. F.; Martin, L. J.; Bronskill, M.; Yaffe, M. J.; Duric, N.; Minkin, S. Breast tissue composition and susceptibility to breast cancer. *J. Natl. Cancer Inst.* 2010, 102, 1224-1237.

57. Porembka, J. H.; Ma, J.; Le-Petross, H. T. Breast density, MR imaging biomarkers, and breast cancer risk. *Breast J.* 2020, 26, 1535-1542.

58. R. L. Siegel, K. D. Miller, H. E. Fuchs, and A. Jemal, "Cancer statistics, 2022," *CA: Cancer J. Clinicians*, vol. 72, no. 1, pp. 7-33, January 2022.

59. "Cancer facts & FIGS. 2023," American Cancer Society, Atlanta, GA, USA, 2023. [Online]. Available: https://www.cancer.org/research/cancerfacts-statistics/all-cancer-facts-figures/2023-cancer-facts-figures.html.

60. V. Narayanamurthy et al., "Skin cancer detection using non-invasive techniques," *RSC Adv.*, vol. 8, no. 49, pp. 2895-2813 August 2018.

61. S. A. R. Naqvi, A. T. Mobashsher, B. Mohammed, D. Foong, and A. Abbosh, "Benign and malignant skin lesions: Dielectric characterization, modelling and analysis in frequency band 1 to 14 GHz," *IEEE Trans. Biomed. Eng.*, vol. 70, no. 2, pp. 628-639, February 2023.

62. J. I. V. D. Rhee, W. Bergman, and N. A. Kukutsch, "The impact of dermoscopy on the management of pigmented lesions in everyday clinical practice of general dermatologists: A prospective study," *Brit. J. Dermatol.*, vol. 162, no. 3, pp. 563-567, March 2010.

63. V. Papageorgiou et al., "The limitations of dermoscopy: False-positive and false-negative tumours," *J. Eur. Acad. Dermatol. Venereol.*, vol. 32, no. 6, pp. 879-888, June 2018.

64. W. Stolz, R. Schiffner, and W. H. C. Burgdorf, "Dermatoscopy for facial pigmented skin lesions," *Clin. Dermatol.*, vol. 20, no. 3, pp. 276-278, 2002.

65. R. P. Braun, H. S. Rabinovitz, M. Oliviero, A. W. Kopf, and J.-H. Saurat, "Dermoscopy of pigmented skin lesions," *J. Amer. Acad. Dermatol.*, vol. 52, no. 1, pp. 109-121, 2005.

66. C. Rosendahl, P. Tschandl, A. Cameron, and H. Kittler, "Diagnostic accuracy of dermatoscopy for melanocytic and nonmelanocytic pigmented lesions," *J. Amer. Acad. Dermatol.*, vol. 64, no. 6, pp. 1068-173 June 2011.

67. M.-L. Bafounta, A. Beauchet, P. Aegerter, and P. Saiag, "Is dermoscopy (epiluminescence microscopy) useful for the diagnosis of melanoma?: Results of a meta-analysis using techniques adapted to the evaluation of diagnostic tests," *Arch. Dermatol.*, vol. 137, no. 10, pp. 1343-1350 October 2001.

68. N. Pandeya, C. M. Olsen, and D. C. Whiteman, "The incidence and multiplicity rates of keratinocyte cancers in Australia," *Med. J. Aust.*, vol. 207, no. 8, pp. 339-343, October 2017.

69. R. L. Wilson, B. A. Yentzer, S. P. Isom, S. R. Feldman, and A. B. Fleischer Jr, "How good are US dermatologists at discriminating skin cancers? A number-needed-to-treat analysis," *J. Dermatological Treat.*, vol. 23, no. 1, pp. 65-69, February 2012.

70. J. K. Rivers, M. R. Copley, R. Svoboda, and D. S. Rigel, "Non-invasive gene expression testing to rule out melanoma," *Skin Ther. Lett.*, vol. 23, no. 5, pp. 1-4, September 2018.

71. F. Walter, A. Webster, S. Scott, and J. Emery, "The Andersen model of total patient delay: A systematic review of its application in cancer diagnosis," *J. Health Serv. Res. Policy*, vol. 17, no. 2, pp. 110-118, April 2012.

72. J. W. Choi et al., "Microwave detection of metastasized breast cancer cells in the lymph node; potential application for sentinel lymphadenectomy," *Breast Cancer Res. Treat.*, vol. 86, no. 2, pp. 107-115, 2004.

73. H. Arab, L. Chioukh, M. D. Ardakani, S. Dufour, and S. O. Tatu, "Early stage detection of melanoma skin cancer using contactless millimeter wave sensors," *IEEE Sensors J.*, vol. 20, no. 13, pp. 7310-7317 July 2020.

74. C. C. Harland, S. G. Kale, P. Jackson, P. S. Mortimer, and J. C. Bamber, "Differentiation of common benign pigmented skin lesions from melanoma by high-resolution ultrasound," *Brit. J. Dermatol.*, vol. 143, no. 2, pp. 281-289, August 2000.

75. K. Hoffmann, J. Jung, S. el Gammal, and P. Altmeyer, "Malignant melanoma in 20-MHz B scan sonography," *Dermatology*, vol. 185, no. 1, pp. 49-55, 1992.

76. E. Dalimier and D. Salomon, "Full-field optical coherence tomography: A new technology for 3D high-resolution skin imaging," *Dermatology*, vol. 224, no. 1, pp. 84-92, May 2012.

77. J. Yun and S.-S. Lee, "Human movement detection and identification using pyroelectric infrared sensors," *Sensors*, vol. 14, no. 5, pp. 8057-8081 May 2014.

78. C. Herman and M. P. Cetingul, "Quantitative visualization and detection of skin cancer using dynamic thermal imaging," *J. Visualized Experiments*, no. 51, 2011, Art. No. e2679.

79. P. Aberg, U. Birgersson, P. Elsner, P. Mohr, and S. Ollmar, "Electrical impedance spectroscopy and the diagnostic accuracy for malignant melanoma," *Exp. Dermatol.*, vol. 20, no. 8, pp. 648-652, August 2011.

80. P. Aberg, I. Nicander, J. Hansson, P. Geladi, U. Holmgren, and S. Ollmar "Skin cancer identification using multifrequency electrical impedance-A potential screening tool," *IEEE Trans. Biomed. Eng.*, vol. 51, no. 12, pp. 2097-212 December 2004.

81. D. G. Beetner, S. Kapoor, S. Manjunath, X. Zhou, and W. V. Stoecker, "Differentiation among basal cell carcinoma, benign lesions, and normal skin using electric impedance," *IEEE Trans. Biomed. Eng.*, vol. 50, no. 8, pp. 1020-125 August 2003.

82. M. Lazebnik, E. L. Madsen, G. R. Frank, and S. C. Hagness, "Tissue mimicking phantom materials for narrowband and ultrawideband microwave applications," *Phys. Med. Biol.*, vol. 50, no. 18, pp. 4245-4258 September 2005.

83. D. A. Pollacco, L. Farrugia, M. C. Conti, L. Farina, P. S. Wismayer, and C. V. Sammut, "Characterization of the dielectric properties of biological tissues using mixture equations and correlations to different states of hydration," *Biomed. Phys. Eng. Exp.*, vol. 5, no. 3, March 2019, Art. No. 35022.

84. S. Gabriel, R. W. Lau, and C. Gabriel, "The dielectric properties of biological tissues: Ii measurements in the frequency range 10 Hz to 20 GHz," *Phys. Med. Biol.*, vol. 41, no. 11, pp. 2251-2269 November 1996.

85. A. Mirbeik-Sabzevari, R. Ashinoff, and N. Tavassolian, "Ultra-wideband millimeter-wave dielectric characteristics of freshly excised normal and malignant human skin tissues," *IEEE Trans. Biomed. Eng.*, vol. 65, no. 6, pp. 1320-1329 June 2018.

86. M. Gniadecka, O. F. Nielsen, and H. C. Wulf, "Water content and structure in malignant and benign skin tumours," *J. Mol. Struct.*, vol. 661, pp. 405-410, December 2003.

87. H. N. Mayrovitz, S. R. Gildenberg, P. Spagna, L. Killpack, and D. A. Altman, "Characterizing the tissue dielectric constant of skin basal cell cancer lesions," *Skin Res. Technol.*, vol. 24, no. 4, pp. 686-691, November 2018.

88. V. Suntzeff and C. Carruthers, "The water content in the epidermis of mice undergoing carcinogenesis by methylcholanthrene," *Cancer Res.*, vol. 6, no. 10, pp. 574-577, October 1946.

89. K. G. Stern and R. Willheim, *The Biochemistry of Malignant Tumors*. Brooklyn, NY, USA: Reference Press, 1943.

90. I. L. Mulay, R. Roy, B. E. Knox, N. H. Suhr, and W. E. Delaney, "Trace metal analysis of cancerous and non-cancerous human tissues," *J. Nat. Cancer Inst.*, vol. 47, no. 1, pp. 1-13, July 1971.

91. F. Topfer, S. Dudorov, and J. Oberhammer, "Millimeter-wave near-field probe designed for high-resolution skin cancer diagnosis," *IEEE Trans. Microw. Theory Techn.*, vol. 63, no. 6, pp. 2050-259 June 2015.

92. A. Taeb, S. Gigoyan, and S. Safavi-Naeini, "Millimetre-wave waveguide reflectometers for early detection of skin cancer," *IET Microw., Antennas Propag.*, vol. 7, no. 14, pp. 1182-1186 November 2013.

93. P. Mehta, K. Chand, D. Narayanswamy, D. G. Beetner, R. Zoughi, and W. V. Stoecker, "Microwave reflectometry as a novel diagnostic tool for detection of skin cancers," *IEEE Trans. Instrum. Meas.*, vol. 55, no. 4, pp. 1309-1316 August 2006.

94. J.-C. Chiao et al., "Applications of microwaves in medicine," *IEEE J. Microw.*, vol. 3, no. 1, pp. 134-169, January 2023.

95. S. I. Alekseev, A. A. Radzievsky, M. K. Logani, and M. C. Ziskin, "Millimeter wave dosimetry of human skin," *Bioelectromagnetics*, vol. 29, no. 1, pp. 65-70, January 2008.
96. F. Kazemi, F. Mohanna, and J. Ahmadi-shokouh, "Microwave reflectometry for noninvasive imaging of skin abnormalities," *Australas. Phys. Eng. Sci. Med.*, vol. 41, no. 4, pp. 881-890, December 2018.
97. F. Kazemi, F. Mohanna, and J. Ahmadi-Shokouh, "Nondestructive high resolution microwave imaging of biomaterials and biological tissues," *AEU-Int. J. Electron. Commun.*, vol. 84, pp. 177-185, 2018.
98. R. Schiavoni, G. Maietta, E. Filieri, A. Masciullo, and A. Cataldo, "Microwave reflectometry sensing system for low-cost in-vivo skin cancer diagnostics," *IEEE Access*, vol. 11, pp. 13918-13928, 2023.
99. S. Bing, K. Chawang, and J.-C. Chiao, "A self-tuned method for impedance-matching of planar-loop resonators in conformable wearables," *Electronics*, vol. 11, no. 17, January 2022, Art. No. 2784.
100. J. Wei, "Distributed capacitance of planar electrodes in optic and acoustic surface wave devices," *IEEE J. Quantum Electron.*, vol. 13, no. 4, pp. 152-158, April 1977.
101. F. Maradei and S. Caniggia, *Appendix A: Formulae for Partial Inductance Calculation* (Signal Integrity and Radiated Emission of High-Speed Digital Systems Series). Chichester, U. K.: Wiley, November 2008.
102. S. Bing, K. Chawang, and J.-C. Chiao, "A resonant coupler for subcutaneous implant," *Sensors*, vol. 21, no. 23, December 2021, Art. No. 8141.
103. S. Bing, K. Chawang, and J. C. Chiao, "Resonant coupler designs for subcutaneous implants," in *Proc. IEEE Wireless Power Transfer Conf.*, 2021, pp. 1-4.
104. S. Bing, K. Chawang, and J.-C. Chiao, "A flexible tuned radio-frequency planar resonant loop for noninvasive hydration sensing," *IEEE J. Microw.*, vol. 3, no. 1, pp. 181-192, January 2022.
105. S. Bing, K. Chawang, and J. C. Chiao, "A radio-frequency planar resonant loop for noninvasive monitoring of water content," in *Proc. IEEE Sensors*, 2022, pp. 1-4.
106. S. Bing, K. Chawang, and J.-C. Chiao, "A tuned microwave resonant system for subcutaneous imaging," *Sensors*, vol. 23, no. 6, 2023, Art. No. 3090.
107. T. Takenouchi, "Key points in dermoscopic diagnosis of basal cell carcinoma and seborrheic keratosis in Japanese," *J. Dermatol.*, vol. 38, no. 1, pp. 59-65, January 2011.
108. Y. Y. Gao, X. J. An, J. Yang, C. Z. Huang, and J. Tao, "Seborrheic keratosis mimicking basal cell carcinoma under dermoscopy: A case report," *Chin. Med. J.*, vol. 133, no. 17, pp. 2139-2140 September 2020.
109. R. Bedir, C. Yurdakul, H. Güçer, and I. Sehitoglu, "Basal cell carcinoma arising within seborrheic keratosis," *J. Clin. Diagn. Res.*, vol. 8, no. 7, July 2014, Art. No. YD06-7.
110. S.-Q. Wang et al., "High-frequency ultrasound features of basal cell carcinoma and its association with histological recurrence risk," *Chin. Med. J.*, vol. 132, no. 17, pp. 2021-226 September 2019.
111. C. Longo et al., "Clonal seborrheic keratosis: Dermoscopic and confocal microscopy characterization," *J. Eur. Acad. Dermatol. Venereol.*, vol. 28, no. 10, pp. 1397-140 October 2014.
112. A. Mirbeik-Sabzevari and N. Tavassolian, "Ultrawideband, Stable normal and cancer skin tissue phantoms for millimeter-wave skin cancer imaging," *IEEE Trans. Biomed. Eng.*, vol. 66, no. 1, pp. 176-186, January 2019.
113. J. Garrett and E. Fear, "Stable and flexible materials to mimic the dielectric properties of human soft tissues," *IEEE Antennas Wireless Propag. Lett.*, vol. 13, pp. 599-602, 2014.
114. "N1501 A dielectric probe kit," *Keysight Technol.*, Santa Rosa, CA, USA, 2020. [Online]. Available: https://www.keysight.com/us/en/assets/7018-04631/technical-overviews/5992-0264.pdf.
115. D. Andreuccetti, R. Fossi, and C. Petrucci, "An internet resource for the calculation of the dielectric properties of body tissues in the frequency range 10 Hz GHz," 1997. [Online]. Available: http://niremf.ifac.cn-r.it/tissprop/

What is claimed is:

1. A method for non-invasively identifying a location of a tumor comprising:
   providing a patient with a possible subcutaneous tumor;
   providing a detector comprising one or more radio-frequency (RF) planar resonant loop sensors, each sensor comprising a planar resonant loop and an element disposed within and co-planar with a loop formed by the planar resonant loop;
   creating a first localization map of resonant frequencies of an area including the possible tumor using the detector; and
   creating a second localization map of $|s_{11}|$ reflection coefficients of the area including the possible tumor using the detector.

2. The method of claim 1, wherein each sensor is disposed on a flexible film to provide firm contact with a skin of the patient.

3. The method of claim 1, wherein the first localization map is created by moving a single sensor over the area including the possible tumor.

4. The method of claim 1, wherein the first localization map is created by temporally switching an array of the one or more sensors over the area including the possible tumor.

5. The method of claim 1, wherein the second localization map is created by moving a single sensor over the area including the possible tumor.

6. The method of claim 1, wherein the second localization map is created by temporally switching an array of the one or more sensors over the area including the possible tumor.

7. A method for non-invasively identifying a location of a subcutaneous tumor comprising:
   providing a patient with a possible subcutaneous tumor;
   providing a detector comprising one or more radio-frequency (RF) planar resonant loop sensors, each sensor comprising a planar resonant loop and an element disposed within and co-planar with a loop formed by the planar resonant loop;
   creating a first localization map of resonant frequencies of an area including the possible tumor using the detector;
   creating a second localization map of $|s_{11}|$ reflection coefficients of the area including the possible tumor using the detector;
   normalizing the first localization map and the second localization map to a range from zero to one;
   converting the normalized second localization map to match the normalized first localization map using a linear transformation;
   applying a weighting factor to the converted normalized second localized map and to the normalized first localization map to construct a third localization map; and
   visually locating the tumor on the third localization map.

8. The method of claim 7, wherein each sensor is disposed on a flexible film to provide firm contact with a skin of the patient.

9. The method of claim 7, wherein the first localization map is created by moving a single sensor over the area including the possible tumor.

10. The method of claim 7, wherein the first localization map is created by temporally switching an array of the one or more sensors over the area including the possible tumor.

11. The method of claim 7, wherein the second localization map is created by moving a single sensor over the area including the possible tumor.

12. The method of claim 7, wherein the second localization map is created by temporally switching an array of the one or more sensors over the area including the possible tumor.

* * * * *